(12) United States Patent
Cooke et al.

(10) Patent No.: US 10,416,405 B2
(45) Date of Patent: Sep. 17, 2019

(54) INDEPENDENTLY TRANSLATABLE MODULES AND FIBER OPTIC EQUIPMENT TRAYS IN FIBER OPTIC EQUIPMENT

(71) Applicant: Corning Optical Communications LLC, Hickory, NC (US)

(72) Inventors: Terry Lee Cooke, Hickory, NC (US); David Lee Dean, Jr., Hickory, NC (US); Tory Allen Klavuhn, Newton, NC (US); Juan Garcia Martinez, Reynosa (MX); Elmer Mariano Juarez, Reynosa (MX); Manuel Alejandro Lopez Sanchez, Reynosa (MX); Juan Miguel Gonzalez Covarrubias, Reynosa (MX)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 15/413,919

(22) Filed: Jan. 24, 2017

(65) Prior Publication Data

US 2017/0131505 A1 May 11, 2017
US 2018/0113264 A2 Apr. 26, 2018

Related U.S. Application Data

(63) Continuation of application No. 13/901,074, filed on May 23, 2013, now abandoned, which is a
(Continued)

(51) Int. Cl.
*G02B 6/38* (2006.01)
*G02B 6/44* (2006.01)

(52) U.S. Cl.
CPC ......... *G02B 6/4455* (2013.01); *G02B 6/3897* (2013.01); *G02B 6/4452* (2013.01); *G02B 6/4453* (2013.01)

(58) Field of Classification Search
CPC .. G02B 6/4455; G02B 6/3897; G02B 6/4452; G02B 6/4453
See application file for complete search history.

(56) References Cited

U.S. PATENT DOCUMENTS 620,013 A 2/1899 Barnes
864,761 A 8/1907 Erickson
(Continued)

FOREIGN PATENT DOCUMENTS

AU 2010270959 A1 2/2012
CA 2029592 A1 5/1992
(Continued)

OTHER PUBLICATIONS

Machine translation of JP 2007-93760.*
(Continued)

*Primary Examiner* — Chris H Chu
(74) *Attorney, Agent, or Firm* — Withrow & Terranova, P.L.L.C.

(57) ABSTRACT

Fiber optic equipment that supports independently translatable fiber optic modules and/or fiber optic equipment trays containing one or more fiber optic modules is disclosed. In some embodiments, one or more fiber optic modules are disposed in a plurality of independently translatable fiber optic equipment trays which are received in a tray guide system. In this manner, each fiber optic equipment tray is independently translatable within the guide system. One or more fiber optic modules may also be disposed in one or more module guides disposed in the fiber optic equipment trays to allow each fiber optic module to translate independently of other fiber optic modules in the same fiber optic equipment tray. In other embodiments, a plurality of fiber optic modules are disposed in a module guide system disposed in the fiber optic equipment that translate indepen-
(Continued)

dently of other fiber optic modules disposed within the module guide system.

28 Claims, 33 Drawing Sheets

Related U.S. Application Data continuation of application No. 12/323,415, filed on Nov. 25, 2008, now Pat. No. 8,452,148.

(60) Provisional application No. 61/197,068, filed on Oct. 23, 2008, provisional application No. 61/190,538, filed on Aug. 29, 2008.

(56) References Cited

U.S. PATENT DOCUMENTS

| | | |
|---|---|---|
| 2,528,910 A | 11/1950 | Poe |
| 2,614,685 A | 10/1952 | Miller |
| 3,057,525 A | 10/1962 | Malachick |
| 3,081,717 A | 3/1963 | Yurevich |
| 3,175,873 A | 3/1965 | Blomquist et al. |
| 3,212,192 A | 10/1965 | Bachmann et al. |
| 3,433,886 A | 3/1969 | Myers |
| 3,494,306 A | 2/1970 | Aguilar |
| 3,545,712 A | 12/1970 | Ellis |
| 3,568,263 A | 3/1971 | Meehan |
| 3,646,244 A | 2/1972 | Cole |
| 3,664,514 A | 5/1972 | Drake |
| 3,683,238 A | 8/1972 | Olds et al. |
| 3,701,835 A | 10/1972 | Eisele et al. |
| 3,880,396 A | 4/1975 | Freiberger et al. |
| 3,906,592 A | 9/1975 | Sakasegawa et al. |
| 3,991,960 A | 11/1976 | Tanaka |
| 4,047,797 A | 9/1977 | Arnold et al. |
| 4,059,872 A | 11/1977 | Delesandri |
| 4,119,285 A | 10/1978 | Bisping et al. |
| 4,148,454 A | 4/1979 | Carlson et al. |
| 4,239,316 A | 12/1980 | Spaulding |
| 4,244,638 A | 1/1981 | Little et al. |
| 4,266,853 A | 5/1981 | Hutchins et al. |
| 4,285,486 A | 8/1981 | Von Osten et al. |
| 4,303,296 A | 12/1981 | Spaulding |
| 4,354,731 A | 10/1982 | Mouissie |
| 4,457,482 A | 7/1984 | Kitagawa |
| 4,525,012 A | 6/1985 | Dunner |
| 4,540,222 A | 9/1985 | Burrell |
| 4,561,615 A | 12/1985 | Medlin, Jr. |
| 4,564,163 A | 1/1986 | Barnett |
| 4,597,173 A | 7/1986 | Chino et al. |
| 4,611,875 A | 9/1986 | Clarke et al. |
| 4,634,214 A | 1/1987 | Cannon, Jr. et al. |
| 4,635,886 A | 1/1987 | Santucci et al. |
| 4,645,292 A | 2/1987 | Sammueller |
| 4,657,340 A | 4/1987 | Tanaka et al. |
| 4,681,288 A | 7/1987 | Nakamura |
| 4,702,551 A | 10/1987 | Coulombe |
| 4,711,518 A | 12/1987 | Shank et al. |
| 4,736,100 A | 4/1988 | Vastagh |
| 4,744,629 A | 5/1988 | Bertoglio et al. |
| 4,747,020 A | 5/1988 | Brickley et al. |
| 4,752,110 A | 6/1988 | Blanchet et al. |
| 4,753,510 A | 6/1988 | Sezerman |
| 4,787,706 A | 11/1988 | Cannon, Jr. et al. |
| 4,792,203 A | 12/1988 | Nelson et al. |
| 4,798,432 A | 1/1989 | Becker et al. |
| 4,805,979 A | 2/1989 | Bossard et al. |
| 4,808,774 A | 2/1989 | Crane |
| 4,824,193 A | 4/1989 | Maeda et al. |
| 4,824,196 A | 4/1989 | Bylander |
| 4,826,277 A | 5/1989 | Weber et al. |
| 4,838,643 A | 6/1989 | Hodges et al. |
| 4,840,449 A | 6/1989 | Ghandeharizadeh |
| 4,865,280 A | 9/1989 | Wollar |
| 4,889,403 A | 12/1989 | Zucker et al. |
| 4,898,448 A | 2/1990 | Cooper |
| 4,900,123 A | 2/1990 | Barlow |
| 4,911,662 A | 3/1990 | Debortoli et al. |
| 4,913,514 A | 4/1990 | Then |
| 4,948,220 A | 8/1990 | Violo et al. |
| 4,949,376 A | 8/1990 | Nieves et al. |
| 4,971,421 A | 11/1990 | Ori |
| 4,986,625 A | 1/1991 | Yamada et al. |
| 4,988,831 A | 1/1991 | Wilson et al. |
| 4,991,928 A | 2/1991 | Zimmer |
| 4,995,688 A | 2/1991 | Anton et al. |
| 5,001,602 A | 3/1991 | Suffi et al. |
| 5,005,941 A | 4/1991 | Barlow et al. |
| 5,011,257 A | 4/1991 | Wettengel et al. |
| 5,017,211 A | 5/1991 | Wenger et al. |
| 5,023,646 A | 6/1991 | Ishida et al. |
| 5,024,498 A | 6/1991 | Becker et al. |
| 5,028,114 A | 7/1991 | Krausse et al. |
| 5,037,175 A | 8/1991 | Weber |
| 5,048,918 A | 9/1991 | Daems et al. |
| 5,060,897 A | 10/1991 | Thalenfeld |
| 5,066,149 A | 11/1991 | Wheeler et al. |
| 5,067,784 A | 11/1991 | Debortoli et al. |
| 5,071,211 A | 12/1991 | Debortoli et al. |
| 5,071,220 A | 12/1991 | Ruello et al. |
| 5,073,042 A | 12/1991 | Mulholland et al. |
| 5,074,635 A | 12/1991 | Justice et al. |
| 5,076,688 A | 12/1991 | Bowen et al. |
| 5,080,459 A | 1/1992 | Wettengel et al. |
| 5,100,221 A | 3/1992 | Carney et al. |
| 5,104,336 A | 4/1992 | Hatanaka et al. |
| 5,125,060 A | 6/1992 | Edmundson |
| 5,127,082 A | 6/1992 | Below et al. |
| 5,127,851 A | 7/1992 | Hilbert et al. |
| 5,129,030 A | 7/1992 | Petrunia |
| 5,129,607 A | 7/1992 | Satoh |
| 5,129,842 A | 7/1992 | Morgan et al. |
| 5,133,039 A | 7/1992 | Dixit |
| 5,138,678 A | 8/1992 | Briggs et al. |
| 5,138,688 A | 8/1992 | Debortoli |
| 5,142,598 A | 8/1992 | Tabone |
| 5,142,607 A | 8/1992 | Petrotta et al. |
| 5,150,277 A | 9/1992 | Bainbridge et al. |
| D330,368 S | 10/1992 | Bourgeois et al. |
| 5,152,760 A | 10/1992 | Latina |
| 5,153,910 A | 10/1992 | Mickelson et al. |
| 5,157,749 A | 10/1992 | Briggs et al. |
| 5,167,001 A | 11/1992 | Debortoli et al. |
| 5,170,452 A | 12/1992 | Ott |
| 5,189,723 A | 2/1993 | Johnson et al. |
| 5,199,099 A | 3/1993 | Dalgoutte |
| 5,204,929 A | 4/1993 | Machall et al. |
| 5,209,572 A | 5/1993 | Jordan |
| 5,214,735 A | 5/1993 | Henneberger et al. |
| 5,224,186 A | 6/1993 | Kishimoto et al. |
| 5,230,492 A | 7/1993 | Zwart et al. |
| 5,231,687 A | 7/1993 | Handley |
| 5,231,688 A | 7/1993 | Zimmer |
| 5,233,674 A | 8/1993 | Vladic |
| 5,239,609 A | 8/1993 | Auteri |
| 5,243,679 A | 9/1993 | Sharrow et al. |
| 5,253,320 A | 10/1993 | Takahashi et al. |
| 5,260,957 A | 11/1993 | Hakimi et al. |
| 5,261,633 A | 11/1993 | Mastro |
| 5,265,187 A | 11/1993 | Morin et al. |
| 5,274,729 A | 12/1993 | King et al. |
| 5,274,731 A | 12/1993 | White |
| 5,278,933 A | 1/1994 | Hunsinger et al. |
| 5,280,138 A | 1/1994 | Preston et al. |
| 5,285,515 A | 2/1994 | Milanowski et al. |
| 5,291,570 A | 3/1994 | Filgas et al. |
| 5,315,679 A | 5/1994 | Baldwin et al. |
| 5,317,663 A | 5/1994 | Beard et al. |
| 5,323,478 A | 6/1994 | Milanowski et al. |
| 5,323,480 A | 6/1994 | Mullaney et al. |
| 5,329,520 A | 7/1994 | Richardson |
| 5,333,193 A | 7/1994 | Cote et al. |
| 5,333,221 A | 7/1994 | Briggs et al. |

(56) References Cited

U.S. PATENT DOCUMENTS

| | | |
|---|---|---|
| 5,333,222 A | 7/1994 | Belenkiy et al. |
| 5,337,400 A | 8/1994 | Morin et al. |
| 5,339,379 A | 8/1994 | Kutsch et al. |
| 5,347,603 A | 9/1994 | Belenkiy et al. |
| 5,353,367 A | 10/1994 | Czosnowski et al. |
| 5,359,688 A | 10/1994 | Underwood |
| 5,363,466 A | 11/1994 | Milanowski et al. |
| 5,363,467 A | 11/1994 | Keith |
| 5,366,388 A | 11/1994 | Freeman et al. |
| 5,367,598 A | 11/1994 | Devenish, III et al. |
| 5,373,421 A | 12/1994 | Detsikas et al. |
| 5,383,051 A | 1/1995 | Delrosso et al. |
| 5,390,272 A | 2/1995 | Repta et al. |
| 5,398,295 A | 3/1995 | Chang et al. |
| 5,398,820 A | 3/1995 | Kiss |
| 5,399,814 A | 3/1995 | Staber et al. |
| 5,401,193 A | 3/1995 | Lo Cicero et al. |
| 5,402,515 A | 3/1995 | Vidacovich et al. |
| 5,408,557 A | 4/1995 | Hsu |
| 5,408,570 A | 4/1995 | Cook et al. |
| RE34,955 E | 5/1995 | Anton et al. |
| 5,412,751 A | 5/1995 | Siemon et al. |
| 5,416,837 A | 5/1995 | Cote et al. |
| 5,418,874 A | 5/1995 | Carlisle et al. |
| 5,420,956 A | 5/1995 | Grugel et al. |
| 5,420,958 A * | 5/1995 | Henson ............... G02B 6/3806 385/135 |
| 5,421,532 A | 6/1995 | Richter |
| 5,438,641 A | 8/1995 | Malacarne |
| 5,442,725 A | 8/1995 | Peng |
| 5,442,726 A | 8/1995 | Howard et al. |
| 5,443,232 A | 8/1995 | Kesinger et al. |
| 5,444,804 A | 8/1995 | Yui et al. |
| 5,448,015 A | 9/1995 | Jamet et al. |
| 5,450,518 A | 9/1995 | Burek et al. |
| 5,458,019 A | 10/1995 | Trevino |
| 5,471,555 A | 11/1995 | Braga et al. |
| 5,479,505 A | 12/1995 | Butler et al. |
| 5,481,634 A | 1/1996 | Anderson et al. |
| 5,481,939 A | 1/1996 | Bernardini |
| 5,490,229 A | 2/1996 | Ghandeharizadeh et al. |
| 5,495,549 A | 2/1996 | Schneider et al. |
| 5,497,416 A | 3/1996 | Butler, III et al. |
| 5,497,444 A * | 3/1996 | Wheeler ............... G02B 6/4452 385/134 |
| 5,511,144 A * | 4/1996 | Hawkins ............... G02B 6/4452 385/134 |
| 5,511,798 A | 4/1996 | Kawamoto et al. |
| 5,519,804 A | 5/1996 | Burek et al. |
| 5,530,786 A | 6/1996 | Radliff et al. |
| 5,535,970 A | 7/1996 | Gobbi |
| 5,538,213 A | 7/1996 | Brown |
| 5,542,015 A | 7/1996 | Hultermans |
| 5,546,495 A | 8/1996 | Bruckner et al. |
| 5,548,641 A | 8/1996 | Butler et al. |
| 5,553,183 A | 9/1996 | Bechamps |
| 5,553,186 A | 9/1996 | Allen |
| 5,563,971 A | 10/1996 | Abendschein |
| 5,572,617 A | 11/1996 | Bernhardt et al. |
| 5,575,680 A | 11/1996 | Suffi |
| 5,577,151 A | 11/1996 | Hoffer |
| 5,590,234 A | 12/1996 | Pulido |
| 5,595,507 A | 1/1997 | Braun et al. |
| 5,596,670 A | 1/1997 | Debortoli et al. |
| 5,600,020 A | 2/1997 | Wehle et al. |
| 5,602,954 A | 2/1997 | Nolf et al. |
| 5,608,606 A | 3/1997 | Blaney |
| 5,613,030 A | 3/1997 | Hoffer et al. |
| 5,617,501 A | 4/1997 | Miller et al. |
| 5,638,474 A | 6/1997 | Lampert et al. |
| 5,640,476 A | 6/1997 | Womack et al. |
| 5,640,482 A | 6/1997 | Barry et al. |
| 5,647,043 A | 7/1997 | Anderson et al. |
| 5,647,045 A | 7/1997 | Robinson et al. |
| 5,650,334 A | 7/1997 | Zuk et al. |
| 5,668,910 A | 9/1997 | Arnett |
| 5,668,911 A | 9/1997 | Debortoli |
| 5,671,273 A | 9/1997 | Lanquist |
| 5,689,605 A | 11/1997 | Cobb et al. |
| 5,689,607 A | 11/1997 | Vincent et al. |
| 5,692,079 A | 11/1997 | Iso |
| 5,694,511 A | 12/1997 | Pimpinella et al. |
| 5,701,380 A | 12/1997 | Larson et al. |
| 5,704,573 A | 1/1998 | de Beers et al. |
| 5,708,742 A | 1/1998 | Beun et al. |
| 5,708,751 A | 1/1998 | Mattei |
| 5,710,851 A | 1/1998 | Walter et al. |
| 5,717,810 A | 2/1998 | Wheeler |
| 5,734,776 A | 3/1998 | Puetz |
| 5,734,779 A | 3/1998 | Okino |
| 5,740,300 A | 4/1998 | Hodge |
| 5,742,982 A | 4/1998 | Dodd et al. |
| 5,751,874 A | 5/1998 | Chudoba et al. |
| 5,751,882 A | 5/1998 | Daems et al. |
| 5,754,724 A | 5/1998 | Peterson et al. |
| 5,758,003 A | 5/1998 | Wheeler et al. |
| 5,758,004 A | 5/1998 | Alarcon et al. |
| 5,761,026 A | 6/1998 | Robinson et al. |
| 5,765,698 A | 6/1998 | Bullivant |
| 5,769,908 A | 6/1998 | Koppelman |
| 5,774,612 A | 6/1998 | Belenkiy et al. |
| 5,778,122 A | 7/1998 | Giebel et al. |
| 5,778,130 A | 7/1998 | Walters et al. |
| 5,781,686 A | 7/1998 | Robinson et al. |
| 5,788,087 A | 8/1998 | Orlando |
| 5,790,741 A | 8/1998 | Vincent et al. |
| 5,793,920 A | 8/1998 | Wilkins et al. |
| 5,793,921 A | 8/1998 | Wilkins et al. |
| 5,796,908 A | 8/1998 | Vicory |
| 5,806,687 A | 9/1998 | Ballesteros et al. |
| 5,823,646 A | 10/1998 | Arizpe et al. |
| 5,825,955 A | 10/1998 | Ernst et al. |
| 5,825,961 A | 10/1998 | Wilkins et al. |
| 5,828,807 A | 10/1998 | Tucker et al. |
| 5,832,162 A | 11/1998 | Sarbell |
| 5,835,657 A | 11/1998 | Suarez et al. |
| 5,835,658 A | 11/1998 | Smith |
| 5,862,290 A | 1/1999 | Burek et al. |
| 5,870,519 A | 2/1999 | Jenkins et al. |
| 5,874,733 A | 2/1999 | Silver et al. |
| 5,877,565 A | 3/1999 | Hollenbach et al. |
| 5,880,864 A | 3/1999 | Williams et al. |
| 5,881,200 A | 3/1999 | Burt |
| 5,883,995 A | 3/1999 | Lu et al. |
| 5,884,003 A | 3/1999 | Cloud et al. |
| 5,887,095 A | 3/1999 | Nagase et al. |
| 5,887,106 A | 3/1999 | Cheeseman et al. |
| 5,892,877 A | 4/1999 | Meyerhoefer |
| 5,894,540 A | 4/1999 | Drewing |
| 5,901,220 A | 5/1999 | Garver et al. |
| 5,903,693 A | 5/1999 | Brown |
| 5,906,342 A | 5/1999 | Kraus |
| 5,909,298 A | 6/1999 | Shimada et al. |
| 5,913,006 A | 6/1999 | Summach |
| 5,914,976 A | 6/1999 | Jayaraman et al. |
| 5,915,055 A | 6/1999 | Bennett et al. |
| 5,923,804 A | 7/1999 | Rosson |
| 5,930,425 A | 7/1999 | Abel et al. |
| 5,933,557 A | 8/1999 | Ott |
| 5,940,563 A | 8/1999 | Kobayashi et al. |
| 5,943,460 A | 8/1999 | Mead et al. |
| 5,945,633 A | 8/1999 | Ott et al. |
| 5,946,440 A | 8/1999 | Puetz |
| 5,949,946 A | 9/1999 | Debortoli et al. |
| 5,953,962 A | 9/1999 | Hewson |
| 5,956,439 A | 9/1999 | Pimpinella |
| 5,956,444 A | 9/1999 | Duda et al. |
| 5,956,449 A | 9/1999 | Otani et al. |
| 5,966,492 A | 10/1999 | Bechamps et al. |
| 5,969,294 A | 10/1999 | Eberle et al. |
| 5,975,769 A | 11/1999 | Larson et al. |
| 5,978,540 A * | 11/1999 | Bechamps ........... G02B 6/4455 385/134 |
| 5,980,303 A | 11/1999 | Lee et al. |

(56) References Cited

U.S. PATENT DOCUMENTS

| | | |
|---|---|---|
| 5,984,531 A | 11/1999 | Lu |
| 5,987,203 A | 11/1999 | Abel et al. |
| 5,993,071 A | 11/1999 | Hultermans |
| 5,995,700 A | 11/1999 | Burek et al. |
| 5,999,393 A | 12/1999 | Brower |
| 6,001,831 A | 12/1999 | Papenfuhs et al. |
| 6,009,224 A | 12/1999 | Allen |
| 6,009,225 A | 12/1999 | Ray et al. |
| 6,011,831 A | 1/2000 | Nieves et al. |
| 6,027,252 A | 2/2000 | Erdman et al. |
| 6,027,352 A | 2/2000 | Byrne |
| 6,041,042 A | 3/2000 | Bussiere |
| 6,044,193 A | 3/2000 | Szentesi et al. |
| 6,044,194 A | 3/2000 | Meyerhoefer |
| 6,049,963 A | 4/2000 | Boe |
| 6,058,235 A | 5/2000 | Hiramatsu et al. |
| 6,061,492 A | 5/2000 | Strause et al. |
| 6,078,661 A | 6/2000 | Arnett et al. |
| 6,079,881 A | 6/2000 | Roth |
| 6,088,497 A | 7/2000 | Phillips et al. |
| 6,118,075 A | 9/2000 | Baker et al. |
| 6,118,868 A | 9/2000 | Daoud |
| 6,127,627 A | 10/2000 | Daoud |
| 6,130,983 A | 10/2000 | Cheng |
| 6,134,370 A | 10/2000 | Childers et al. |
| 6,141,222 A | 10/2000 | Toor et al. |
| 6,142,676 A | 11/2000 | Lu |
| 6,149,313 A | 11/2000 | Giebel et al. |
| 6,149,315 A | 11/2000 | Stephenson |
| 6,151,432 A | 11/2000 | Nakajima et al. |
| 6,157,766 A | 12/2000 | Laniepce et al. |
| 6,160,946 A | 12/2000 | Thompson et al. |
| 6,170,784 B1 | 1/2001 | MacDonald et al. |
| 6,172,782 B1 | 1/2001 | Kobayashi |
| 6,175,079 B1 | 1/2001 | Johnston et al. |
| 6,181,861 B1 | 1/2001 | Wenski et al. |
| 6,188,687 B1 | 2/2001 | Mussman et al. |
| 6,188,825 B1 | 2/2001 | Bandy et al. |
| 6,192,180 B1 | 2/2001 | Kim et al. |
| 6,200,170 B1 | 3/2001 | Amberg et al. |
| 6,201,919 B1 | 3/2001 | Puetz et al. |
| 6,201,920 B1 | 3/2001 | Noble et al. |
| 6,208,796 B1 | 3/2001 | Williams Vigliaturo |
| 6,212,324 B1 | 4/2001 | Lin et al. |
| 6,215,938 B1 | 4/2001 | Reitmeier et al. |
| 6,216,987 B1 | 4/2001 | Fukuo |
| 6,227,717 B1 | 5/2001 | Ott et al. |
| 6,229,948 B1 | 5/2001 | Blee et al. |
| 6,234,683 B1 | 5/2001 | Waldron et al. |
| 6,234,685 B1 | 5/2001 | Carlisle et al. |
| 6,236,795 B1 | 5/2001 | Rodgers |
| 6,240,229 B1 | 5/2001 | Roth |
| 6,243,522 B1 | 6/2001 | Allan et al. |
| 6,245,998 B1 | 6/2001 | Curry et al. |
| 6,247,851 B1 | 6/2001 | Ichihara |
| 6,250,816 B1 | 6/2001 | Johnston et al. |
| 6,256,210 B1 | 7/2001 | Strijker et al. |
| 6,259,850 B1 | 7/2001 | Crosby, Jr. et al. |
| 6,259,856 B1 | 7/2001 | Shahid |
| 6,263,141 B1 | 7/2001 | Smith |
| 6,265,680 B1 | 7/2001 | Robertson |
| 6,269,212 B1 | 7/2001 | Schiattone |
| 6,273,532 B1 | 8/2001 | Chen et al. |
| 6,275,641 B1 | 8/2001 | Daoud |
| 6,278,829 B1 | 8/2001 | BuAbbud et al. |
| 6,278,831 B1 | 8/2001 | Henderson et al. |
| D448,005 S | 9/2001 | Klein, Jr. et al. |
| 6,289,618 B1 | 9/2001 | Kump et al. |
| 6,292,614 B1 | 9/2001 | Smith et al. |
| 6,301,424 B1 | 10/2001 | Hwang |
| 6,305,848 B1 | 10/2001 | Gregory |
| 6,307,997 B1 | 10/2001 | Walters et al. |
| 6,318,824 B1 | 11/2001 | LaGrotta et al. |
| 6,321,017 B1 | 11/2001 | Janus et al. |
| 6,322,279 B1 | 11/2001 | Yamamoto et al. |
| 6,324,575 B1 | 11/2001 | Jain et al. |
| 6,325,549 B1 | 12/2001 | Shevchuk |
| 6,327,059 B1 | 12/2001 | Bhalla et al. |
| RE37,489 E | 1/2002 | Anton et al. |
| 6,343,313 B1 | 1/2002 | Salesky et al. |
| 6,344,615 B1 | 2/2002 | Nolf et al. |
| 6,347,888 B1 | 2/2002 | Puetz |
| 6,351,587 B1 | 2/2002 | Holland |
| 6,353,696 B1 | 3/2002 | Gordon et al. |
| 6,353,697 B1 | 3/2002 | Daoud |
| 6,357,712 B1 | 3/2002 | Lu |
| 6,359,228 B1 | 3/2002 | Strause et al. |
| 6,362,422 B1 | 3/2002 | Vavrik et al. |
| 6,363,198 B1 | 3/2002 | Braga et al. |
| 6,363,200 B1 | 3/2002 | Thompson et al. |
| 6,370,309 B1 | 4/2002 | Daoud |
| 6,371,419 B1 | 4/2002 | Ohnuki |
| 6,375,129 B2 | 4/2002 | Koziol |
| 6,377,218 B1 | 4/2002 | Nelson et al. |
| 6,379,052 B1 | 4/2002 | De Jong et al. |
| 6,381,642 B1 | 4/2002 | O'Donnell et al. |
| 6,385,374 B2 | 5/2002 | Kropp |
| 6,385,381 B1 | 5/2002 | Janus et al. |
| 6,389,214 B1 | 5/2002 | Smith et al. |
| 6,392,140 B1 | 5/2002 | Yee et al. |
| 6,397,166 B1 | 5/2002 | Leung et al. |
| 6,398,149 B1 | 6/2002 | Hines et al. |
| 6,406,314 B1 | 6/2002 | Byrne |
| 6,410,850 B1 | 6/2002 | Abel et al. |
| 6,411,767 B1 | 6/2002 | Burrous et al. |
| 6,412,986 B1 | 7/2002 | Ngo et al. |
| 6,418,262 B1 | 7/2002 | Puetz et al. |
| 6,419,519 B1 | 7/2002 | Young |
| 6,424,781 B1 | 7/2002 | Puetz et al. |
| 6,425,694 B1 | 7/2002 | Szilagyi et al. |
| 6,427,045 B1 | 7/2002 | Matthes et al. |
| 6,431,762 B1 | 8/2002 | Taira et al. |
| 6,434,313 B1 | 8/2002 | Clapp, Jr. et al. |
| 6,438,310 B1 * | 8/2002 | Lance .................. G02B 6/4452 385/135 |
| 6,452,925 B1 | 9/2002 | Sistanizadeh et al. |
| 6,456,773 B1 | 9/2002 | Keys |
| 6,464,402 B1 | 10/2002 | Andrews et al. |
| 6,466,724 B1 | 10/2002 | Glover et al. |
| 6,469,905 B1 | 10/2002 | Hwang |
| D466,087 S | 11/2002 | Cuny et al. |
| 6,478,472 B1 | 11/2002 | Anderson et al. |
| 6,480,487 B1 | 11/2002 | Wegleitner et al. |
| 6,480,660 B1 | 11/2002 | Reitmeier et al. |
| 6,483,977 B2 | 11/2002 | Battey et al. |
| 6,484,958 B1 | 11/2002 | Xue et al. |
| 6,494,550 B1 | 12/2002 | Chen et al. |
| 6,496,640 B1 | 12/2002 | Harvey et al. |
| 6,504,988 B1 | 1/2003 | Trebesch et al. |
| 6,507,980 B2 | 1/2003 | Bremicker |
| 6,510,274 B1 | 1/2003 | Wu et al. |
| 6,532,332 B2 | 3/2003 | Solheid et al. |
| 6,533,472 B1 | 3/2003 | Dinh et al. |
| 6,535,397 B2 | 3/2003 | Clark et al. |
| 6,537,106 B1 | 3/2003 | Follingstad |
| 6,539,147 B1 | 3/2003 | Mahony |
| 6,539,160 B2 | 3/2003 | Battey et al. |
| 6,542,688 B1 | 4/2003 | Battey et al. |
| 6,544,075 B1 | 4/2003 | Liao |
| 6,545,611 B2 | 4/2003 | Hayashi et al. |
| 6,550,977 B2 | 4/2003 | Hizuka |
| 6,554,485 B1 | 4/2003 | Beatty et al. |
| 6,560,334 B1 | 5/2003 | Mullaney et al. |
| 6,567,601 B2 | 5/2003 | Daoud et al. |
| 6,568,542 B1 | 5/2003 | Chen |
| 6,571,048 B1 | 5/2003 | Bechamps et al. |
| 6,577,595 B1 | 6/2003 | Counterman |
| 6,577,801 B2 | 6/2003 | Broderick et al. |
| 6,579,014 B2 | 6/2003 | Melton et al. |
| 6,584,267 B1 | 6/2003 | Caveney et al. |
| 6,585,423 B1 | 7/2003 | Vergeest |
| 6,587,630 B2 | 7/2003 | Spence et al. |
| 6,588,938 B1 | 7/2003 | Lampert et al. |
| 6,591,051 B2 | 7/2003 | Solheid et al. |

(56) References Cited

U.S. PATENT DOCUMENTS

| | | | |
|---|---|---|---|
| 6,591,053 B2 | 7/2003 | Fritz |
| 6,592,266 B1 | 7/2003 | Hankins et al. |
| 6,597,670 B1 | 7/2003 | Tweedy et al. |
| 6,600,106 B2 | 7/2003 | Standish et al. |
| 6,600,866 B2 | 7/2003 | Gatica et al. |
| 6,601,997 B2 | 8/2003 | Ngo |
| 6,612,515 B1 | 9/2003 | Tinucci et al. |
| 6,612,874 B1 | 9/2003 | Stout et al. |
| 6,614,978 B1 | 9/2003 | Caveney |
| 6,614,980 B1 | 9/2003 | Mahony |
| 6,621,975 B2 | 9/2003 | Laporte et al. |
| 6,622,873 B2 | 9/2003 | Hegrenes et al. |
| 6,624,389 B1 | 9/2003 | Cox |
| 6,625,374 B2 | 9/2003 | Holman et al. |
| 6,625,375 B1 | 9/2003 | Mahony |
| 6,631,237 B2 | 10/2003 | Knudsen et al. |
| 6,640,042 B2 | 10/2003 | Araki et al. |
| RE38,311 E | 11/2003 | Wheeler |
| 6,644,863 B1 | 11/2003 | Azami et al. |
| 6,647,197 B1 * | 11/2003 | Marrs | G02B 6/4455 385/134 |
| 6,648,520 B2 | 11/2003 | McDonald et al. |
| 6,654,536 B2 | 11/2003 | Battey et al. |
| 6,668,127 B1 | 12/2003 | Mahony |
| 6,669,149 B2 | 12/2003 | Akizuki |
| 6,677,520 B1 | 1/2004 | Kim et al. |
| 6,679,604 B1 | 1/2004 | Bove et al. |
| 6,687,450 B1 | 2/2004 | Kempeneers et al. |
| 6,693,552 B1 | 2/2004 | Herzig et al. |
| 6,695,620 B1 | 2/2004 | Huang |
| 6,700,654 B2 | 3/2004 | Gerrish et al. |
| 6,701,056 B2 | 3/2004 | Burek et al. |
| 6,710,366 B1 | 3/2004 | Lee et al. |
| 6,715,619 B2 | 4/2004 | Kim et al. |
| 6,719,149 B2 | 4/2004 | Tomino |
| 6,721,482 B1 | 4/2004 | Glynn |
| 6,728,462 B2 | 4/2004 | Wu et al. |
| 6,736,670 B2 | 5/2004 | Clark et al. |
| 6,741,784 B1 | 5/2004 | Guan |
| 6,741,785 B2 | 5/2004 | Barthel et al. |
| 6,746,037 B1 | 6/2004 | Kaplenski et al. |
| 6,748,154 B2 | 6/2004 | O'Leary et al. |
| 6,748,155 B2 | 6/2004 | Kim et al. |
| 6,758,600 B2 * | 7/2004 | Del Grosso | G02B 6/4471 385/59 |
| 6,761,585 B2 | 7/2004 | Clark et al. |
| 6,768,860 B2 | 7/2004 | Liberty |
| 6,771,861 B2 | 8/2004 | Wagner et al. |
| 6,773,297 B2 | 8/2004 | Komiya |
| 6,778,525 B1 | 8/2004 | Baum et al. |
| 6,778,752 B2 | 8/2004 | Laporte et al. |
| 6,786,647 B1 | 9/2004 | Hinds et al. |
| 6,786,743 B2 | 9/2004 | Huang |
| 6,786,896 B1 | 9/2004 | Madhani et al. |
| 6,788,871 B2 | 9/2004 | Taylor |
| 6,792,190 B2 | 9/2004 | Xin et al. |
| 6,792,191 B1 | 9/2004 | Clapp, Jr. et al. |
| 6,798,751 B1 | 9/2004 | Voit et al. |
| 6,804,447 B2 | 10/2004 | Smith et al. |
| 6,810,194 B2 | 10/2004 | Griffiths et al. |
| 6,813,412 B2 | 11/2004 | Lin |
| 6,816,660 B2 | 11/2004 | Nashimoto |
| 6,818,834 B1 | 11/2004 | Lin |
| 6,819,856 B2 | 11/2004 | Dagley et al. |
| 6,819,857 B2 | 11/2004 | Douglas et al. |
| 6,822,874 B1 | 11/2004 | Marler |
| 6,826,174 B1 | 11/2004 | Erekson et al. |
| 6,826,346 B2 | 11/2004 | Sloan et al. |
| 6,826,631 B2 | 11/2004 | Webb |
| 6,830,489 B2 | 12/2004 | Aoyama |
| 6,839,428 B2 | 1/2005 | Brower et al. |
| 6,839,438 B1 | 1/2005 | Riegelsberger et al. |
| 6,840,815 B2 | 1/2005 | Musolf et al. |
| 6,845,207 B2 | 1/2005 | Schray |
| 6,847,614 B2 | 1/2005 | Banker et al. |
| 6,848,862 B1 | 2/2005 | Schlig |
| 6,850,685 B2 | 2/2005 | Tinucci et al. |
| 6,853,637 B1 | 2/2005 | Norrell et al. |
| 6,854,894 B1 | 2/2005 | Yunker et al. |
| 6,856,334 B1 | 2/2005 | Fukui |
| 6,856,505 B1 | 2/2005 | Venegas et al. |
| 6,863,444 B2 | 3/2005 | Anderson et al. |
| 6,865,331 B2 | 3/2005 | Mertesdorf |
| 6,865,334 B2 | 3/2005 | Cooke et al. |
| 6,866,541 B2 | 3/2005 | Barker et al. |
| 6,868,216 B2 | 3/2005 | Gehrke |
| 6,869,227 B2 | 3/2005 | Del Grosso et al. |
| 6,870,734 B2 | 3/2005 | Mertesdorf et al. |
| 6,870,997 B2 | 3/2005 | Cooke |
| 6,879,545 B2 | 4/2005 | Cooke et al. |
| 6,915,058 B2 | 7/2005 | Pons |
| 6,916,199 B2 | 7/2005 | Follingstad |
| 6,918,786 B2 | 7/2005 | Barker et al. |
| 6,920,273 B2 | 7/2005 | Knudsen |
| 6,920,274 B2 * | 7/2005 | Rapp | G02B 6/4453 385/135 |
| 6,923,406 B2 | 8/2005 | Akizuki |
| 6,925,241 B2 | 8/2005 | Bohle et al. |
| 6,934,451 B2 | 8/2005 | Cooke |
| 6,934,456 B2 | 8/2005 | Ferris et al. |
| 6,935,598 B2 | 8/2005 | Sono et al. |
| 6,937,807 B2 | 8/2005 | Franklin et al. |
| 6,944,383 B1 | 9/2005 | Herzog et al. |
| 6,944,389 B2 * | 9/2005 | Giraud | G02B 6/4455 385/134 |
| 6,945,701 B2 | 9/2005 | Trezza et al. |
| 6,952,530 B2 | 10/2005 | Helvajian et al. |
| 6,963,690 B1 | 11/2005 | Kassal et al. |
| 6,968,107 B2 | 11/2005 | Belardi et al. |
| 6,968,111 B2 | 11/2005 | Trebesch et al. |
| 6,971,909 B2 | 12/2005 | Levesque et al. |
| 6,974,348 B2 | 12/2005 | Bentley |
| 6,980,725 B1 * | 12/2005 | Swieconek | G02B 6/4452 385/135 |
| 6,981,893 B2 | 1/2006 | Barker et al. |
| 6,985,665 B2 | 1/2006 | Baechtle |
| 6,993,237 B2 | 1/2006 | Cooke et al. |
| 7,000,784 B2 | 2/2006 | Canty et al. |
| 7,005,582 B2 | 2/2006 | Muller et al. |
| 7,006,748 B2 | 2/2006 | Dagley et al. |
| 7,007,296 B2 | 2/2006 | Rakib |
| 7,025,275 B2 | 4/2006 | Huang et al. |
| 7,027,695 B2 | 4/2006 | Cooke et al. |
| 7,027,706 B2 | 4/2006 | Diaz et al. |
| 7,031,588 B2 | 4/2006 | Cowley et al. |
| 7,035,510 B2 | 4/2006 | Zimmel et al. |
| 7,038,137 B2 | 5/2006 | Grubish et al. |
| 7,048,447 B1 | 5/2006 | Patel et al. |
| 7,054,513 B2 | 5/2006 | Herz et al. |
| 7,059,887 B1 * | 6/2006 | Liu | H01R 13/65802 385/136 |
| 7,066,748 B2 | 6/2006 | Bricaud et al. |
| 7,066,771 B2 | 6/2006 | Clark et al. |
| 7,068,907 B2 | 6/2006 | Schray |
| 7,070,459 B2 | 7/2006 | Denovich et al. |
| 7,077,710 B2 | 7/2006 | Haggay et al. |
| 7,079,744 B2 | 7/2006 | Douglas et al. |
| 7,090,406 B2 | 8/2006 | Melton et al. |
| 7,090,407 B2 | 8/2006 | Melton et al. |
| 7,094,095 B1 | 8/2006 | Caveney |
| 7,097,047 B2 | 8/2006 | Lee et al. |
| 7,101,093 B2 | 9/2006 | Hsiao et al. |
| 7,102,884 B2 | 9/2006 | Mertesdorf et al. |
| 7,103,255 B2 | 9/2006 | Reagan et al. |
| 7,110,654 B2 | 9/2006 | Dillat |
| 7,111,990 B2 | 9/2006 | Melton et al. |
| 7,113,679 B2 | 9/2006 | Melton et al. |
| 7,113,686 B2 | 9/2006 | Bellekens et al. |
| 7,113,687 B2 | 9/2006 | Womack et al. |
| 7,116,491 B1 | 10/2006 | Willey et al. |
| 7,116,883 B2 | 10/2006 | Kline et al. |
| 7,118,281 B2 | 10/2006 | Chiu et al. |
| 7,118,405 B2 | 10/2006 | Peng |
| 7,120,347 B2 | 10/2006 | Blackwell, Jr. et al. |

(56) References Cited

U.S. PATENT DOCUMENTS

| | | |
|---|---|---|
| 7,120,348 B2 | 10/2006 | Trebesch et al. |
| 7,120,349 B2 | 10/2006 | Elliott |
| 7,127,143 B2 | 10/2006 | Elkins, II et al. |
| 7,128,471 B2 | 10/2006 | Wilson |
| 7,136,555 B2 | 11/2006 | Theuerkorn et al. |
| 7,139,462 B1 | 11/2006 | Richtman |
| 7,140,903 B2 | 11/2006 | Pulizzi et al. |
| 7,147,383 B2 | 12/2006 | Sullivan |
| 7,170,466 B2 | 1/2007 | Janoschka |
| 7,171,099 B2 | 1/2007 | Barnes et al. |
| 7,171,121 B1 | 1/2007 | Skarica et al. |
| 7,179,119 B2 | 2/2007 | Follingstad |
| 7,181,142 B1 | 2/2007 | Xu et al. |
| 7,186,134 B2 | 3/2007 | Togami et al. |
| 7,193,783 B2 | 3/2007 | Willey et al. |
| 7,194,181 B2 | 3/2007 | Holmberg et al. |
| 7,195,521 B2 | 3/2007 | Musolf et al. |
| 7,200,314 B2 | 4/2007 | Womack et al. |
| 7,200,316 B2 | 4/2007 | Giraud et al. |
| 7,201,595 B1 | 4/2007 | Morello |
| 7,207,835 B2 | 4/2007 | Levesque et al. |
| 7,217,040 B2 | 5/2007 | Crews et al. |
| 7,218,526 B2 | 5/2007 | Mayer |
| 7,220,065 B2 | 5/2007 | Han et al. |
| 7,221,832 B2 | 5/2007 | Tinucci |
| 7,228,036 B2 | 6/2007 | Elkins, II et al. |
| 7,228,047 B1 | 6/2007 | Szilagyi et al. |
| 7,231,125 B2 | 6/2007 | Douglas et al. |
| 7,234,878 B2 | 6/2007 | Yamauchi et al. |
| 7,236,677 B2 | 6/2007 | Escoto et al. |
| 7,239,789 B2 | 7/2007 | Grubish et al. |
| 7,241,182 B2 | 7/2007 | Clark et al. |
| 7,244,144 B2 | 7/2007 | Follingstad |
| 7,245,809 B1 | 7/2007 | Gniadek et al. |
| 7,259,325 B2 | 8/2007 | Pincu et al. |
| 7,266,283 B2 | 9/2007 | Kline et al. |
| 7,270,485 B1 | 9/2007 | Robinson et al. |
| 7,272,291 B2 | 9/2007 | Bayazit et al. |
| 7,274,852 B1 | 9/2007 | Smrha et al. |
| 7,284,785 B2 | 10/2007 | Gotou et al. |
| 7,287,913 B2 | 10/2007 | Keenum et al. |
| 7,289,731 B2 | 10/2007 | Thinguldstad |
| 7,292,769 B2 | 11/2007 | Watanabe et al. |
| 7,298,950 B2 | 11/2007 | Frohlich |
| 7,300,216 B2 | 11/2007 | Morse et al. |
| 7,300,308 B2 | 11/2007 | Laursen et al. |
| 7,302,149 B2 | 11/2007 | Swam et al. |
| 7,302,153 B2 | 11/2007 | Thom |
| 7,302,154 B2 | 11/2007 | Trebesch et al. |
| 7,308,184 B2 | 12/2007 | Barnes et al. |
| 7,310,471 B2 | 12/2007 | Bayazit et al. |
| 7,310,472 B2 | 12/2007 | Haberman |
| 7,315,681 B2 | 1/2008 | Kewitsch |
| 7,325,975 B2 | 2/2008 | Yamada et al. |
| 7,330,624 B2 | 2/2008 | Isenhour et al. |
| 7,330,625 B2 | 2/2008 | Barth |
| 7,330,626 B2 | 2/2008 | Kowalczyk et al. |
| 7,330,629 B2 | 2/2008 | Cooke et al. |
| 7,331,718 B2 | 2/2008 | Yazaki et al. |
| D565,205 S | 3/2008 | Lo et al. |
| 7,340,145 B2 | 3/2008 | Allen |
| 7,349,615 B2 | 3/2008 | Frazier et al. |
| 7,352,946 B2 | 4/2008 | Heller et al. |
| 7,352,947 B2 | 4/2008 | Phung et al. |
| 7,357,667 B2 | 4/2008 | Clark et al. |
| 7,373,071 B2 | 5/2008 | Douglas et al. |
| 7,376,321 B2 | 5/2008 | Bolster et al. |
| 7,376,323 B2 | 5/2008 | Zimmel |
| 7,376,325 B1 | 5/2008 | Cloud et al. |
| 7,391,952 B1 | 6/2008 | Ugolini et al. |
| 7,397,996 B2 | 7/2008 | Herzog et al. |
| 7,400,813 B2 | 7/2008 | Zimmel |
| 7,404,736 B2 | 7/2008 | Herbst et al. |
| 7,409,137 B2 | 8/2008 | Barnes |
| 7,414,198 B2 | 8/2008 | Stansbie et al. |
| 7,417,188 B2 | 8/2008 | McNutt et al. |
| 7,418,182 B2 | 8/2008 | Krampotich |
| 7,418,184 B1 | 8/2008 | Gonzales et al. |
| 7,421,182 B2 | 9/2008 | Bayazit et al. |
| 7,428,363 B2 | 9/2008 | Leon et al. |
| 7,435,090 B1 | 10/2008 | Schriefer et al. |
| 7,437,049 B2 | 10/2008 | Krampotich |
| 7,439,453 B2 | 10/2008 | Murano et al. |
| 7,454,113 B2 | 11/2008 | Barnes |
| 7,460,757 B2 | 12/2008 | Hoehne et al. |
| 7,460,758 B2 | 12/2008 | Xin |
| 7,461,981 B2 | 12/2008 | Yow, Jr. et al. |
| 7,462,779 B2 | 12/2008 | Caveney et al. |
| 7,463,810 B2 | 12/2008 | Bayazit et al. |
| 7,463,811 B2 | 12/2008 | Trebesch et al. |
| 7,469,090 B2 | 12/2008 | Ferris et al. |
| 7,471,867 B2 | 12/2008 | Vogel et al. |
| 7,474,828 B2 | 1/2009 | Leon et al. |
| 7,477,824 B2 | 1/2009 | Reagan et al. |
| 7,477,826 B2 | 1/2009 | Mullaney et al. |
| 7,480,438 B2 | 1/2009 | Douglas et al. |
| 7,488,205 B2 | 2/2009 | Spisany et al. |
| 7,493,002 B2 | 2/2009 | Coburn et al. |
| 7,496,269 B1 | 2/2009 | Lee |
| 7,499,622 B2 | 3/2009 | Castonguay et al. |
| 7,499,623 B2 | 3/2009 | Barnes et al. |
| 7,507,111 B2 | 3/2009 | Togami et al. |
| 7,509,015 B2 | 3/2009 | Murano |
| 7,509,016 B2 | 3/2009 | Smith et al. |
| 7,510,421 B2 | 3/2009 | Fransen et al. |
| 7,522,804 B2 | 4/2009 | Araki et al. |
| 7,523,898 B1 | 4/2009 | Barry et al. |
| 7,526,171 B2 | 4/2009 | Caveney et al. |
| 7,526,172 B2 | 4/2009 | Gniadek et al. |
| 7,526,174 B2 | 4/2009 | Leon et al. |
| 7,529,458 B2 | 5/2009 | Spisany et al. |
| 7,529,485 B2 | 5/2009 | Farmer et al. |
| 7,534,958 B2 | 5/2009 | McNutt et al. |
| 7,536,075 B2 | 5/2009 | Zimmel |
| 7,540,666 B2 | 6/2009 | Luther et al. |
| 7,542,645 B1 | 6/2009 | Hua et al. |
| 7,544,085 B2 | 6/2009 | Baldwin et al. |
| 7,552,899 B2 | 6/2009 | Chen et al. |
| 7,555,193 B2 | 6/2009 | Rapp et al. |
| 7,558,458 B2 | 7/2009 | Gronvall et al. |
| 7,565,051 B2 | 7/2009 | Vongseng |
| 7,567,744 B2 | 7/2009 | Krampotich et al. |
| 7,570,860 B2 * | 8/2009 | Smrha .................. G02B 6/4452 385/134 |
| 7,570,861 B2 | 8/2009 | Smrha et al. |
| 7,577,331 B2 | 8/2009 | Laurisch et al. |
| 7,596,293 B2 | 9/2009 | Isenhour et al. |
| 7,603,020 B1 | 10/2009 | Wakileh et al. |
| 7,607,938 B2 | 10/2009 | Clark et al. |
| 7,609,967 B2 | 10/2009 | Hochbaum et al. |
| 7,613,377 B2 | 11/2009 | Gonzales et al. |
| 7,614,903 B1 | 11/2009 | Huang |
| 7,620,287 B2 | 11/2009 | Appenzeller et al. |
| 7,641,398 B2 | 1/2010 | O'Riorden et al. |
| 7,668,430 B2 | 2/2010 | McClellan et al. |
| 7,668,433 B2 | 2/2010 | Bayazit et al. |
| 7,672,561 B1 | 3/2010 | Keith et al. |
| 7,676,135 B2 | 3/2010 | Chen |
| 7,689,079 B2 | 3/2010 | Burnham et al. |
| 7,689,089 B2 | 3/2010 | Wagner et al. |
| 7,694,926 B2 | 4/2010 | Allen et al. |
| 7,697,811 B2 | 4/2010 | Murano et al. |
| 7,706,294 B2 | 4/2010 | Natarajan et al. |
| 7,715,125 B2 | 5/2010 | Willey |
| 7,715,683 B2 | 5/2010 | Kowalczyk et al. |
| 7,734,138 B2 | 6/2010 | Bloodworth et al. |
| 7,740,409 B2 | 6/2010 | Bolton et al. |
| 7,743,495 B2 | 6/2010 | Mori et al. |
| 7,748,911 B2 | 7/2010 | Keenum et al. |
| 7,751,674 B2 | 7/2010 | Hill |
| 7,751,675 B2 | 7/2010 | Holmberg et al. |
| 7,756,371 B1 | 7/2010 | Burnham et al. |
| 7,756,382 B2 | 7/2010 | Saravanos et al. |
| 7,760,984 B2 | 7/2010 | Solheid et al. |

(56) References Cited

U.S. PATENT DOCUMENTS

| | | |
|---|---|---|
| 7,764,858 B2 | 7/2010 | Bayazit et al. |
| 7,764,859 B2 | 7/2010 | Krampotich et al. |
| 7,769,266 B2 | 8/2010 | Morris |
| 7,805,044 B2 | 9/2010 | Reagan et al. |
| 7,809,232 B2 | 10/2010 | Reagan et al. |
| 7,809,235 B2 | 10/2010 | Reagan et al. |
| 7,811,136 B1 | 10/2010 | Hsieh et al. |
| 7,822,310 B2 | 10/2010 | Castonguay et al. |
| 7,822,340 B2 | 10/2010 | Matityahu et al. |
| 7,837,495 B2 | 11/2010 | Baldwin et al. |
| 7,850,372 B2 | 12/2010 | Nishimura et al. |
| 7,853,112 B2 * | 12/2010 | Zimmel .............. G02B 6/4452 385/134 |
| 7,856,166 B2 | 12/2010 | Biribuze et al. |
| 7,862,369 B2 | 1/2011 | Gimenes et al. |
| 7,869,685 B2 | 1/2011 | Hendrickson et al. |
| 7,876,580 B2 | 1/2011 | Mayer |
| 7,899,298 B2 | 3/2011 | Cox et al. |
| 7,914,332 B2 | 3/2011 | Song et al. |
| 7,941,053 B2 | 5/2011 | Dallesasse |
| 7,942,589 B2 | 5/2011 | Yazaki et al. |
| 7,945,135 B2 | 5/2011 | Cooke et al. |
| 7,945,136 B2 | 5/2011 | Cooke et al. |
| 7,945,138 B2 | 5/2011 | Hill et al. |
| 7,970,250 B2 | 6/2011 | Morris |
| 7,991,252 B2 | 8/2011 | Cheng et al. |
| 8,009,959 B2 | 8/2011 | Barnes et al. |
| 8,014,171 B2 | 9/2011 | Kelly et al. |
| 8,014,646 B2 | 9/2011 | Keith et al. |
| 8,020,813 B1 | 9/2011 | Clark et al. |
| 8,059,932 B2 | 11/2011 | Hill et al. |
| 8,093,499 B2 | 1/2012 | Hoffer et al. |
| 8,107,785 B2 | 1/2012 | Berglund et al. |
| 8,131,126 B2 | 3/2012 | Kowalczyk et al. |
| 8,184,938 B2 | 5/2012 | Cooke et al. |
| 8,206,043 B2 | 6/2012 | Thirugnanam et al. |
| 8,206,058 B2 | 6/2012 | Vrondran et al. |
| 8,220,881 B2 | 7/2012 | Keith |
| 8,226,305 B2 | 7/2012 | Thirugnanam et al. |
| 8,249,410 B2 | 8/2012 | Andrus et al. |
| 8,251,591 B2 | 8/2012 | Barnes et al. |
| 8,270,798 B2 | 9/2012 | Dagley et al. |
| 8,280,216 B2 | 10/2012 | Cooke et al. |
| 8,285,104 B2 | 10/2012 | Davis et al. |
| 8,301,004 B2 | 10/2012 | Cooke et al. |
| 8,331,752 B2 | 12/2012 | Biribuze |
| 8,353,494 B2 | 1/2013 | Peng et al. |
| 8,369,679 B2 | 2/2013 | Wakileh et al. |
| 8,391,666 B2 | 3/2013 | Hetzer et al. |
| 8,452,148 B2 | 5/2013 | Cooke et al. |
| 8,472,773 B2 | 6/2013 | de Jong |
| 8,491,331 B2 | 7/2013 | Follingstad |
| 8,528,872 B2 | 9/2013 | Mattlin et al. |
| 8,537,477 B2 | 9/2013 | Shioda |
| 8,538,226 B2 | 9/2013 | Makrides-Saravanos et al. |
| 8,559,783 B2 | 10/2013 | Campos et al. |
| 8,712,206 B2 | 4/2014 | Cooke et al. |
| 8,824,850 B2 | 9/2014 | Garcia et al. |
| 8,861,918 B2 | 10/2014 | Vazquez et al. |
| 8,879,991 B2 | 11/2014 | Kim |
| 9,020,320 B2 | 4/2015 | Cooke et al. |
| 2001/0010741 A1 | 8/2001 | Hizuka |
| 2001/0029125 A1 | 10/2001 | Morita et al. |
| 2002/0010818 A1 | 1/2002 | Wei et al. |
| 2002/0012353 A1 | 1/2002 | Gerszberg et al. |
| 2002/0014571 A1 | 2/2002 | Thompson |
| 2002/0034290 A1 | 3/2002 | Pershan |
| 2002/0037139 A1 | 3/2002 | Asao et al. |
| 2002/0064364 A1 | 5/2002 | Battey et al. |
| 2002/0117942 A1 | 8/2002 | Audibert et al. |
| 2002/0131730 A1 | 9/2002 | Keeble et al. |
| 2002/0136519 A1 | 9/2002 | Tinucci et al. |
| 2002/0141724 A1 | 10/2002 | Ogawa et al. |
| 2002/0145858 A1 * | 10/2002 | Hayashi .............. H05K 7/1425 361/798 |
| 2002/0150370 A1 | 10/2002 | Battey et al. |
| 2002/0150372 A1 | 10/2002 | Schray |
| 2002/0172467 A1 | 11/2002 | Anderson et al. |
| 2002/0180163 A1 | 12/2002 | Muller et al. |
| 2002/0181918 A1 | 12/2002 | Spence et al. |
| 2002/0181922 A1 | 12/2002 | Xin et al. |
| 2002/0191939 A1 | 12/2002 | Daoud et al. |
| 2002/0194596 A1 | 12/2002 | Srivastava |
| 2003/0002802 A1 | 1/2003 | Trezza et al. |
| 2003/0007743 A1 | 1/2003 | Asada |
| 2003/0007767 A1 | 1/2003 | Douglas et al. |
| 2003/0011855 A1 | 1/2003 | Fujiwara |
| 2003/0021539 A1 | 1/2003 | Kwon et al. |
| 2003/0022552 A1 | 1/2003 | Barker et al. |
| 2003/0036748 A1 | 2/2003 | Cooper et al. |
| 2003/0047524 A1 | 3/2003 | Sato et al. |
| 2003/0051026 A1 | 3/2003 | Carter et al. |
| 2003/0066998 A1 | 4/2003 | Lee |
| 2003/0086675 A1 | 5/2003 | Wu et al. |
| 2003/0095753 A1 | 5/2003 | Wada et al. |
| 2003/0096536 A1 | 5/2003 | Clark et al. |
| 2003/0123834 A1 | 7/2003 | Burek et al. |
| 2003/0129871 A1 | 7/2003 | Follingstad |
| 2003/0134541 A1 * | 7/2003 | Johnsen .............. H01R 13/514 439/668 |
| 2003/0147604 A1 | 8/2003 | Tapia et al. |
| 2003/0156552 A1 | 8/2003 | Banker et al. |
| 2003/0174996 A1 | 9/2003 | Henschel et al. |
| 2003/0180004 A1 | 9/2003 | Cox et al. |
| 2003/0180012 A1 | 9/2003 | Deane et al. |
| 2003/0183413 A1 | 10/2003 | Kato |
| 2003/0199201 A1 | 10/2003 | Mullaney et al. |
| 2003/0210882 A1 | 11/2003 | Barthel et al. |
| 2003/0223723 A1 | 12/2003 | Massey et al. |
| 2003/0223725 A1 | 12/2003 | Laporte et al. |
| 2003/0235387 A1 | 12/2003 | Dufour |
| 2004/0001717 A1 | 1/2004 | Bennett et al. |
| 2004/0008984 A1 | 1/2004 | Gerrish et al. |
| 2004/0013389 A1 | 1/2004 | Taylor |
| 2004/0013390 A1 | 1/2004 | Kim et al. |
| 2004/0022494 A1 | 2/2004 | Liddle et al. |
| 2004/0024934 A1 | 2/2004 | Webb |
| 2004/0038594 A1 | 2/2004 | Clark et al. |
| 2004/0067036 A1 | 4/2004 | Clark et al. |
| 2004/0074852 A1 | 4/2004 | Knudsen et al. |
| 2004/0086238 A1 | 5/2004 | Finona et al. |
| 2004/0086252 A1 | 5/2004 | Smith et al. |
| 2004/0120259 A1 | 6/2004 | Jones et al. |
| 2004/0120679 A1 | 6/2004 | Vincent et al. |
| 2004/0120681 A1 | 6/2004 | Bohle et al. |
| 2004/0147159 A1 | 7/2004 | Urban et al. |
| 2004/0151465 A1 | 8/2004 | Krampotich et al. |
| 2004/0175090 A1 | 9/2004 | Vastmans et al. |
| 2004/0192115 A1 | 9/2004 | Bugg |
| 2004/0196841 A1 | 10/2004 | Tudor et al. |
| 2004/0208459 A1 | 10/2004 | Mizue et al. |
| 2004/0219829 A1 | 11/2004 | Clark et al. |
| 2004/0228598 A1 | 11/2004 | Allen et al. |
| 2004/0240827 A1 | 12/2004 | Daoud et al. |
| 2004/0240882 A1 | 12/2004 | Lipski et al. |
| 2004/0256138 A1 | 12/2004 | Grubish et al. |
| 2004/0264873 A1 | 12/2004 | Smith et al. |
| 2005/0002633 A1 | 1/2005 | Solheid et al. |
| 2005/0008131 A1 | 1/2005 | Cook |
| 2005/0025444 A1 | 2/2005 | Barnes et al. |
| 2005/0026497 A1 | 2/2005 | Holliday |
| 2005/0036749 A1 | 2/2005 | Vogel et al. |
| 2005/0041947 A1 | 2/2005 | Barker et al. |
| 2005/0067358 A1 | 3/2005 | Lee et al. |
| 2005/0069248 A1 | 3/2005 | Jasti et al. |
| 2005/0074990 A1 | 4/2005 | Shearman et al. |
| 2005/0076149 A1 | 4/2005 | McKown et al. |
| 2005/0083959 A1 | 4/2005 | Binder |
| 2005/0103515 A1 | 5/2005 | Fuller et al. |
| 2005/0107086 A1 | 5/2005 | Tell et al. |
| 2005/0111809 A1 | 5/2005 | Giraud et al. |
| 2005/0123261 A1 | 6/2005 | Bellekens et al. |
| 2005/0129379 A1 | 6/2005 | Reagan et al. |
| 2005/0142910 A1 | 6/2005 | Levesque et al. |

(56) References Cited

U.S. PATENT DOCUMENTS

| | | |
|---|---|---|
| 2005/0142932 A1 | 6/2005 | Levesque et al. |
| 2005/0178573 A1 | 8/2005 | James |
| 2005/0185912 A1 | 8/2005 | Levesque et al. |
| 2005/0191901 A1 | 9/2005 | Follingstad |
| 2005/0201073 A1 | 9/2005 | Pincu et al. |
| 2005/0215112 A1 | 9/2005 | Barker et al. |
| 2005/0232566 A1 | 10/2005 | Rapp et al. |
| 2005/0233647 A1 | 10/2005 | Denovich et al. |
| 2005/0237721 A1 | 10/2005 | Cowley et al. |
| 2005/0254757 A1 | 11/2005 | Ferretti, III et al. |
| 2005/0265013 A1 | 12/2005 | Keith et al. |
| 2005/0281526 A1 | 12/2005 | Vongseng et al. |
| 2005/0285493 A1 | 12/2005 | Hu et al. |
| 2006/0007562 A1 | 1/2006 | Willey et al. |
| 2006/0018448 A1 | 1/2006 | Stevens et al. |
| 2006/0018622 A1 | 1/2006 | Caveney et al. |
| 2006/0025011 A1 | 2/2006 | Follingstad |
| 2006/0029353 A1 | 2/2006 | Bolster et al. |
| 2006/0034048 A1 | 2/2006 | Xu |
| 2006/0039290 A1 | 2/2006 | Roden et al. |
| 2006/0044774 A1 | 3/2006 | Vasavda et al. |
| 2006/0045458 A1 | 3/2006 | Sasaki et al. |
| 2006/0062538 A1 | 3/2006 | Araki et al. |
| 2006/0063421 A1 | 3/2006 | Barker et al. |
| 2006/0072606 A1 | 4/2006 | Posthuma |
| 2006/0077968 A1 | 4/2006 | Pitsoulakis et al. |
| 2006/0093303 A1 | 5/2006 | Reagan et al. |
| 2006/0103270 A1 | 5/2006 | Bergesch et al. |
| 2006/0127026 A1 | 6/2006 | Beck |
| 2006/0133736 A1 | 6/2006 | Sullivan |
| 2006/0133759 A1 | 6/2006 | Mullaney et al. |
| 2006/0134972 A1 | 6/2006 | Barker et al. |
| 2006/0147171 A1 | 7/2006 | Dofher |
| 2006/0147172 A1 | 7/2006 | Luther et al. |
| 2006/0153517 A1 | 7/2006 | Reagan et al. |
| 2006/0154513 A1 | 7/2006 | Barker et al. |
| 2006/0160377 A1 | 7/2006 | Huang |
| 2006/0165365 A1 | 7/2006 | Feustel et al. |
| 2006/0165366 A1 | 7/2006 | Feustel et al. |
| 2006/0191700 A1 | 8/2006 | Herzog et al. |
| 2006/0193590 A1 | 8/2006 | Puetz et al. |
| 2006/0193591 A1 | 8/2006 | Rapp et al. |
| 2006/0194470 A1 | 8/2006 | Caveney |
| 2006/0194471 A1 | 8/2006 | Clark et al. |
| 2006/0198098 A1 | 9/2006 | Clark et al. |
| 2006/0204179 A1 | 9/2006 | Patel et al. |
| 2006/0215980 A1 | 9/2006 | Bayazit et al. |
| 2006/0225912 A1 | 10/2006 | Clark et al. |
| 2006/0228087 A1 | 10/2006 | Bayazit et al. |
| 2006/0228940 A1 | 10/2006 | Follingstad |
| 2006/0269194 A1 | 11/2006 | Luther et al. |
| 2006/0269205 A1 | 11/2006 | Zimmel |
| 2006/0269206 A1 | 11/2006 | Zimmel |
| 2006/0269208 A1 | 11/2006 | Allen et al. |
| 2006/0275008 A1 | 12/2006 | Xin |
| 2006/0275009 A1 | 12/2006 | Ellison et al. |
| 2006/0285812 A1 | 12/2006 | Ferris et al. |
| 2007/0003204 A1 | 1/2007 | Makrides-Saravanos et al. |
| 2007/0020991 A1 | 1/2007 | Murano |
| 2007/0025070 A1 | 2/2007 | Jiang et al. |
| 2007/0031099 A1 | 2/2007 | Herzog et al. |
| 2007/0033629 A1 | 2/2007 | McGranahan et al. |
| 2007/0047891 A1 | 3/2007 | Bayazit et al. |
| 2007/0047893 A1 | 3/2007 | Kramer et al. |
| 2007/0047894 A1 | 3/2007 | Holmberg et al. |
| 2007/0047896 A1 | 3/2007 | Kowalczyk et al. |
| 2007/0053385 A1 | 3/2007 | Tollbom |
| 2007/0058641 A1 | 3/2007 | Cicchetti et al. |
| 2007/0086723 A1 | 4/2007 | Sasaki et al. |
| 2007/0104447 A1 | 5/2007 | Allen |
| 2007/0110373 A1 | 5/2007 | Dudek et al. |
| 2007/0131628 A1 | 6/2007 | Mimlitch, III et al. |
| 2007/0183732 A1 | 8/2007 | Wittmeier et al. |
| 2007/0189692 A1 | 8/2007 | Zimmel et al. |
| 2007/0190853 A1 | 8/2007 | Caveney |
| 2007/0196071 A1 | 8/2007 | Laursen et al. |
| 2007/0221793 A1 | 9/2007 | Kusuda et al. |
| 2007/0237484 A1 | 10/2007 | Reagan et al. |
| 2007/0257159 A1 | 11/2007 | Nelson et al. |
| 2007/0266192 A1 | 11/2007 | Campini et al. |
| 2007/0274718 A1 | 11/2007 | Bridges et al. |
| 2007/0298652 A1 | 12/2007 | Clark et al. |
| 2008/0009182 A1 | 1/2008 | Follingstad |
| 2008/0011514 A1 | 1/2008 | Zheng et al. |
| 2008/0025683 A1 | 1/2008 | Murano |
| 2008/0031585 A1 | 2/2008 | Solheid et al. |
| 2008/0037209 A1 | 2/2008 | Niazi et al. |
| 2008/0063350 A1 | 3/2008 | Trebesch et al. |
| 2008/0068788 A1 | 3/2008 | Ozawa et al. |
| 2008/0069511 A1 | 3/2008 | Blackwell, Jr. et al. |
| 2008/0069512 A1 | 3/2008 | Barnes et al. |
| 2008/0078899 A1 | 4/2008 | Chen et al. |
| 2008/0080826 A1 | 4/2008 | Leon et al. |
| 2008/0080827 A1 | 4/2008 | Leon et al. |
| 2008/0080828 A1 | 4/2008 | Leon et al. |
| 2008/0085092 A1 | 4/2008 | Barnes |
| 2008/0085094 A1 | 4/2008 | Krampotich |
| 2008/0089656 A1 | 4/2008 | Wagner et al. |
| 2008/0095502 A1 | 4/2008 | McColloch |
| 2008/0095541 A1 | 4/2008 | Dallesasse |
| 2008/0100440 A1 | 5/2008 | Downie et al. |
| 2008/0106871 A1 | 5/2008 | James |
| 2008/0108253 A1 | 5/2008 | Clark et al. |
| 2008/0112681 A1 | 5/2008 | Battey et al. |
| 2008/0115956 A1 | 5/2008 | Fransen et al. |
| 2008/0118207 A1 | 5/2008 | Yamamoto et al. |
| 2008/0121423 A1 | 5/2008 | Vogel et al. |
| 2008/0124039 A1 | 5/2008 | Gniadek et al. |
| 2008/0131068 A1 | 6/2008 | Mertesdorf et al. |
| 2008/0145011 A1 | 6/2008 | Register |
| 2008/0145013 A1 | 6/2008 | Escoto et al. |
| 2008/0146079 A1 | 6/2008 | Spisany et al. |
| 2008/0152294 A1 | 6/2008 | Hirano et al. |
| 2008/0166094 A1 | 7/2008 | Bookbinder et al. |
| 2008/0166131 A1 | 7/2008 | Hudgins et al. |
| 2008/0175541 A1 | 7/2008 | Lu et al. |
| 2008/0175550 A1 | 7/2008 | Coburn et al. |
| 2008/0175551 A1 | 7/2008 | Smrha et al. |
| 2008/0175552 A1* | 7/2008 | Smrha ............... G02B 6/4452 385/135 |
| 2008/0193091 A1 | 8/2008 | Herbst |
| 2008/0205823 A1 | 8/2008 | Luther et al. |
| 2008/0205843 A1 | 8/2008 | Castonguay et al. |
| 2008/0205844 A1 | 8/2008 | Castonguay et al. |
| 2008/0212928 A1 | 9/2008 | Kowalczyk et al. |
| 2008/0219632 A1 | 9/2008 | Smith et al. |
| 2008/0219634 A1 | 9/2008 | Rapp et al. |
| 2008/0236858 A1 | 10/2008 | Quijano |
| 2008/0240653 A1 | 10/2008 | King et al. |
| 2008/0247723 A1 | 10/2008 | Herzog et al. |
| 2008/0267573 A1 | 10/2008 | Douglas et al. |
| 2008/0285934 A1 | 11/2008 | Standish et al. |
| 2008/0292261 A1 | 11/2008 | Kowalczyk et al. |
| 2008/0296060 A1 | 12/2008 | Hawley et al. |
| 2008/0298763 A1 | 12/2008 | Appenzeller et al. |
| 2008/0310810 A1 | 12/2008 | Gallagher |
| 2009/0010607 A1 | 1/2009 | Elisson et al. |
| 2009/0016685 A1 | 1/2009 | Hudgins et al. |
| 2009/0022470 A1 | 1/2009 | Krampotich |
| 2009/0034912 A1 | 2/2009 | Sepe, Jr. |
| 2009/0038845 A1 | 2/2009 | Fransen et al. |
| 2009/0060439 A1 | 3/2009 | Cox et al. |
| 2009/0060440 A1 | 3/2009 | Wright et al. |
| 2009/0067800 A1 | 3/2009 | Vazquez et al. |
| 2009/0074371 A1 | 3/2009 | Bayazit et al. |
| 2009/0080849 A1 | 3/2009 | Hankins et al. |
| 2009/0097813 A1 | 4/2009 | Hill |
| 2009/0110347 A1 | 4/2009 | Jacobsson |
| 2009/0110391 A1 | 4/2009 | Matityahu et al. |
| 2009/0121092 A1 | 5/2009 | Keith |
| 2009/0129033 A1* | 5/2009 | Smrha ............... H04Q 1/142 361/732 |
| 2009/0136194 A1 | 5/2009 | Barnes |
| 2009/0136195 A1 | 5/2009 | Smrha et al. |

(56) References Cited

U.S. PATENT DOCUMENTS

| | | |
|---|---|---|
| 2009/0136196 A1 | 5/2009 | Trebesch et al. |
| 2009/0146342 A1 | 6/2009 | Haney et al. |
| 2009/0148117 A1 | 6/2009 | Laurisch |
| 2009/0166404 A1 | 7/2009 | German et al. |
| 2009/0169163 A1 | 7/2009 | Abbott, III et al. |
| 2009/0175588 A1 | 7/2009 | Brandt et al. |
| 2009/0180737 A1 | 7/2009 | Burnham et al. |
| 2009/0180749 A1 | 7/2009 | Douglas et al. |
| 2009/0184221 A1 | 7/2009 | Sculler |
| 2009/0185782 A1 | 7/2009 | Parikh et al. |
| 2009/0191891 A1 | 7/2009 | Ma et al. |
| 2009/0194647 A1 | 8/2009 | Keith |
| 2009/0196563 A1 | 8/2009 | Mullsteff et al. |
| 2009/0202214 A1 | 8/2009 | Holmberg et al. |
| 2009/0207577 A1 | 8/2009 | Fransen et al. |
| 2009/0208178 A1 | 8/2009 | Kowalczyk et al. |
| 2009/0208210 A1 | 8/2009 | Trojer et al. |
| 2009/0212679 A1 | 8/2009 | Frousiakis et al. |
| 2009/0214171 A1 | 8/2009 | Coburn et al. |
| 2009/0220200 A1 | 9/2009 | Sheau Tung Wong et al. |
| 2009/0220204 A1 | 9/2009 | Ruiz |
| 2009/0226142 A1 | 9/2009 | Barnes et al. |
| 2009/0238531 A1 | 9/2009 | Holmberg et al. |
| 2009/0245743 A1 * | 10/2009 | Cote .................... G02B 6/4454 385/135 |
| 2009/0252472 A1 | 10/2009 | Solheid et al. |
| 2009/0257718 A1 | 10/2009 | Nishimura et al. |
| 2009/0257726 A1 | 10/2009 | Redmann et al. |
| 2009/0257727 A1 | 10/2009 | Laurisch et al. |
| 2009/0257754 A1 | 10/2009 | Theodoras, II et al. |
| 2009/0263096 A1 | 10/2009 | Solheid et al. |
| 2009/0263122 A1 | 10/2009 | Helkey et al. |
| 2009/0267865 A1 | 10/2009 | Miller et al. |
| 2009/0269016 A1 | 10/2009 | Korampally et al. |
| 2009/0269018 A1 | 10/2009 | Frohlich et al. |
| 2009/0269019 A1 | 10/2009 | Andrus et al. |
| 2009/0274429 A1 | 11/2009 | Krampotich et al. |
| 2009/0274430 A1 | 11/2009 | Krampotich et al. |
| 2009/0274432 A1 | 11/2009 | Iwaya |
| 2009/0290842 A1 | 11/2009 | Bran de Leon et al. |
| 2009/0290843 A1 | 11/2009 | Reagan et al. |
| 2009/0297099 A1 | 12/2009 | Benjamin et al. |
| 2009/0297111 A1 | 12/2009 | Reagan et al. |
| 2009/0304342 A1 | 12/2009 | Adomeit et al. |
| 2009/0324189 A1 | 12/2009 | Hill et al. |
| 2010/0003000 A1 * | 1/2010 | Rapp .................... G02B 6/4453 385/137 |
| 2010/0012671 A1 | 1/2010 | Vrondran et al. |
| 2010/0027953 A1 | 2/2010 | Russell |
| 2010/0054681 A1 | 3/2010 | Biribuze et al. |
| 2010/0054682 A1 | 3/2010 | Cooke et al. |
| 2010/0054683 A1 | 3/2010 | Cooke et al. |
| 2010/0054684 A1 | 3/2010 | Cooke et al. |
| 2010/0054685 A1 | 3/2010 | Cooke et al. |
| 2010/0054686 A1 | 3/2010 | Cooke et al. |
| 2010/0054687 A1 | 3/2010 | Ye et al. |
| 2010/0061693 A1 | 3/2010 | Bran de Leon et al. |
| 2010/0074587 A1 | 3/2010 | Loeffelholz et al. |
| 2010/0080517 A1 | 4/2010 | Cline et al. |
| 2010/0086267 A1 | 4/2010 | Cooke et al. |
| 2010/0086274 A1 | 4/2010 | Keith |
| 2010/0111483 A1 | 5/2010 | Reinhardt et al. |
| 2010/0119201 A1 | 5/2010 | Smrha et al. |
| 2010/0129035 A1 | 5/2010 | Teo |
| 2010/0142544 A1 | 6/2010 | Chapel et al. |
| 2010/0142910 A1 | 6/2010 | Hill et al. |
| 2010/0150518 A1 | 6/2010 | Leon et al. |
| 2010/0158467 A1 | 6/2010 | Hou et al. |
| 2010/0166377 A1 | 7/2010 | Nair et al. |
| 2010/0178022 A1 | 7/2010 | Schroeder et al. |
| 2010/0183270 A1 | 7/2010 | Davis et al. |
| 2010/0202740 A1 | 8/2010 | Barlowe et al. |
| 2010/0202745 A1 | 8/2010 | Sokolowski et al. |
| 2010/0202748 A1 | 8/2010 | Pierce et al. |
| 2010/0215330 A1 | 8/2010 | Sokolowski et al. |
| 2010/0220967 A1 | 9/2010 | Cooke et al. |
| 2010/0220968 A1 | 9/2010 | Dagley et al. |
| 2010/0247051 A1 | 9/2010 | Kowalczyk et al. |
| 2010/0266245 A1 | 10/2010 | Sabo |
| 2010/0278499 A1 | 11/2010 | Mures et al. |
| 2010/0296790 A1 | 11/2010 | Cooke et al. |
| 2010/0296791 A1 | 11/2010 | Makrides-Saravanos et al. |
| 2010/0310225 A1 | 12/2010 | Anderson et al. |
| 2010/0310226 A1 | 12/2010 | Wakileh et al. |
| 2010/0316334 A1 | 12/2010 | Kewitsch |
| 2010/0322554 A1 | 12/2010 | Barnes et al. |
| 2010/0322579 A1 | 12/2010 | Cooke et al. |
| 2010/0322580 A1 | 12/2010 | Beamon et al. |
| 2010/0322581 A1 | 12/2010 | Cooke et al. |
| 2010/0322582 A1 | 12/2010 | Cooke et al. |
| 2010/0322583 A1 | 12/2010 | Cooke et al. |
| 2010/0329624 A1 | 12/2010 | Zhou et al. |
| 2011/0008004 A1 | 1/2011 | Liao et al. |
| 2011/0058786 A1 | 3/2011 | Zimmel |
| 2011/0069931 A1 | 3/2011 | Cote et al. |
| 2011/0073730 A1 | 3/2011 | Kitchen |
| 2011/0085774 A1 | 4/2011 | Murphy et al. |
| 2011/0085776 A1 | 4/2011 | Biribuze et al. |
| 2011/0097053 A1 | 4/2011 | Smith et al. |
| 2011/0097977 A1 | 4/2011 | Bubnick et al. |
| 2011/0129185 A1 | 6/2011 | Lewallen et al. |
| 2011/0129186 A1 | 6/2011 | Lewallen et al. |
| 2011/0186532 A1 | 8/2011 | Wu |
| 2011/0192631 A1 | 8/2011 | Burek et al. |
| 2011/0211799 A1 | 9/2011 | Conner et al. |
| 2011/0217014 A1 | 9/2011 | Dominique |
| 2011/0217016 A1 | 9/2011 | Mullsteff |
| 2011/0222821 A1 | 9/2011 | Pitwon et al. |
| 2011/0235985 A1 | 9/2011 | Cote et al. |
| 2011/0249950 A1 | 10/2011 | Chapa Ramirez et al. |
| 2011/0262096 A1 | 10/2011 | Fabrykowski et al. |
| 2011/0268404 A1 | 11/2011 | Cote et al. |
| 2011/0268405 A1 | 11/2011 | Cote et al. |
| 2011/0268406 A1 | 11/2011 | Giraud et al. |
| 2011/0268407 A1 | 11/2011 | Cowen et al. |
| 2011/0268408 A1 | 11/2011 | Giraud et al. |
| 2011/0268409 A1 | 11/2011 | Giraud et al. |
| 2011/0268410 A1 | 11/2011 | Giraud et al. |
| 2011/0268411 A1 | 11/2011 | Giraud et al. |
| 2011/0268412 A1 | 11/2011 | Giraud et al. |
| 2011/0268413 A1 | 11/2011 | Cote et al. |
| 2011/0268414 A1 | 11/2011 | Giraud et al. |
| 2011/0274402 A1 | 11/2011 | Giraud et al. |
| 2011/0280535 A1 | 11/2011 | Womack |
| 2011/0280537 A1 | 11/2011 | Cowen et al. |
| 2012/0020629 A1 | 1/2012 | Shiratori et al. |
| 2012/0025683 A1 | 2/2012 | Mattlin et al. |
| 2012/0051707 A1 | 3/2012 | Barnes et al. |
| 2012/0057836 A1 | 3/2012 | Andrzejewski et al. |
| 2012/0057838 A1 | 3/2012 | Hill et al. |
| 2012/0106897 A1 | 5/2012 | Cline et al. |
| 2012/0106899 A1 | 5/2012 | Choi |
| 2012/0106911 A1 | 5/2012 | Cooke et al. |
| 2012/0134639 A1 | 5/2012 | Giraud et al. |
| 2012/0183263 A1 | 7/2012 | Wu |
| 2012/0183289 A1 | 7/2012 | Lou et al. |
| 2012/0219263 A1 | 8/2012 | Beamon et al. |
| 2012/0288244 A1 | 11/2012 | Wu et al. |
| 2012/0288248 A1 | 11/2012 | Chapa Ramirez et al. |
| 2012/0301083 A1 | 11/2012 | Carter et al. |
| 2013/0004136 A1 | 1/2013 | Brower et al. |
| 2013/0056599 A1 | 3/2013 | Baker et al. |
| 2013/0058616 A1 | 3/2013 | Cote et al. |
| 2013/0072053 A1 | 3/2013 | Fabrykowski et al. |
| 2013/0077927 A1 | 3/2013 | O'Connor |
| 2013/0134115 A1 | 5/2013 | Hernandez-Ariguznaga |
| 2013/0214108 A1 | 8/2013 | Irudayaraj et al. |
| 2013/0243386 A1 | 9/2013 | Pimentel et al. |
| 2013/0251326 A1 | 9/2013 | Cooke et al. |
| 2013/0266282 A1 | 10/2013 | Cote et al. |
| 2013/0308908 A1 | 11/2013 | Isenhour et al. |
| 2013/0308915 A1 | 11/2013 | Buff et al. |
| 2013/0308916 A1 | 11/2013 | Buff et al. |
| 2013/0328258 A1 | 12/2013 | Mutsuno |

(56) References Cited

U.S. PATENT DOCUMENTS

| | | |
|---|---|---|
| 2014/0003782 A1 | 1/2014 | Blackwell, Jr. et al. |
| 2014/0010510 A1 | 1/2014 | Blackard |
| 2014/0029907 A1 | 1/2014 | Isenhour et al. |
| 2014/0037251 A1 | 2/2014 | Isenhour et al. |
| 2014/0079366 A1 | 3/2014 | Rodriguez et al. |
| 2014/0112628 A1 | 4/2014 | Keenum et al. |
| 2014/0226946 A1 | 8/2014 | Cooke et al. |
| 2015/0027967 A1 | 1/2015 | Vazquez et al. |
| 2015/0185429 A1 | 7/2015 | Cooke et al. |
| 2017/0038549 A1 | 2/2017 | Smrha et al. |
| 2017/0131504 A1 | 5/2017 | Cooke et al. |
| 2017/0131506 A1 | 5/2017 | Cooke et al. |
| 2017/0131508 A1 | 5/2017 | Cooke et al. |
| 2017/0160505 A1 | 5/2017 | Cooke et al. |

FOREIGN PATENT DOCUMENTS

| | | |
|---|---|---|
| CA | 2186314 A1 | 4/1997 |
| CA | 2765835 A1 | 1/2011 |
| CH | 688705 A5 | 1/1998 |
| CN | 1471649 A | 1/2004 |
| CN | 1690745 A | 11/2005 |
| CN | 2849745 Y | 12/2006 |
| CN | 102460258 A | 5/2012 |
| CN | 202693880 U | 1/2013 |
| DE | 8711970 U1 | 10/1987 |
| DE | 3726718 A1 | 2/1989 |
| DE | 3726719 A1 | 2/1989 |
| DE | 4030301 A1 | 3/1992 |
| DE | 4112871 A1 | 10/1992 |
| DE | 4231181 C1 | 8/1993 |
| DE | 4321815 A1 | 1/1995 |
| DE | 20115940 U1 | 1/2002 |
| DE | 10338848 A1 | 3/2005 |
| DE | 202005009932 U1 | 11/2005 |
| DE | 202007000556 U1 | 10/2007 |
| DE | 102007024476 A1 | 11/2008 |
| DE | 202010009385 U1 | 9/2010 |
| EP | 29512 A1 | 6/1981 |
| EP | 0105597 A2 | 4/1984 |
| EP | 0250900 A2 | 1/1988 |
| EP | 0349290 A1 | 1/1990 |
| EP | 0408266 A2 | 1/1991 |
| EP | 0474091 A1 | 8/1991 |
| EP | 0468671 A1 | 1/1992 |
| EP | 0490698 A1 | 6/1992 |
| EP | 0529830 A1 | 3/1993 |
| EP | 0544004 A1 | 6/1993 |
| EP | 0547778 A1 | 6/1993 |
| EP | 0581527 A1 | 2/1994 |
| EP | 0620462 A1 | 10/1994 |
| EP | 0693699 A1 | 1/1996 |
| EP | 0720322 A2 | 7/1996 |
| EP | 0730178 A2 | 9/1996 |
| EP | 0776557 B1 | 6/1997 |
| EP | 0940700 A2 | 9/1999 |
| EP | 0949522 A2 | 10/1999 |
| EP | 1041417 A2 | 10/2000 |
| EP | 1056177 A1 | 11/2000 |
| EP | 1065542 A1 | 1/2001 |
| EP | 1162485 A2 | 12/2001 |
| EP | 1203974 A2 | 5/2002 |
| EP | 1280363 A2 | 1/2003 |
| EP | 1289319 A2 | 3/2003 |
| EP | 1310816 A2 | 5/2003 |
| EP | 1316829 A2 | 6/2003 |
| EP | 1367308 A1 | 12/2003 |
| EP | 1621907 A1 | 2/2006 |
| EP | 1557061 B1 | 3/2006 |
| EP | 1777563 A1 | 4/2007 |
| EP | 2060942 A2 | 5/2009 |
| EP | 2159613 A2 | 3/2010 |
| FR | 1586331 A | 2/1970 |
| FR | 2123728 A5 | 9/1972 |
| FR | 2378378 A1 | 8/1978 |
| GB | 2241591 A | 9/1991 |
| GB | 2277812 A | 11/1994 |
| GB | 2367379 A | 4/2002 |
| GB | 2377839 A | 1/2003 |
| JP | 3060994 A | 3/1991 |
| JP | 3172806 A | 7/1991 |
| JP | 3281378 A | 12/1991 |
| JP | 5045541 A | 2/1993 |
| JP | 06018749 A | 1/1994 |
| JP | 7308011 A | 11/1995 |
| JP | 7318761 A | 12/1995 |
| JP | 8007308 A | 1/1996 |
| JP | 8248235 A | 9/1996 |
| JP | 8248237 A | 9/1996 |
| JP | 3487946 A | 10/1996 |
| JP | 8254620 A | 10/1996 |
| JP | H09178998 A | 7/1997 |
| JP | H09197139 A | 7/1997 |
| JP | 3279474 A | 10/1997 |
| JP | 9258033 A | 10/1997 |
| JP | 9258055 A | 10/1997 |
| JP | 2771870 B2 | 7/1998 |
| JP | 3448448 A | 8/1998 |
| JP | 10227919 A | 8/1998 |
| JP | 3478944 A | 12/1998 |
| JP | 10332945 A | 12/1998 |
| JP | 10339817 A | 12/1998 |
| JP | 11023858 A | 1/1999 |
| JP | H11202146 A | 7/1999 |
| JP | 2000098138 A | 4/2000 |
| JP | 2000098139 A | 4/2000 |
| JP | 2000241631 A | 9/2000 |
| JP | 2001004849 A | 1/2001 |
| JP | 3160322 B2 | 4/2001 |
| JP | 2001119177 A | 4/2001 |
| JP | 2001133636 A | 5/2001 |
| JP | 3173962 B2 | 6/2001 |
| JP | 3176906 B2 | 6/2001 |
| JP | 2001154030 A | 6/2001 |
| JP | 2001159714 A | 6/2001 |
| JP | 2002022974 A | 1/2002 |
| JP | 2002032153 A | 1/2002 |
| JP | 2002077236 A | 3/2002 |
| JP | 2002116337 A | 4/2002 |
| JP | 2002169035 A | 6/2002 |
| JP | 3312893 B2 | 8/2002 |
| JP | 2002305389 A | 10/2002 |
| JP | 3344701 B2 | 11/2002 |
| JP | 2003029054 A | 1/2003 |
| JP | 3403573 B2 | 5/2003 |
| JP | 2003149458 A | 5/2003 |
| JP | 2003169026 A | 6/2003 |
| JP | 2003215353 A | 7/2003 |
| JP | 2003344701 A | 12/2003 |
| JP | 2004086060 A | 3/2004 |
| JP | 3516765 B2 | 4/2004 |
| JP | 2004118091 A | 4/2004 |
| JP | 2004144808 A | 5/2004 |
| JP | 2004514931 A | 5/2004 |
| JP | 3542939 B2 | 7/2004 |
| JP | 2004246147 A | 9/2004 |
| JP | 2004361652 A | 12/2004 |
| JP | 2004361890 A | 12/2004 |
| JP | 2004361893 A | 12/2004 |
| JP | 3107704 U | 2/2005 |
| JP | 2005055748 A | 3/2005 |
| JP | 2005062569 A | 3/2005 |
| JP | 2005084241 A | 3/2005 |
| JP | 2005148327 A | 6/2005 |
| JP | 2005165158 A | 6/2005 |
| JP | 2005181600 A | 7/2005 |
| JP | 2005257937 A | 9/2005 |
| JP | 2005338618 A | 12/2005 |
| JP | 2006507606 A | 3/2006 |
| JP | 3763645 B2 | 4/2006 |
| JP | 3778021 B2 | 5/2006 |
| JP | 2006126513 A | 5/2006 |
| JP | 2006126516 A | 5/2006 |
| JP | 3794540 B2 | 7/2006 |

(56) References Cited

FOREIGN PATENT DOCUMENTS

| | | |
|---|---|---|
| JP | 2006227041 A1 | 8/2006 |
| JP | 3833638 B2 | 10/2006 |
| JP | 2006276782 A | 10/2006 |
| JP | 2006292924 A | 10/2006 |
| JP | 3841344 B2 | 11/2006 |
| JP | 3847533 B2 | 11/2006 |
| JP | 200747336 A | 2/2007 |
| JP | 3896035 B2 | 3/2007 |
| JP | 2007067458 A1 | 3/2007 |
| JP | 2007093760 A | 4/2007 |
| JP | 2007511959 A | 5/2007 |
| JP | 3934052 B2 | 6/2007 |
| JP | 2007179046 A | 7/2007 |
| JP | 3964191 B2 | 8/2007 |
| JP | 3989853 B2 | 10/2007 |
| JP | 4026244 B2 | 12/2007 |
| JP | 2007324441 A | 12/2007 |
| JP | 4029494 B2 | 1/2008 |
| JP | 4065223 B2 | 3/2008 |
| JP | 4093475 B2 | 6/2008 |
| JP | 4105696 B2 | 6/2008 |
| JP | 4112437 B2 | 7/2008 |
| JP | 4118862 B2 | 7/2008 |
| JP | 2008176118 A1 | 7/2008 |
| JP | 2008180817 A1 | 8/2008 |
| JP | 2008533583 A | 8/2008 |
| JP | 4184329 B2 | 11/2008 |
| JP | 2008271017 A | 11/2008 |
| JP | 2008542822 T | 11/2008 |
| JP | 2009503582 T | 1/2009 |
| JP | 2009515242 A | 4/2009 |
| JP | 2009115962 A | 5/2009 |
| JP | 2009229506 A | 10/2009 |
| JP | 2012065019 A | 3/2012 |
| KR | 20110037404 A | 4/2011 |
| WO | 9000261 A1 | 1/1990 |
| WO | 9105281 A1 | 4/1991 |
| WO | 9326070 A1 | 12/1993 |
| WO | 9520175 A1 | 7/1995 |
| WO | 9636896 A1 | 11/1996 |
| WO | 9638752 A1 | 12/1996 |
| WO | 9712268 A1 | 4/1997 |
| WO | 9722025 A1 | 6/1997 |
| WO | 9736197 A1 | 10/1997 |
| WO | 9744605 A1 | 11/1997 |
| WO | 9825416 A1 | 6/1998 |
| WO | 9927404 A1 | 6/1999 |
| WO | 9959295 A1 | 11/1999 |
| WO | 9963628 A1 | 12/1999 |
| WO | 0005611 A2 | 2/2000 |
| WO | 0127660 A2 | 4/2001 |
| WO | 0130007 A2 | 4/2001 |
| WO | 0180596 A1 | 10/2001 |
| WO | 0242818 A1 | 5/2002 |
| WO | 03009527 A2 | 1/2003 |
| WO | 2003014943 A1 | 2/2003 |
| WO | 93044902 A1 | 5/2003 |
| WO | 2004041525 A2 | 5/2004 |
| WO | 2004052066 A1 | 6/2004 |
| WO | 2005020400 A1 | 3/2005 |
| WO | 2005069448 A1 | 7/2005 |
| WO | 2005091030 A1 | 9/2005 |
| WO | 2005107275 A1 | 11/2005 |
| WO | 2006012389 A1 | 2/2006 |
| WO | 2006076062 A | 7/2006 |
| WO | 2006091850 A1 | 8/2006 |
| WO | 2006108024 A1 | 10/2006 |
| WO | 2007050515 A1 | 5/2007 |
| WO | 2007079074 A2 | 7/2007 |
| WO | 2007089682 A2 | 8/2007 |
| WO | 2007149215 A2 | 12/2007 |
| WO | 2008027201 A2 | 3/2008 |
| WO | 2008063054 A2 | 5/2008 |
| WO | 2008074013 A2 | 6/2008 |
| WO | 2008113054 A2 | 9/2008 |
| WO | 2008157248 A1 | 12/2008 |
| WO | 2009026688 A1 | 3/2009 |
| WO | 2009029485 A1 | 3/2009 |
| WO | 2009030360 A1 | 3/2009 |
| WO | 2009032245 A1 | 3/2009 |
| WO | 2009091465 A2 | 7/2009 |
| WO | 2009120280 A2 | 10/2009 |
| WO | 2010024842 A1 | 3/2010 |
| WO | 2010024847 A2 | 3/2010 |
| WO | 2010036549 A1 | 4/2010 |
| WO | 2010080745 A1 | 7/2010 |
| WO | 2011005461 A1 | 1/2011 |

OTHER PUBLICATIONS

International Search Report for PCT/US2010/023901 dated Jun. 11, 2010, 3 pages.
Notice of Allowance for U.S. Appl. No. 12/576,769 dated May 31, 2012, 9 pages.
Non-final Office Action for U.S. Appl. No. 12/576,806 dated Dec. 13, 2011, 6 pages.
Notice of Allowance for U.S. Appl. No. 12/576,806 dated Apr. 18, 2012, 5 pages.
Non-final Office Action for U.S. Appl. No. 13/688,675 dated Jan. 31, 2014, 13 pages.
Non-final Office Action for U.S. Appl. No. 12/946,217 dated Jul. 26, 2012, 25 pages.
Final Office Action for U.S. Appl. No. 12/946,217 dated Mar. 18, 2013, 48 pages.
Non-final Office Action for U.S. Appl. No. 12/946,217 dated Oct. 3, 2013, 47 pages.
Final Office Action for U.S. Appl. No. 12/946,217 dated Apr. 25, 2014, 40 pages.
Non-final Office Action for U.S. Appl. No. 13/833,876 dated Apr. 24, 2014, 7 pages.
Notice of Allowance for U.S. Appl. No. 12/953,536 dated May 20, 2014, 9 pages.
Advisory Action for U.S. Appl. No. 12/707,889 dated Jun. 11, 2014, 4 pages.
Advisory Action for U.S. Appl. No. 12/940,585 dated Jun. 17, 2014, 3 pages.
Advisory Action for U.S. Appl. No. 12/947,883 dated Jun. 19, 2014, 3 pages.
Non-final Office Action for U.S. Appl. No. 12/732,487 dated Jun. 20, 2014, 24 pages.
Non-final Office Action for U.S. Appl. No. 13/621,958 dated Jun. 20, 2014, 13 pages.
Final Office Action for U.S. Appl. No. 13/649,417 dated Jun. 25, 2014, 9 pages.
Non-final Office Action for U.S. Appl. No. 12/952,960 dated Jun. 26, 2014, 13 pages.
Non-final Office Action for U.S. Appl. No. 13/746,938 dated Jul. 11, 2014, 9 pages.
Non-final Office Action for U.S. Appl. No. 12/751,895 dated May 20, 2014, 9 pages.
Final Office Action for U.S. Appl. No. 12/953,039 dated Jul. 25, 2014, 10 pages.
Notice of Allowance for U.S. Appl. No. 12/953,536 dated Aug. 28, 2014, 9 pages.
Final Office Action for U.S. Appl. No. 13/901,074 dated Sep. 5, 2014, 7 pages.
Final Office Action for U.S. Appl. No. 13/663,975 dated Aug. 14, 2014, 42 pages.
Corrected Notice of Allowance for U.S. Appl. No. 13/533,093 dated Sep. 2, 2014, 7 pages.
Notice of Allowance for U.S. Appl. No. 13/649,417 dated Sep. 8, 2014, 7 pages.
Examiner's Answer to the Appeal for U.S. Appl. No. 12/952,912 dated Sep. 11, 2014, 15 pages.
Advisory Action and Examiner-Initiated Interview Summary for U.S. Appl. No. 13/081,856 dated Sep. 16, 2014, 4 pages.
Notice of Allowance for U.S. Appl. No. 13/455,646 dated Sep. 26, 2014, 9 pages.

(56) References Cited

OTHER PUBLICATIONS

Non-Final Office Action for U.S. Appl. No. 13/663,949 dated Sep. 25, 2014, 21 pages.
Non-Final Office Action for U.S. Appl. No. 13/688,675 dated Sep. 30, 2014, 9 pages.
Advisory Action for U.S. Appl. No. 12/953,039 dated Oct. 3, 2014, 3 pages.
Notice of Allowance for U.S. Appl. No. 13/597,549 dated Oct. 3, 2014, 8 pages.
Decision on Appeal for U.S. Appl. No. 11/320,062 dated Aug. 14, 2014, 8 pages.
Final Office Action for U.S. Appl. No. 12/953,101 dated Oct. 20, 2014, 14 pages.
Notice of Allowance for U.S. Appl. No. 13/533,093 dated Oct. 17, 2014, 9 pages.
Notice of Allowance for U.S. Appl. No. 12/732,487 dated Oct. 7, 2014, 8 pages.
Non-Final Office Action for U.S. Appl. No. 13/567,288 dated Oct. 8, 2014, 7 pages.
Advisory Action for U.S. Appl. No. 12/818,986 dated Oct. 15, 2014, 5 pages.
Examiner's Answer to the Appeal Brief for U.S. Appl. No. 12/953,134 dated Aug. 1, 2014, 7 pages.
Final Office Action for U.S. Appl. No. 12/394,114 dated Oct. 31, 2014, 10 pages.
Non-final Office Action for U.S. Appl. No. 12/940,699 dated Oct. 28, 2014, 9 pages.
Non-final Office Action for U.S. Appl. No. 12/953,039 dated Nov. 12, 2014, 8 pages.
Notice of Allowance for U.S. Appl. No. 12/952,960 dated Nov. 10, 2014, 7 pages.
Notice of Allowance for U.S. Appl. No. 13/081,856 dated Oct. 29, 2014, 10 pages.
Notice of Allowance for U.S. Appl. No. 13/833,876 dated Nov. 7, 2014, 7 pages.
Advisory Action for U.S. Appl. No. 13/901,074 dated Nov. 24, 2014, 3 pages.
Notice of Allowance for U.S. Appl. No. 12/751,895 dated Nov. 19, 2014, 8 pages.
Final Office Action for U.S. Appl. No. 12/953,003 dated Feb. 12, 2015, 14 pages.
Final Office Action for U.S. Appl. No. 12/953,039 dated Feb. 23, 2015, 9 pages.
International Search Report for PCT/US2011/030446 dated Jul. 14, 2011, 2 pages.
International Search Report for PCT/US2011/030448 dated Jul. 20, 2011, 2 pages.
International Search Report for PCT/US2011/030466 dated Aug. 5, 2011, 2 pages.
Non-final Office Action for U.S. Appl. No. 13/649,417 dated Feb. 13, 2014, 10 pages.
Non-final Office Action for U.S. Appl. No. 12/956,446 dated Dec. 5, 2014, 12 pages.
Advisory Action for U.S. Appl. No. 13/663,975 dated Dec. 24, 2014, 7 pages.
Author Unknown, "Living Hinge—From Wikipedia, the free encyclopedia," Retrieved from the internet on Mar. 19, 2015, http://en.eikipedia.org/wiki/Living_Hinge, 3 pages.
Bigo, Sebastien, et al., "10.2Tbit/s (256×42.7Gbit/s PDM/WDM) transmission over 100km TeraLight fiber with 1.28 bit/s/Hz spectral efficiency," Optical Fiber Communication Conference, Mar. 17-22, 2001, 3 pages.
McEachern, "Gigabit Networking on the Public Transmission Network," IEEE Communications Magazine, Apr. 1992, IEEE, pp. 70-78.
Author Unknown, "U-Space System for Brocade 48000," Product Specifications, LAN-904-EN, Apr. 2008, Communications Supply Corporation, pp. 1-16.
Patent Examination Report No. 1 for Australian Patent Application No. 2015242945, dated Sep. 1, 2016, 5 pages.
Translation of the Notification of the Office Rejection for Chinese Patent Application No. 200980134014.X, dated Dec. 18, 2014, 8 pages.
Translation of the Second Office Action for Chinese Patent Application No. 200980134014.X, dated Jul. 17, 2013, 8 pages.
Translation of Notification of Reason for Rejection for Japanese Patent Application No. 2011-524963, dated Jul. 14, 2014, 3 pages.
Translation of Notification of Reason for Rejection for Japanese Patent Application No. 2011-524963, dated Sep. 17, 2013, 4 pages.
English Translation of Second Office Action for Chinese Patent Application No. 201080018761.X, dated Apr. 3, 2015, 5 pages.
English Translation of Second Office Action for Chinese Patent Application No. 201180022996.0, dated Jul. 28, 2015, 10 pages.
English Translation of Search Report for Chinese Patent Application No. 201280009252.X, dated Jun. 25, 2015, 2 pages.
English Translation of Search Report for Chinese Patent Application No. 201280010672.X, dated Dec. 15, 2014, 2 pages.
English Translation of Notification of Reason for Rejection for Japanese Patent Application No. 2012-516298, dated Jul. 6, 2015, 6 pages.
Examination Report for European Patent Application No. 107071532, dated Mar. 25, 2015, 6 pages.
Examination Report for European patent application 09789090.9-1562 dated Aug. 2, 2013, 4 pages.
Examination Report for European patent application 09789090.9-1562 dated Feb. 25, 2014, 5 pages.
Examination Report for European patent application 09789090.9-1562 dated Oct. 2, 2014, 6 pages.
Examination Report for European patent application 09789090.9-1562 dated May 5, 2015, 5 pages.
Examination Report for European patent application 09789090.9-1562 dated Dec. 18, 2015, 4 pages.
Partial European Search Report for European Patent Application 15184772.0, dated Jan. 22, 2016, 7 pages.
Patent Examination Report No. 1 for Australian patent application 2011245168 dated Sep. 9, 2014, 3 pages.
English Translation of Notice on the First Office Action for Chinese patent application 201180021566.7 dated Jul. 3, 2014, 7 pages.
English Translation of Notice on the Second Office Action for Chinese patent application 201180021566.7 dated May 26, 2015, 7 pages.
International Search Report for PCT/US2011/057582 dated Jan. 27, 2012, 3 pages.
International Search Report and Written Opinion for PCT/US2011/034581 dated Jul. 13, 2011, 13 pages.
Advisory Action for U.S. Appl. No. 12/394,114 dated Jan. 16, 2015, 3 pages.
Notice of Allowance and Examiner-Initiated Interview Summary for U.S. Appl. No. 12/947,883 dated Jan. 13, 2015, 11 pages.
Non-final Office Action for U.S. Appl. No. 12/818,986 dated Jan. 5, 2015, 21 pages.
Notice of Allowance for U.S. Appl. No. 13/649,417 dated Jan. 8, 2015, 7 pages.
Non-final Office Action for U.S. Appl. No. 12/946,217 dated Dec. 29, 2014, 50 pages.
Notice of Allowance and Examiner-Initiated Interview Summary for U.S. Appl. No. 12/940,585 dated Feb. 27, 2015, 16 pages.
Notice of Allowance for U.S. Appl. No. 12/953,101 dated Feb. 20, 2015, 9 pages.
Final Office Action for U.S. Appl. No. 12/819,065 dated Mar. 12, 2015, 13 pages.
Examiner's Answer to the Appeal Brief for U.S. Appl. No. 12/946,139 dated Feb. 5, 2015, 12 pages.
Notice of Allowance for U.S. Appl. No. 12/707,889 dated Feb. 17, 2015, 7 pages.
Non-final Office Action for U.S. Appl. No. 13/902,012 dated Feb. 17, 2015, 9 pages.
Non-final Office Action for U.S. Appl. No. 13/081,856 dated Feb. 9, 2015, 8 pages.
Non-final Office Action for U.S. Appl. No. 13/901,074 dated May 30, 2015, 8 pages.
Notice of Allowance for U.S. Appl. No. 12/947,883 dated May 21, 2015, 11 pages.

(56) References Cited

OTHER PUBLICATIONS

Final Office Action for U.S. Appl. No. 12/940,699 dated Jun. 1, 2015, 10 pages.
Non-final Office Action for U.S. Appl. No. 13/663,949 dated May 5, 2015, 19 pages.
Non-final Office Action for U.S. Appl. No. 13/952,014 dated Jul. 30, 2015, 9 pages.
Final Office Action for U.S. Appl. No. 12/818,986 dated Jul. 23, 2015, 24 pages.
Non-final Office Action for U.S. Appl. No. 12/956,446 dated Jul. 31, 2015, 14 pages.
Notice of Allowance for U.S. Appl. No. 13/902,012 dated Aug. 5, 2015, 8 pages.
Final Office Action for U.S. Appl. No. 12/946,217, dated Jul. 16, 2015, 50 pages.
Non-final Office Action for U.S. Appl. No. 12/394,114 dated Aug. 12, 2015, 8 pages.
Non-final Office Action for U.S. Appl. No. 12/953,039 dated Sep. 3, 2015, 8 pages.
Final Office Action for U.S. Appl. No. 13/081,856 dated Sep. 8, 2015, 10 pages.
Examiner's Answer to the Appeal Brief for U.S. Appl. No. 13/663,975 dated Oct. 5, 2015, 14 pages.
Non-final Office Action for U.S. Appl. No. 12/819,065 dated Aug. 26, 2015, 13 pages.
Final Office Action for U.S. Appl. No. 13/567,288 dated May 8, 2015, 13 pages.
Non-final Office Action for U.S. Appl. No. 14/263,751 dated Oct. 30, 2015, 6 pages.
Decision on Appeal for U.S. Appl. No. 12/953,118, dated Apr. 5, 2016, 11 pages.
Notice of Allowance for U.S. Appl. No. 12/953,118, dated Apr. 8, 2016, 8 pages.
Final Office Action for U.S. Appl. No. 13/663,949 dated Dec. 23, 2015, 24 pages.
Final Office Action for U.S. Appl. No. 14/263,751 dated Jun. 8, 2016, 6 pages.
Decision on Appeal for U.S. Appl. No. 12/953,134 dated Jun. 24, 2016, 6 page.
Decision on Appeal for U.S. Appl. No. 12/952,912 dated Jun. 28, 2016, 8 pages.
Non-final Office Action for U.S. Appl. No. 12/940,699 dated Jul. 1, 2016, 10 pages.
Non-final Office Action for U.S. Appl. No. 13/901,074 dated Jun. 22, 2016, 8 pages.
Decision on Appeal for U.S. Appl. No. 12/946,139, dated Oct. 13, 2016, 8 pages.
Notice of Allowance for U.S. Appl. No. 12/953,118, dated Aug. 1, 2016, 7 pages.
Non-Final Office Action for U.S. Appl. No. 14/660,074, dated Sep. 15, 2016, 13 pages.
Notice of Allowance for U.S. Appl. No. 14/512,899, dated Mar. 1, 2017, 9 pages.
Non-Final Office Action for U.S. Appl. No. 14/512,899, dated Aug. 16, 2016, 8 pages.
*Panduit Corp.* (Petitioner) V. *Corning Optical Communications LLC*, Declaration of Casimer Decusatis in Support of Petition for Inter Partes Review of U.S. Pat. No. 8,452,148, dated Aug. 31, 2016, 62 pages.
*Panduit Corp.* (Petitioner) V. *Corning Optical Communications LLC*, Patent Owner's Preliminary Response, Case IPR2016-01703, U.S. Pat. No. 8,452,148 B2, dated Dec. 6, 2016, 42 pages.
*Panduit Corp.* (Petitioner) V. *Corning Optical Communications LLC* (Patent Owner), Decision for Institution of Inter Partes Review, Case IPR2016-01703, U.S. Pat. No. 8,452,148, Paper No. 7, dated Mar. 2, 2017, 30 pages.
*Panduit Corp.* (Petitioner) V. *Corning Optical Communications LLC* (Patent Owner), Petition for Inter Partes Review of U.S. Pat. No. 8,452,148, dated Aug. 31, 2016, 83 pages.
*Panduit Corp.* (Petitioner) V. *Corning Optical Communications LLC* (Patent Owner), Declaration of Casimer Decusatis in Support of Petition for Inter Partes Review of U.S. Pat. No. 8,184,938, dated Aug. 31, 2016, 56 pages.
*Panduit Corp.* (Petitioner) V. *Corning Optical Communications LLC* (Patent Owner), Petition for Inter Partes Review of U.S. Pat. No. 8,184,938, dated Aug. 31, 2016, 73 pages.
*Panduit Corp.* (Petitioner) V. *Corning Optical Communications LLC* (Patent Owner), Patent Owner's Preliminary Response, Case IPR2016-01709, U.S. Pat. No. 8,184,938, B2, dated Dec. 6, 2016, 36 pages.
*Panduit Corp.* (Petitioner) V. *Corning Optical Communications LLC* (Patent Owner), Decision for Institution of Inter Partes Review, Case IPR2016-01709, U.S. Pat. No. 8,184,938 B2, Paper No. 7, dated Mar. 1, 2017, 30 pages.
*Panduit Corp.* (Petitioner) V. *Corning Optical Communications LLC* (Patent Owner), Patent Owner's Preliminary Response, Case IPR2017-00009, U.S. Pat. No. 9,020,320 B2, dated Jan. 18, 2017, 33 pages.
*Panduit Corp.* (Petitioner) V. *Corning Optical Communications LLC* (Patent Owner), Petition for Inter Partes Review of U.S. Pat. No. 9,020,320, dated Oct. 4, 2016, 88 pages.
*Panduit Corp.* (Petitioner) V. *Corning Optical Communications LLC* (Patent Owner), Declaration of Casimer Decusatis in Support of Petition for Inter Partes Review of U.S. Pat. No. 9,020,320, dated Sep. 30, 2016, 113 pages.
*Panduit Corp.* (Petitioner) V. *Corning Optical Communications LLC* (Patent Owner), Declaration of Casimer Decusatis in Support of Petition for Inter Partes Review of U.S. Pat. No. 8,538,226, dated Oct. 6, 2016, 67 pages.
*Panduit Corp.* (Petitioner) V. *Corning Optical Communications LLC* (Patent Owner), Petition for Inter Partes Review of U.S. Pat. No. 8,538,226, dated Oct. 6, 2016, 87 pages.
*Panduit Corp.* (Petitioner) V. *Corning Optical Communications LLC* (Patent Owner), Patent Owner's Preliminary Response, Case IPR2017-00029, U.S. Pat. No. 8,538,226 B2, dated Jan. 13, 2017, 34 pages.
*Panduit Corp.* (Petitioner) V. *Corning Optical Communications LLC* (Patent Owner), Declaration of Casimer Decusatis in Support of, Petition for Inter Partes Review of U.S. Pat. No. 8,712,206, dated Dec. 22, 2016, 117 pages.
*Panduit Corp.* (Petitioner) V. *Corning Optical Communications LLC*, Petition for Inter Partes Review of U.S. Pat. No. 8,712,206, dated Dec. 22, 2016, 89 pages.
Author Unknown, "Cabinets, Racks, Panels, and Associated Equipment," EIA/ECA-310-E Standard, Dec. 2005, Electronic Industries Alliance, Arlington, Virginia, 26 pages.
Author Unknown, "Fiber Optic Connector Intermateability Standard—Type LC ," TIA/EIA-604-10A, FOCIS 10, Mar. 2002, Telecommunications Industry Association, Arlington, Virginia, 36 pages.
Author Unknown, "Fiber Optic Connector Intermateability Standard—Type MPO ," TIA/EIA-604-5-A, FOCIS-5, Sep. 2001, Telecommunications Industry Association, Arlington, Virginia, 24 pages.
*Panduit Corp.* (Petitioner) V. *Corning Optical Communications LLC* (Patent Owner), Decision Denying Institution of Inter Partes Review, Case IPR2017-00528, U.S. Pat. No. 8,712,206 B2, dated May 31, 2017, 28 pages.
Final Office Action for U.S. Appl. No. 14/660,074, dated May 18, 2017, 4 pages.
Notice of Allowance for U.S. Appl. No. 12/952,912, dated Mar. 29, 2017, 9 pages.
Non-Final Office Action for U.S. Appl. No. 15/412,900, dated Apr. 10, 2017, 10 pages.
Non-Final Office Action for U.S. Appl. No. 15/413,883, dated Mar. 17, 2017, 8 pages.
Non-Final Office Action for U.S. Appl. No. 15/413,962, dated Mar. 24, 2017, 9 pages.
Non-Final Office Action for U.S. Appl. No. 15/412,839, dated Mar. 9, 2017, 9 pages.
Final Office Action for U.S. Appl. No. 12/394,114 dated Oct. 25, 2012, 8 pages.
Non-final Office Action for U.S. Appl. No. 12/915,682 dated Oct. 24, 2012, 8 pages.

(56) References Cited

OTHER PUBLICATIONS

Non-final Office Action for U.S. Appl. No. 12/818,986 dated Feb. 3, 2012, 12 pages.
Final Office Action for U.S. Appl. No. 12/818,986 dated Oct. 18, 2012, 13 pages.
Non-final Office Action for U.S. Appl. No. 12/952,960 dated Oct. 4, 2012, 11 pages.
Non-final Office Action for U.S. Appl. No. 12/953,134 dated Sep. 25, 2012, 8 pages.
Non-final Office Action for U.S. Appl. No. 12/953,039 dated Jan. 11, 2013, 6 pages.
Non-final Office Action for U.S. Appl. No. 12/952,912 dated Dec. 28, 2012, 9 pages.
Non-final Office Action for U.S. Appl. No. 12/953,118 dated Jan. 7, 2013, 9 pages.
Non-final Office Action for U.S. Appl. No. 12/953,536 dated Jan. 2, 2013, 20 pages.
Non-final Office Action for U.S. Appl. No. 12/707,889 dated Jan. 2, 2013, 7 pages.
European Search Report for patent application 10790017.7 dated Nov. 8, 2012, 7 pages.
Examination Report for European patent application 09789090.9-2216 dated Aug. 29, 2011, 4 pages.
Examination Report for European patent application 09789090.9-2216 dated Mar. 30, 2012, 6 pages.
Written Opinion of the International Searching Authority for International patent application PCT/US2009004548, dated Apr. 5, 2011, 6 pages.
European Search Report for European patent application 09789090.9-2217 dated Jan. 24, 2013, 5 pages.
Non-final Office Action for U.S. Appl. No. 12/946,139 dated Jul. 26, 2012, 12 pages.
Final Office Action for U.S. Appl. No. 12/946,139 dated Feb. 15, 2013, 17 pages.
Non-final Office Action for U.S. Appl. No. 12/751,884 dated Feb. 15, 2013, 5 pages.
Non-final Office Action for U.S. Appl. No. 12/394,114 dated Feb. 27, 2013, 8 pages.
Non-final Office Action for U.S. Appl. No. 12/819,065 dated Mar. 4, 2013, 7 pages.
Final Office Action for U.S. Appl. No. 12/952,960 dated Mar. 7, 2013, 13 pages.
Notice of Allowance for U.S. Appl. No. 12/732,487 dated Mar. 19, 2013, 11 pages.
Non-final Office Action for U.S. Appl. No. 12/953,134 dated Mar. 21, 2013, 9 pages.
Final Office Action for U.S. Appl. No. 12/641,617 dated May 10, 2013, 21 pages.
Notice of Allowance for U.S. Appl. No. 13/090,621 dated Apr. 22, 2013, 8 pages.
Final Office Action for U.S. Appl. No. 12/953,039 dated May 1, 2013, 8 pages.
Final Office Action for U.S. Appl. No. 12/953,118 dated May 3, 2013, 11 pages.
Final Office Action for U.S. Appl. No. 12/915,682 dated Apr. 18, 2013, 9 pages.
Advisory Action for U.S. Appl. No. 12/952,960 dated May 15, 2013, 2 pages.
Non-final Office Action for U.S. Appl. No. 12/952,960 dated Jun. 20, 2013, 13 pages.
Non-final Office Action for U.S. Appl. No. 12/953,536 dated Jun. 6, 2013, 21 pages.
Non-final Office Action for U.S. Appl. No. 11/820,300 dated Apr. 25, 2012, 10 pages.
Final Office Action for U.S. Appl. No. 12/871,052 dated Jul. 1, 2013, 12 pages.
Non-final Office Action for U.S. Appl. No. 12/940,699 dated Jun. 26, 2013, 9 pages.
Notice of Allowance for U.S. Appl. No. 13/090,621 dated Jun. 25, 2013, 8 pages.
Non-final Office Action for U.S. Appl. No. 12/956,475 dated Oct. 4, 2012, 7 pages.
Non-final Office Action for U.S. Appl. No. 13/302,067 dated Jun. 7, 2013, 13 pages.
Final Office Action for U.S. Appl. No. 12/771,473 dated Jul. 19, 2013, 7 pages.
Notice of Allowance for U.S. Appl. No. 12/751,884 dated Jul. 17, 2013, 8 pages.
Non-final Office Action for U.S. Appl. No. 12/940,585 dated Aug. 16, 2013, 14 pages.
Final Office Action for U.S. Appl. No. 12/953,134 dated Aug. 23, 2013, 11 pages.
Ex parte Quayle Action for U.S. Appl. No. 12/953,164 dated Aug. 16, 2013, 5 pages.
Non-final Office Action for U.S. Appl. No. 12/732,487 dated Jul. 17, 2013, 22 pages.
Advisory Action for U.S. Appl. No. 12/953,039 dated Jul. 12, 2013, 3 pages.
Advisory Action for U.S. Appl. No. 12/953,118 dated Jul. 12, 2013, 3 pages.
Advisory Action for U.S. Appl. No. 12/641,617 dated Jul. 29, 2013, 3 pages.
Final Office Action for U.S. Appl. No. 12/952,912 dated Aug. 30, 2013, 15 pages.
Advisory Action for U.S. Appl. No. 12/771,473 dated Oct. 2, 2013, 3 pages.
Notice of Allowance for U.S. Appl. No. 12/641,617 dated Sep. 4, 2013, 9 pages.
Unknown, Author, "QuickNet SFQ Series MTP Fiber Optic Cassettes," Panduit Specification Sheet, Jan. 2009, 2 pages.
Unknown Author, "Cellular Specialties introduces the first simulated in-building location-based tracking solution," smart-grid/tmenet.com/news, Sep. 14, 2009, 2 pages.
Unknown Author, "CDMA Co-Pilot Transmitter," Cellular Specialties, Inc., Aug. 2009, 2 pages.
International Search Report for PCT/US2010/038986 dated Aug. 18, 2010, 1 page.
Notice of Allowance for U.S. Appl. No. 12/871,052 dated Sep. 18, 2013, 9 pages.
Non-final Office Action for U.S. Appl. No. 12/953,039 dated Sep. 12, 2013, 8 pages.
Non-final Office Action for U.S. Appl. No. 12/946,139 dated Oct. 2, 2013, 18 pages.
Final Office Action for U.S. Appl. No. 12/394,114 dated Oct. 4, 2013, 10 pages.
Non-final Office Action for U.S. Appl. No. 12/818,986 dated Oct. 4, 2013, 19 pages.
Non-final Office Action for U.S. Appl. No. 13/901,074 dated Oct. 9, 2013, 6 pages.
Advisory Action for U.S. Appl. No. 12/953,134 dated Nov. 4, 2013, 3 pages.
Final Office Action for U.S. Appl. No. 12/952,960 dated Oct. 29, 2013, 8 pages.
Notice of Allowance for U.S. Appl. No. 13/292,130 dated Oct. 18, 2013, 9 pages.
International Search Report and Written Opinion for PCT/US2011/035683 dated Sep. 8, 2011, 15 pages.
International Search Report and Written Opinion for PCT/US2010/039218 dated Oct. 27, 2010, 13 pages.
First Office Action for Chinese patent application 201080032453.2 dated Mar. 26, 2013, 6 pages.
Chinese Search Report for Chinese patent application 201080032453.2 dated May 15, 2013, 2 pages.
First Office Action for Chinese patent application 201080031621.6 dated Sep. 26, 2013, 9 pages.
Chinese Search Report for Chinese patent application 201080031621.6 dated Sep. 13, 2013, 2 pages.
Ramdas, "Modern File Systems and Storage," Proceedings of the 2nd International SANE Conference, May 22-25, 2000, MECC, Maastricht, The Netherlands, Copyright Rodney R. Ramdas, 10 pages.
International Search Report and Written Opinion for PCT/US2011/035684 dated Jul. 1, 2011, 11 pages.

(56) References Cited

OTHER PUBLICATIONS

International Search Report and Written Opinion for PCT/US11/61754 dated Mar. 26, 2012, 9 pages.
Author Unknown, "144 Fiber Patch Panel 1U," Technical Data, ADTEK Group Limited, 2009, 2 pages.
Advisory Action for U.S. Appl. No. 12/394,114 dated Jan. 2, 2014, 3 pages.
Notice of Allowance for U.S. Appl. No. 12/871,052 dated Dec. 24, 2013, 9 pages.
Final Office Action for U.S. Appl. No. 12/953,039 dated Dec. 27, 2013, 10 pages.
Advisory Action for U.S. Appl. No. 12/952,960 dated Jan. 8, 2014, 3 pages.
Advisory Action for U.S. Appl. No. 12/952,912 dated Nov. 26, 2013, 3 pages.
Examiner's Answer to the Appeal Brief for U.S. Appl. No. 12/953,118 dated Dec. 3, 2013, 6 pages.
Non-final Office Action for U.S. Appl. No. 13/597,549 dated Jan. 14, 2014, 9 pages.
Final Office Action for U.S. Appl. No. 12/732,487 dated Dec. 6, 2013, 24 pages.
Final Office Action for U.S. Appl. No. 12/956,446 dated Dec. 23, 2013, 12 pages.
Non-final Office Action for U.S. Appl. No. 12/953,536 dated Dec. 17, 2013, 21 pages.
Non-final Office Action for U.S. Appl. No. 12/819,065 dated Dec. 3, 2013, 8 pages.
International Search Report and Written Opinion for PCT/US2011/062353 dated Apr. 10, 2012, 15 pages.
International Search Report for PCT/US2013/041268 dated Aug. 20, 2013, 5 pages.
Notice of Allowance for U.S. Appl. No. 13/292,130 dated Feb. 14, 2014, 7 pages.
Final Office Action for U.S. Appl. No. 12/707,889 dated Feb. 11, 2014, 17 pages.
Non-final Office Action for U.S. Appl. No. 12/940,699 dated Feb. 3, 2014, 10 pages.
Notice of Allowance for U.S. Appl. No. 12/952,960 dated Feb. 13, 2014, 7 pages.
Notice of Allowance and Applicant-Initiated Interview Summary for U.S. Appl. No. 12/771,473 dated Feb. 27, 2014, 8 pages.
Non-final Office Action for U.S. Appl. No. 13/081,856 dated Nov. 26, 2013, 11 pages.
Non-final Office Action for U.S. Appl. No. 13/663,975 dated Jan. 31, 2014, 18 pages.
Non-final Office Action for U.S. Appl. No. 12/394,114 dated Mar. 21, 2014, 9 pages.
Final Office Action for U.S. Appl. No. 12/940,585 dated Mar. 18, 2014, 15 pages.
Non-final Office Action for U.S. Appl. No. 12/953,101 dated Apr. 3, 2014, 9 pages.
Advisory Action for U.S. Appl. No. 12/953,039 dated Mar. 6, 2014, 3 pages.
Advisory Action for U.S. Appl. No. 12/956,446 dated Mar. 20, 2014, 3 pages.
Final Office Action for U.S. Appl. No. 13/603,894 dated Mar. 20, 2014, 15 pages.
Notice of Allowance for U.S. Appl. No. 12/417,325 dated Aug. 22, 2012, 7 pages.
International Search Report for PCT/US2012/023622 dated Mar. 9, 2012, 4 pages.
International Search Report for PCT/US2012/023635 dated Sep. 14, 2012, 3 pages.
International Search Report for PCT/US2012/023626 dated May 22, 2012, 4 pages.
Notice of Allowance for U.S. Appl. No. 13/951,916 dated Dec. 16, 2013, 12 pages.
International Preliminary Report on Patentability for PCT/US2012/052958 dated Mar. 13, 2014, 14 pages.
Non-final Office Action for U.S. Appl. No. 12/947,883 dated Sep. 6, 2013, 9 pages.
Final Office Action for U.S. Appl. No. 12/947,883 dated Mar. 31, 2014, 13 pages.
International Search Report for PCT/US2012/052958 dated Mar. 1, 2013, 7 pages.
International Search Report for PCT/US2013/041266 dated Aug. 20, 2013, 4 pages.
Non-final Office Action for U.S. Appl. No. 13/621,958 dated Feb. 13, 2014, 10 pages.
Non-final Office Action for U.S. Appl. No. 13/663,949 dated Feb. 3, 2014, 19 pages.
Non-final Office Action for U.S. Appl. No. 12/953,003 dated Apr. 14, 2014, 13 pages.
Non-final Office Action for U.S. Appl. No. 12/953,039 dated Apr. 15, 2014, 8 pages.
Final Office Action for U.S. Appl. No. 12/946,139 dated Apr. 22, 2014, 18 pages.
Final Office Action for U.S. Appl. No. 13/597,549 dated Apr. 24, 2014, 10 pages.
Final Office Action for U.S. Appl. No. 13/901,074 dated May 9, 2014, 7 pages.
Notice of Panel Decision for Pre-Appeal Brief for U.S. Appl. No. 12/417,325 dated Aug. 8, 2012, 2 pages.
Advisory Action for U.S. Appl. No. 12/417,325 dated Jun. 29, 2012, 3 pages.
Advisory Action for U.S. Appl. No. 12/417,325 dated Jun. 12, 2012, 3 pages.
Final Office Action for U.S. Appl. No. 12/417,325 dated Apr. 16, 2012, 6 pages.
Final Office Action for U.S. Appl. No. 12/417,325 dated Feb. 7, 2012, 7 pages.
Non-final Office Action for U.S. Appl. No. 12/417,325 dated Jun. 15, 2011, 6 pages.
Notice of Allowance for U.S. Appl. No. 12/487,929 dated Sep. 12, 2012, 4 pages.
Notice of Allowance for U.S. Appl. No. 12/487,929 dated Jun. 13, 2012, 8 pages.
Advisory Action for U.S. Appl. No. 12/487,929 dated Apr. 17, 2012, 3 pages.
Final Office Action for U.S. Appl. No. 12/487,929 dated Feb. 14, 2012, 6 pages.
Final Office Action for U.S. Appl. No. 12/487,929 dated Dec. 5, 2011, 7 pages.
Non-final Office Action for U.S. Appl. No. 12/487,929 dated May 23, 2011, 7 pages.
Notice of Allowance for U.S. Appl. No. 12/415,253 dated Mar. 11, 2011, 7 pages.
Non-final Office Action for U.S. Appl. No. 12/415,253 dated Jul. 12, 2010, 11 pages.
Final Office Action for U.S. Appl. No. 12/415,253 dated Apr. 16, 2010, 9 pages.
Non-final Office Action for U.S. Appl. No. 12/415,253 dated Sep. 30, 2009, 8 pages.
Non-final Office Action for U.S. Appl. No. 12/641,617 dated Oct. 5, 2012, 21 pages.
Final Office Action for U.S. Appl. No. 12/630,938 dated Jun. 1, 2012, 18 pages.
Non-final Office Action for U.S. Appl. No. 12/630,938 dated Dec. 19, 2011, 15 pages.
Non-final Office Action for U.S. Appl. No. 12/751,884 dated Jul. 2, 2012, 9 pages.
Non-final Office Action for U.S. Appl. No. 12/871,052 dated Aug. 13, 2012, 8 pages.
Decision on Appeal for U.S. Appl. No. 12/221,117 dated Jul. 1, 2014, 7 pages.
Notice of Allowance for U.S. Appl. No. 12/221,117 dated Jul. 16, 2014, 7 pages.
Final Office Action for U.S. Appl. No. 13/081,856 dated Jul. 2, 2014, 8 pages.
Final Office Action for U.S. Appl. No. 12/818,986 dated Jul. 18, 2014, 27 pages.

(56) References Cited

OTHER PUBLICATIONS

Non-final Office Action for U.S. Appl. No. 12/819,065 dated Jul. 18, 2014, 10 pages.
Notice of Allowance for U.S. Appl. No. 13/455,646 dated Jun. 2, 2014, 9 pages.
Notice of Allowance for U.S. Appl. No. 13/597,549 dated Jul. 8, 2014, 8 pages.
Notice of Allowance for U.S. Appl. No. 13/533,093 dated Jul. 8, 2014, 9 pages.
Notice of Allowance for U.S. Appl. No. 13/688,675 dated Jan. 26, 2015, 7 pages.
Non-Final Rejection dated Sep. 7, 2010, for U.S. Appl. No. 12/323,423, 18 pages.
Notice of Allowance for U.S. Appl. No. 12/323,423 dated Jan. 24, 2012, 8 pages.
Examiner's Answer dated Mar. 4, 2011, for U.S. Appl. No. 12/323,415, 11 pages.
Final Rejection dated Jun. 25, 2010, for U.S. Appl. No. 12/323,415, 10 pages.
Non-Final Rejection dated Aug. 5, 2011, for U.S. Appl. No. 12/323,415, 41 pages.
Non-final Office Action for U.S. Appl. No. 12/323,415 dated Apr. 23, 2012, 11 pages.
Non-Final Rejection dated Dec. 10, 2009, for U.S. Appl. No. 12/323,415, 7 pages.
Examiner's Answer to Appeal Brief for U.S. Appl. No. 11/320,062 dated Dec. 8, 2011, 8 pages.
Final Office Action for U.S. Appl. No. 11/320,062 dated Mar. 8, 2011, 8 pages.
Non-final Office Action for U.S. Appl. No. 11/320,062 dated Jan. 15, 2010, 11 pages.
Non-final Office Action for U.S. Appl. No. 12/320,062 dated Sep. 30, 2010, 7 pages.
Final Office Action for U.S. Appl. No. 11/439,086 dated Feb. 4, 2010, 14 pages.
Non-final Office Action for U.S. Appl. No. 11/439,086 dated May 3, 2010, 11 pages.
Non-final Office Action for U.S. Appl. No. 11/439,086 dated Sep. 21, 2009, 10 pages.
Final Office Action for U.S. Appl. No. 12/079,481 dated Mar. 18, 2010, 10 pages.
Non-final Office Action for U.S. Appl. No. 12/079,481 dated Dec. 26, 2008, 9 pages.
Non-final Office Action for U.S. Appl. No. 12/079,481 dated Sep. 16, 2009, 10 pages.
Notice of Allowance for U.S. Appl. No. 12/079,481 dated Jun. 3, 2010, 6 pages.
Notice of Allowance for U.S. Appl. No. 12/079,481 dated Oct. 4, 2010, 4 pages.
Final Office Action for U.S. Appl. No. 12/394,114 dated Dec. 22, 2011, 8 pages.
Non-final Office Action for U.S. Appl. No. 12/394,114 dated Mar. 16, 2012, 8 pages.
Non-final Office Action for U.S. Appl. No. 12/394,114 dated Sep. 1, 2011, 7 pages.
Non-final Office Action for U.S. Appl. No. 12/323,373 dated May 3, 2012, 7 pages.
Non-final Office Action for U.S. Appl. No. 11/809,474 dated Apr. 8, 2008, 13 pages.
Non-final Office Action for U.S. Appl. No. 11/809,474 dated Nov. 13, 2008, 10 pages.
Notice of Allowance for U.S. Appl. No. 11/809,474 dated Jul. 6, 2009, 6 pages.
Final Office Action for U.S. Appl. No. 11/320,031 dated Mar. 8, 2011, 8 pages.
Non-final Office Action for U.S. Appl. No. 11/320,031 dated Jan. 5, 2010, 16 pages.
Non-final Office Action for U.S. Appl. No. 11/320,031 dated Sep. 30, 2010, 7 pages.
Notice of Allowance for U.S. Appl. No. 11/320,031 dated Nov. 15, 2011, 7 pages.
Non-final Office Action for U.S. Appl. No. 12/157,622 dated Mar. 31, 2009, 9 pages.
Non-final Office Action for U.S. Appl. No. 12/157,622 dated Oct. 15, 2009, 9 pages.
Notice of Allowance for U.S. Appl. No. 12/157,622 dated Apr. 22, 2010, 4 pages.
Non-final Office Action for U.S. Appl. No. 12/323,395 dated Dec. 8, 2011, 7 pages.
Non-final Office Action for U.S. Appl. No. 12/415,454 dated Mar. 2, 2012, 5 pages.
Non-final Office Action for U.S. Appl. No. 12/415,454 dated Sep. 6, 2011, 7 pages.
Notice of Allowance for U.S. Appl. No. 12/415,454 dated Jan. 13, 2012, 5 pages.
Non-final Office Action for U.S. Appl. No. 12/576,769 dated Feb. 2, 2012, 23 pages.
Notice of Allowance for U.S. Appl. No. 12/415,454 dated Jun. 19, 2012, 5 pages.
Non-final Office Action for U.S. Appl. No. 13/603,894 dated Oct. 3, 2013, 9 pages.
International Search Report for PCT/US2009/066779 dated Aug. 27, 2010, 3 pages.
"MPO Fiber Optic Rack Panels now available from L-com Connectivity Products," article dated Jun. 4, 2007, 16 pages, http://www.I-com.com/content/Article.aspx?Type=P&ID=438.
"19" Rack Panel with 16 MPO Fiber Optic Couplers—1U high," product page, accessed Oct. 23, 2012, 2 pages, http://www.I-com.com/item.aspx?id=9767#.UlbgG8XXay5.
"Drawing for L-com 1U Panel with 16 MTP couplers," May 15, 2007, 1 page, http://www.I-com.com/multimedia/eng_drawings/PR17516MTP.pdf.
"RapidNet Fibre MTP VHD Cassette," Brochure, Date Unknown, 1 page, http://www.hellermanntyton.se/documents/5000/576_fiber_1U.pdf.
"MPO for Gigabit Ethernet/FAS-NET MTP Solution," Brochure, Date Unknown, 11 pages, http://www.infinique.com/upload/13182286190.pdf.
"Hubbell OptiChannel High Density 144 Port 1U Fiber Enclosure," Brochure, Date Unknown, 2 pages, http://www.hubbell-premise.com/literature/PLDF010.pdf.
Non-final Office Action for U.S. Appl. No. 12/771,473 dated Oct. 4, 2012, 6 pages.
Non-final Office Action for U.S. Appl. No. 12/819,081 dated Aug. 21, 2012, 12 pages.
Annex to Form PCT/ISA/2006, Communication Relating to the Results of the Partial International Search, for PCT/US2009/004549 dated Feb. 10, 2010, 2 pages.
Annex to Form PCT/ISA/206, Communication Relating to the Results of the Partial International Search, for PCT/US2009/004548 dated Jan. 19, 2010, 2 pages.
Corning Cable Systems, "Corning Cable Systems Products for BellSouth High Density Shelves," Jun. 2000, 2 pages.
Corning Cable Systems, "Corning Cable Systems Quick Reference Guide for Verizon FTTP FDH Products," Jun. 2005, 4 pages.
Conner, M. "Passive Optical Design for RFOG and Beyond," Braodband Properties, Apr. 2009, pp. 78-81.
Corning Evolant, "Eclipse Hardware Family," Nov. 2009, 1 page.
Corning Evolant, "Enhanced Management Frame," Dec. 2009, 1 page.
Corning Evolant, "Enhanced Management Frame (EMF)," Specification Sheet, Nov. 2009, 24 pages.
Corning Cable Systems, "Evolant Solutions for Evolving Networks: Fiber Optic Hardware," Oct. 2002, 2 pages.
Corning Cable Systems, "Fiber Optic Hardware with Factory-Installed Pigtails: Features and Benefits," Nov. 2010, 12 pages.
Corning Cable Systems, "FiberManager System 1- and 3-Position Compact Shelves," Jan. 2003, 4 pages.
Corning Cable Systems, "FiberManager System Frame and Components," Jan. 2003, 12 pages.
Corning Cable Systems, "High Density Frame," Jul. 2001, 2 pages.

(56) References Cited

OTHER PUBLICATIONS

Corning Cable Systems, "High Density Frame (HDF) Connector-Splice Shelves and Housings," May 2003, 4 pages.
International Search Report for PCT/US10/35529 dated Jul. 23, 2010, 2 pages.
International Search Report for PCT/US10/35563 dated Jul. 23, 2012, 1 page.
International Search Report for PCT/US2008/002514 dated Aug. 8, 2008, 2 pages.
International Search Report for PCT/US2008/010317 dated Mar. 4, 2008, 2 pages.
International Search Report for PCT/US2009/001692 dated Nov. 24, 2009, 5 pages.
International Search Report for PCT/US2010/024888 dated Jun. 23, 2010, 5 pages.
International Search Report for PCT/US2010/027402 dated Jun. 16, 2010, 2 pages.
Corning Cable Systems, "MTX Frames and Accessories," Feb. 2006, 4 pages.
Panduit, "Lock-in LC Duplex Clip," Accessed Mar. 22, 2012, 1 page.
International Search Report for PCT/US06/49351 dated Apr. 25, 2008, 1 page.
International Search Report for PCT/US09/57069 dated Mar. 24, 2010, 2 pages.
International Search Report for PCT/US2009/057244 dated Nov. 9, 2009 3 pages.
International Search Report for PCTUS2009004548 dated Mar. 19, 2010, 5 pages.
International Search Report for PCTUS2009004549 dated Apr. 20, 2010, 6 pages.
Siecor, "Single Shelf HDF with Slack Storage and Heat Shield (HH1-CSH-1238-1V-BS)," Jan. 1998, 12 pages.
Corning Cable Systems, "Mass Termination Xchange (MTX) Frame System Equipment Office Planning and Application Guide," SRP003-664, Issue 1, Mar. 2005, 57 pages.
Corning Cable Systems, "Mass Termination Xchange (MTX) Equipment Patch Cord Interbay Vertical Channel," SRP003-684, Issue 1, Mar. 2005, 8 pages.
Corning Cable Systems, "High Density Frame (HDF) Installation," SRP003-355, Issue 4, Sep. 2002, 18 pages.
Written Opinion for PCT/US2010/023901 dated Aug. 25, 2011, 8 pages.
Advisory Action for U.S. Appl. No. 12/221,117 dated Aug. 24, 2011, 3 pages.
Examiner's Answer to Appeal Brief for U.S. Appl. No. 12/221,117 dated Mar. 29, 2012, 16 pages.
Final Office Action for U.S. Appl. No. 12/221,117 dated Feb. 19, 2010, 7 pages.
Final Office Action for U.S. Appl. No. 12/221,117 dated Jun. 10, 2011, 8 pages.
Non-final Office Action for U.S. Appl. No. 12/221,117 dated Jul. 14, 2010, 7 pages.
Non-final Office Action for U.S. Appl. No. 12/221,117 dated Jun. 9, 2009, 5 pages.
Non-final Office Action for U.S. Appl. No. 12/221,117 dated Dec. 21, 2010, 7 pages.
Advisory Action for U.S. Appl. No. 12/394,483 dated Feb. 16, 2012, 3 pages.
Final Office Action for U.S. Appl. No. 12/394,483 dated Dec. 6, 2011, 14 pages.
Non-final Office Action for U.S. Appl. No. 12/394,483 dated Jun. 17, 2011, 11 pages.
Advisory Action for U.S. Appl. No. 12/950,234 dated Dec. 21, 2011, 3 pages.
Non-final Office Action for U.S. Appl. No. 12/950,234 dated Jun. 17, 2011, 7 pages.
Non-final Office Action for U.S. Appl. No. 12/950,234 dated Mar. 12, 2012, 10 pages.
Final Office Action for U.S. Appl. No. 12/950,234 dated Oct. 14, 2011, 10 pages.
Advisory Action dated May 12, 2011, for U.S. Appl. No. 12/323,423, 3 pages.
Final Rejection dated Mar. 3, 2011, for U.S. Appl. No. 12/323,423, 17 pages.
Non-Final Rejection dated Aug. 5, 2011, for U.S. Appl. No. 12/323,423, 13 pages.
Notice of Allowance for U.S. Appl. No. 13/663,975, dated Oct. 4, 2017, 8 pages.
Final Office Action for U.S. Appl. No. 15/412,839, dated Nov. 3, 2017, 14 pages.
Final Office Action for U.S. Appl. No. 15/412,900, dated Oct. 6, 2017, 15 pages.
Final Office Action for U.S. Appl. No. 15/413,883, dated Oct. 6, 2017, 13 pages.
Final Office Action for U.S. Appl. No. 15/413,962, dated Oct. 10, 2017, 16 pages.
Decision on Appeal for U.S. Appl. No. 13/663,975, dated Aug. 24, 2017, 6 pages.
*Paduit Corp.* (Petitioner) v. *Corning Optical Communications LLC* (Patent Owner), Final Written Decision, Case IPR2016-01703, U.S. Pat. No. 8,452,148 B2, dated Feb. 27, 2018, 44 pages.
*Panduit Corp.* (Petitioner) v. *Corning Optical Communications LLC* (Patent Owner), Final Written Decision, Case IPR2016-01709, U.S. Pat. No. 8,184,938 B2, dated Feb. 27, 2018, 41 pages.
Extended European Search Report for European Patent Application No. 10790017.7, dated Oct. 22, 2012, 6 pages.
International Search Report and Written Opinion for PCT/US2009/004548, dated Mar. 19, 2010, 18 pages.
International Search Report and Written Opinion for PCT/US10/035529, dated Jul. 23, 2010, 10 pages.
International Search Report and Written Opinion for PCT/US2010/038580, dated Aug. 18, 2010, 8 pages.
International Search Report and Written Opinion for PCT/US2010/039225, dated Oct. 14, 2010, 17 pages.
International Preliminary Report on Patentability for PCT/US2009/004549, dated Mar. 1, 2011, 10 pages.
International Preliminary Report on Patentability for PCT/US2009/004548, dated Mar. 1, 2011, 8 pages.
International Preliminary Report on Patentability for PCT/US2010/035529, dated Dec. 1, 2011, 9 pages.
English Translation of the First Office Action for Chinese Patent Application No. 2009101715265, dated Jan. 31, 2012, 10 pages.
English Translation of the First Office Action for Chinese Patent Application No. 200980134014X, dated Oct. 16, 2012, 7 pages.
English Translation of the First Office Action for Chinese Patent Application No. 200980134013.5, dated Nov. 5, 2012, 3 pages.
English Translation of the First Office Action for Chinese Patent Application No. 201080022305.2, dated Feb. 25, 2013, 8 pages.
English Translation of the First Office Action for Chinese Patent Application No. 2010800314136, dated Feb. 27, 2013, 9 pages.
Notification of Reason for Rejection for Japanese Patent Application No. 2011-524964, dated Sep. 17, 2013, 8 pages.
English Translation of the Second Office Action for Chinese Patent Application No. 200980134013.5, dated Sep. 26, 2013, 9 pages.
English Translation of the Second Office Action for Chinese Patent Application No. 201080031413.6, dated Dec. 31, 2013, 10 pages.
English Translation of the Second Office Action for Chinese Patent Application No. 201080022305.2, dated Jan. 16, 2014, 5 pages.
Notification of Reason for Rejection for Japanese Patent Application No. 2012-516180, dated Feb. 24, 2014, 4 pages.
English Translation of the First Office Action for Chinese Patent Application No. 201080031967.6, dated Jan. 15, 2014, 6 pages.
Notification of Reason for Rejection for Japanese Patent Application No. 2012-512020, dated Mar. 3, 2014, 5 pages.
Examination Report for European Patent Application No. 10778368.0, dated Jan. 13, 2014, 4 pages.
Patent Examination Report No. 1 for Australian Patent Application No. 2010260251, dated Jun. 12, 2014, 3 pages.
English Translation of the Third Office Action for Chinese Patent Application No. 200980134013.5, dated Jun. 9, 2014, 5 pages.

(56) References Cited

OTHER PUBLICATIONS

Patent Examination Report No. 1 for Australian Patent Application No. 2009286118, dated Jun. 26, 2014, 3 pages.
Patent Examination Report No. 1 for Australian Patent Application No. 2010249538, dated Jun. 26, 2014, 4 pages.
Decision for Final Rejection for Japanese Patent Application No. 2011-524964, dated Jul. 14, 2014, 6 pages.
English Translation of the Third Office Action for Chinese Patent Application No. 201080022305.2, dated Oct. 8, 2014, 5 pages.
English Translation of Decision of Rejection for Chinese Patent Application No. 201080031413.6, dated Sep. 2, 2014, 10 pages.
Notification of Reason for Rejection for Japanese Patent Application No. 2012-516180, dated Sep. 22, 2014, 3 pages.
English Translation of the Second Office Action for Chinese Patent Application No. 201080031967.6, dated Oct. 17, 2014, 7 pages.
English Translation of the Notification of the Office Rejection for Chinese Patent Application No. 200980134013.5, dated Feb. 16, 2015, 10 pages.
Examination Report for European Patent Application No. 09789091.7, dated May 8, 2015, 3 pages.
Examination Report for European Patent Application No. 10778368.0, dated May 13, 2015, 4 pages.
Summons to Attend Oral Proceedings for European Patent Application No. 10790017.7, dated Dec. 3, 2015, 7 pages.
Extended European Search Report for European Patent Application No. 15189567.9, dated Jan. 28, 2016, 9 pages.
Office Action for Canadian Patent Application No. 2734718, dated Oct. 7, 2015, 7 pages.
English Translation of Notification for Reexamination for Chinese Patent Application No. 201080031413.6, dated Feb. 24, 2016, 8 pages.
English Translation of Notification of Reexamination for Chinese Patent Application No. 200980134013.5, dated Mar. 14, 2016, 9 pages.
Office Action for Canadian Patent Application No. 2760818, dated Apr. 19, 2016, 3 pages.
Patent Examination Report No. 1 for Australian Patent Application No. 2015210380, dated May 3, 2016, 2 pages.
Office Action for Canadian Patent Application No. 2765837, dated May 17, 2016, 3 pages.
English Translation of Notification of Reexamination for Chinese Patent Application No. 200980135014.X, dated Feb. 29, 2016, 8 pages.
Extended European Search Report for European Patent Application No. 15184772.0, dated Jun. 14, 2016, 14 pages.
Patent Examination Report No. 1 for Australian Patent Application No. 2015203580, dated Jul. 4, 2016, 2 pages.
Extended European Patent Application No. 16176271.1, dated Sep. 29, 2016, 12 pages.
Partial European Search Report for European Patent Application No. 16173431.4, dated Oct. 20, 2016, 8 pages.
Decision for Reexamination for Chinese Patent Application No. 200980134014.X, dated Oct. 10, 2016, 15 pages.
Extended European Search Report for European Patent Application No. 16173431.4, dated Feb. 22, 2017, 12 pages.
Office Action for Canadian Patent Application No. 2765912, dated Apr. 5, 2017, 4 pages.
Office Action for Canadian Patent Application No. 2765837, dated Apr. 26, 2017, 3 pages.
Examination Report No. 1 for Australian Patent Application No. 2017221853, dated Mar. 16, 2018, 4 pages.
Decision on Appeal for Japanese Patent Application No. 2012-516347, dated Jul. 15, 2017, 8 pages.
Office Action for Canadian Patent Application No. 2765912, dated Mar. 9, 2018, 3 pages.
Notification of Grant for Japanese Patent Application No. 2012512020, dated Oct. 27, 2015, 4 pages.
Notice of Acceptance for Australian Patent Application No. 2009208086, dated Apr. 24, 2015, 2 pages.
Patent Examination Report No. 1 for Australian Patent Application No. 2009208086, dated Jul. 12, 2014, 3 pages.
Author Unknown, "Fibre Frame Solutions," Fibre Connectivity Solutions, 6356_au, Jun. 2007, ADC Krone, 123 pages.
Bulow, Knut, "ADC licenses Lx.5 SFF connector to Amphenol," Cabling, Install, Aug. 10, 2001, 1 page.
Author Unkown, "ADC Features New Fiber Optic Products at ECOC 2004," Business Wire, Sep. 6, 2004, 3 pages.
Author Unknown, "ADC FasTerm Multimode Lx.5 Connector," Installation Instructions, ADCP-90-422, Issue 2, Apr. 2001, ADC Telecommunications, Inc., 25 pages.
Author Unknown, "FDM Series Fiber Distribution and Splice Modules," User Manual, ADCP-90-138, Issue 3, Oct. 2002, ADC Telecommunications, Inc., 34 pages.
Author Unkown, "ADC Next Generation Frame 96 & 144 Position Fiber Termination Block," User Manual, ADCP-90-287, Issue 2, May 2009, ADC Telecommunications, Inc., 42 pages.
Author Unknown, "Small-Form-Factor Connector," Product Data Sheet, 100082PR, Sep. 2001, ADC Telecommunications, Inc., 4 pages.
Author Unknown, "AFD Outside Plant Connector Modules," User Manual, ADCP-93-303, Issue 1, Jun. 2000, ADC Telecommunications, Inc., 14 pages.
Author Unknown, "Suhner Fiberoptic LX.5 Connector Family," Product Data Sheet, Jan. 3, 2000, Huber and Suhner, 4 pages.
Author Unknown, "OmniReach FTTP Solutions," Product Data Sheet 1276559, Apr. 2004, ADC Telecommunications, Inc., 12 pages.
Author Unknown, "Fiber Optic Cassettes," Product Search Results, Apr. 25, 2018, Panduit, 17 pages.
Author Unknown, "Pro Patch: Fiber Optical Normal Through Panel," Product Data Page, www.clarkwire.com/Propatchopticalnormalthroughpanel.htm, accessed Apr. 25, 2018, 2 pages.
Non-Final Office Action for U.S. Appl. No. 15/412,900, dated May 10, 2018, 6 pages.
Non-Final Office Action for U.S. Appl. No. 15/413,883, dated May 9, 2018, 6 pages.
Non-Final Office Action for U.S. Appl. No. 15/413,962, dated May 2, 2018, 6 pages.
Easton et al., "High-density optical connectivity in the data center," Cabling: Installation & Maintenance, Feb. 1, 2010, www.cablinginstall.com/articles/print/volume-18/issue-2/features/-high-density-optical.htm, PennWell Corporation, Tusla, Oklahoma, 15 pages.
Final Office Action for U.S. Appl. No. 13/663,975, dated Jan. 10, 2019, 24 pages.
Non-Final Office Action for U.S. Appl. No. 15/886,402, dated Jan. 10, 2019, 17 pages.
Non-Final Office Action for U.S. Appl. No. 15/886,342, dated Jan. 18, 2019, 15 pages.
Non-Final Office Action for U.S. Appl. No. 13/663,975, dated Aug. 1, 2018, 24 pages.
Notice of Allowance for U.S. Appl. No. 15/412,839, dated Aug. 14, 2018, 7 pages.
Non-Final Office Action for U.S. Appl. No. 15/412,839, dated Jun. 14, 2018, 7 pages.
Notice of Allowance for U.S. Appl. No. 15/413,883, dated Sep. 14, 2018, 8 pages.
Notice of Allowance for U.S. Appl. No. 15/413,962, dated Oct. 12, 2018, 8 pages.
Advisory Action for U.S. Appl. No. 16/663,975, dated Jun. 13, 2019, 5 pages.
Non-Final Office Action for U.S. Appl. No. 15/886,342, dated Jul. 12, 2019, 10 pages.
Non-Final Office Action for U.S. Appl. No. 16/376,529, dated May 23, 2019, 5 pages.
Notice of Allowance for U.S. Appl. No. 16/376,542, dated Jun. 13, 2019, 7 pages.

* cited by examiner

INDEPENDENTLY TRANSLATABLE MODULES AND FIBER OPTIC EQUIPMENT TRAYS IN FIBER OPTIC EQUIPMENT

PRIORITY APPLICATIONS

The present application is a continuation application of U.S. patent application Ser. No. 13/901,074, filed May 23, 2013, entitled "Independently Translatable Modules and Fiber Optic Equipment Trays in Fiber Optic Equipment," published as U.S. Patent Application Publication No. 2013/0251326 A1 on Sep. 26, 2013, which is a continuation application of U.S. patent application Ser. No. 12/323,415, filed Nov. 25, 2008, entitled "Independently Translatable Modules and Fiber Optic Equipment Trays in Fiber Optic Equipment," issued as U.S. Pat. No. 8,452,148, which claims priority to U.S. Provisional Patent Application Ser. No. 61/197,068 filed Oct. 23, 2008, entitled "High Density Data Center Hardware, Assemblies and Components," and which also claims priority to U.S. Provisional Patent Application Ser. No. 61/190,538 filed Aug. 29, 2008, entitled "High Density Data Center Hardware, Assemblies and Components," all of which are incorporated by reference herein in their entireties.

RELATED APPLICATIONS

The present application is related to U.S. patent application Ser. No. 12/323,423, filed on Nov. 25, 2008 entitled "Rear-Installable Fiber Optic Modules and Equipment," issued as U.S. Pat. No. 8,184,938, which is incorporated herein by reference in its entirety.

The present application is also related to U.S. patent application Ser. No. 12/394,483 entitled "Rear Slidable Extension in Fiber Optic Equipment Tray," issued as U.S. Pat. No. 8,326,107, which is incorporated herein by reference in its entirety.

The present application is also related to U.S. patent application Ser. No. 15/412,839, filed on Jan. 23, 2017 entitled "Independently Translatable Modules and Fiber Optic Equipment Trays in Fiber Optic Equipment," now issued as U.S. Pat. No. 10,094,996, with the foregoing patent being incorporated by reference herein.

The present application is also related to U.S. patent application Ser. No. 15/412,900, filed on Jan. 23, 2017 entitled "Independently Translatable Modules and Fiber Optic Equipment Trays in Fiber Optic Equipment," now issued as U.S. Pat. No. 10,120,153, with the foregoing patent being incorporated by reference herein.

The present application is also related to U.S. patent application Ser. No. 15/413,883, filed on Jan. 24, 2017 entitled "Independently Translatable Modules and Fiber Optic Equipment Trays in Fiber Optic Equipment," now issued as U.S. Pat. No. 10,126,514, with the patent being incorporated by reference herein.

The present application is also related to U.S. patent application Ser. No. 15/413,962, filed on Jan. 24, 2017 entitled "Independently Translatable Modules and Fiber Optic Equipment Trays in Fiber Optic Equipment," now issued as U.S. Patent No. 10,222,570, with the patent being incorporated by reference herein.

BACKGROUND

Field of the Disclosure

The technology of the disclosure relates to fiber optic modules for fiber optic equipment. The fiber optic modules can be included in fiber optic equipment rack and/or trays.

Technical Background

Benefits of optical fiber use include extremely wide bandwidth and low noise operation. Because of these advantages, optical fiber is increasingly being used for a variety of applications, including but not limited to broadband voice, video, and data transmission. Fiber optic networks employing optical fiber are being developed and used to deliver voice, video, and data transmissions to subscribers over both private and public networks. These fiber optic networks often include separated connection points at which it is necessary to link optical fibers in order to provide "live fiber" from one connection point to another connection point. In this regard, fiber optic equipment is located in data distribution centers or central offices to support interconnections.

The fiber optic equipment is customized based on the application need. The fiber optic equipment is typically included in housings that are mounted in equipment racks to maximize space. One example of such fiber optic equipment is a fiber optic module. A fiber optic module is designed to provide cable-to-cable fiber optic connections and manage the polarity of fiber optic cable connections. The fiber optic module is typically mounted to a chassis which is then mounted inside an equipment rack or housing. The chassis may be provided in the form of a tray that is extendable from the equipment rack like a drawer. This allows a technician access to fiber optic adapters disposed in the fiber optic module and any fiber optic cables connected to the fiber optic adapters without removing the fiber optic module from the equipment rack.

Due to increasing bandwidth needs and the need to provide high connectivity density in data centers for increased revenue generating opportunities, fiber optic networks are migrating to higher cable fiber counts. Multi-fiber cables are used to provide higher cable fiber counts and are used for trunk connections in a fiber optic network. In general, higher density connections make it more difficult to access optical components and connections. The same is true for fiber optic modules because of the increased number of fiber optic adapters disposed in the fiber optic modules to handle the higher connectivity density. Increased density makes hand access to optical components and connectors as well as the routing and organizing jumper connections more difficult. Even with fiber optic equipment tray pull out capabilities, a need still exists to improve access to optical components in a fiber optic equipment tray as well as provide neat routing and organization of jumper connections.

SUMMARY OF THE DETAILED DESCRIPTION

Embodiments disclosed in the detailed description include fiber optic equipment and apparatuses that support independently translatable fiber optic modules and/or fiber optic equipment trays containing one or more fiber optic modules. In some embodiments, one or more fiber optic modules are disposed in a plurality of independently translatable fiber optic equipment trays. The fiber optic equipment trays are received in a tray guide system disposed in the fiber optic equipment. In this manner, each fiber optic equipment tray is independently translatable within the guide system. The one or more fiber optic modules disposed in each fiber optic equipment tray translate with their respective fiber optic equipment tray when translated.

One or more module guides may also be disposed in each of the fiber optic equipment trays. The fiber optic modules can be disposed in one or more module guides. The fiber optic modules translate within the module guides. In this manner, each fiber optic module disposed in a given fiber optic equipment tray may translate independently of other fiber optic modules in the same fiber optic equipment tray as well as each fiber optic equipment tray being independently translatable to other fiber optic equipment trays within the tray guide system.

In other embodiments, a plurality of fiber optic modules is disposed in a module guide system in the fiber optic equipment without need or requirement for an intermediate fiber optic equipment tray. Each of the fiber optic modules translates independently of other fiber optic modules disposed within the module guide system. One or more fiber optic equipment trays may also be provided. The fiber optic equipment trays may contain a locking feature adjacent the front end of the fiber optic equipment that releasably retains one or more fiber optic modules when moved forward within the guide system towards the front end of the fiber optic equipment. In this manner, a fiber optic equipment tray may be pulled to translate a fiber optic module forward from the fiber optic equipment.

Additional features and advantages of the invention will be set forth in the detailed description which follows, and in part will be readily apparent to those skilled in the art from that description or recognized by practicing the invention as described herein, including the detailed description that follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operation of the invention.

DETAILED DESCRIPTION OF THE PREFERRED EMBODIMENTS

Reference will now be made in detail to the preferred embodiments of the present invention, examples of which are illustrated in the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Whenever possible, like reference numbers will be used to refer to like components or parts.

Embodiments disclosed in the detailed description include fiber optic equipment and apparatuses that support independently translatable fiber optic modules and/or fiber optic equipment trays containing one or more fiber optic modules. In some embodiments, one or more fiber optic modules are disposed in a plurality of independently translatable fiber optic equipment trays. The fiber optic equipment trays are received in a tray guide system disposed in the fiber optic equipment. In this manner, each fiber optic equipment tray is independently translatable within the guide system. The one or more fiber optic modules disposed in each fiber optic equipment tray translate with their respective fiber optic equipment tray when translated.

One or more module guides may also be disposed in each of the fiber optic equipment trays. The fiber optic modules can be disposed in one or more module guides. The fiber optic modules translate within the module guides. In this manner, each fiber optic module disposed in a given fiber optic equipment tray may translate independently of other fiber optic modules in the same fiber optic equipment tray as well as each fiber optic equipment tray being independently translatable to other fiber optic equipment trays within the tray guide system.

Figure 1:
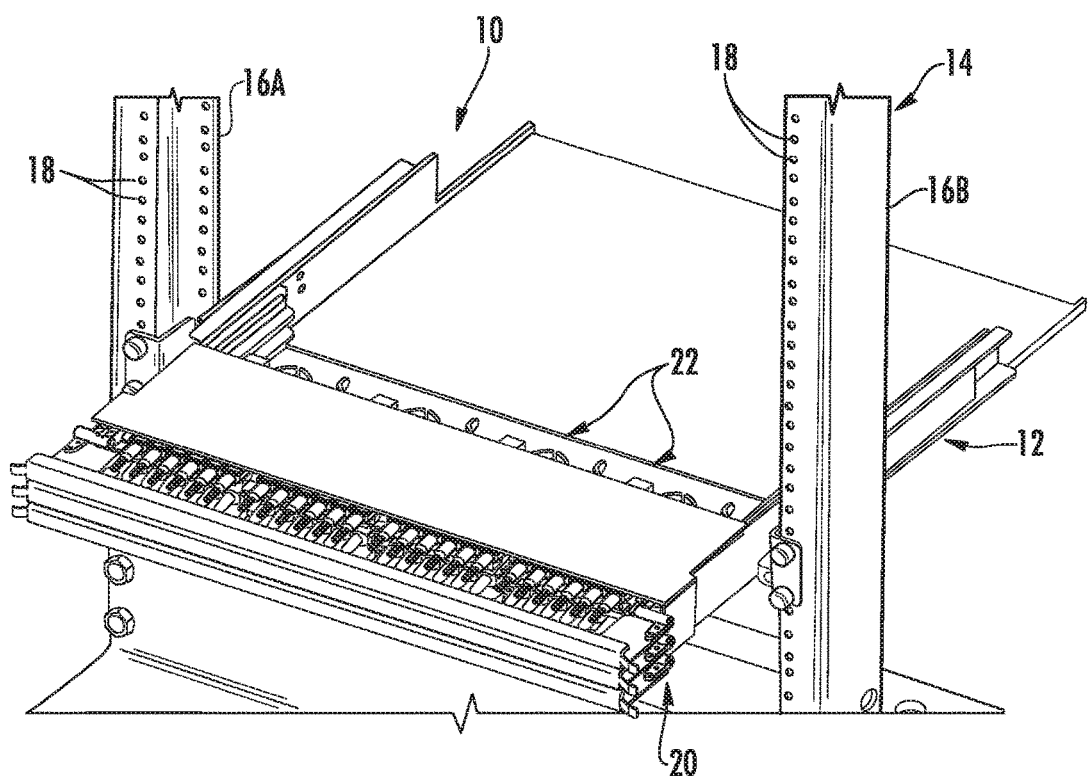
FIG. 1 is a front perspective view of an exemplary fiber optic equipment rack with exemplary fiber optic equipment supporting rear-installable fiber optic modules according to one embodiment.

In this regard, FIG. 1 illustrates exemplary fiber optic equipment 10. The fiber optic equipment 10 may be provided at a data distribution center or central office to support cable-to-cable fiber optic connections and to manage a plurality of fiber optic cable connections. As will be described in greater detail below, the fiber optic equipment 10 has one or more fiber optic equipment trays that each support one or more rear-installable fiber optic modules. The fiber optic modules can be fiber optic adapter modules or any other type of fiber optic modules or fiber optic apparatuses, including those that support fiber optic connections. Both the fiber optic modules and the fiber optic equipment trays are rear-installable, meaning they can be installed from a rear section of the fiber optic equipment 10. Further, both the fiber optic equipment trays and the fiber optic modules supported therein are independently translatable about the chassis for installation, access, and/or removal.

In this regard and as illustrated in FIG. 1, the fiber optic equipment 10 includes a fiber optic equipment chassis 12 ("chassis 12"). The chassis 12 is shown as being installed in a fiber optic equipment rack 14. The fiber optic equipment rack 14 contains two vertical rails 16A, 16B that extend vertically and include a series of apertures 18 for facilitating attachment of the fiber optic equipment 10 inside the fiber optic equipment rack 14. The fiber optic equipment 10 is attached and supported by the fiber optic equipment rack 14 in the form of shelves that are stacked on top of each other within the vertical rails 16A, 16B. As illustrated, the fiber optic equipment 10 is attached to the vertical rails 16A, 16B. The fiber optic equipment rack 14 may support 1U-sized shelves, with "U" equal a standard 1.75 inches in height. As will be discussed in greater detail later in this application, the fiber optic equipment 10 includes a plurality of extendable fiber optic equipment trays 20 that each carries one or more rear-installable fiber optic modules 22. In this example, the fiber optic equipment 10 provides a density of 144 fibers, although it is not limited to this density. Further, as will also be described in more detail below, each fiber optic equipment tray 20 is independently translatable and accessible to access the fiber optic modules supported therein.

FIG. 2A illustrates a rear perspective view of the fiber optic equipment 10 illustrated in FIG. 1. The fiber optic equipment 10 is provided in the chassis 12 that defines a front end 24, a rear section 26, a first end 28, and a second end 30. The first end 28 of the chassis 12 is disposed on the opposite side of the second end 30 of the chassis 12. A guide system in the form of a rail guide system 32 is provided to support the rear-installable fiber optic modules 22. The rail guide system 32 comprises two tray rail guides 32A, 32B attached to the chassis 12 on the first end 28 and the second end 30, respectively. The tray rail guides 32A, 32B are configured to support one or more fiber optic equipment trays that support the fiber optic modules 22, which will be illustrated in FIG. 3 and described below. The tray rail guides 32A, 32B allow each fiber optic equipment tray 20 installed therein to be translated about the chassis 12. In this example, the chassis 12 supports three (3) fiber optic equipment trays 20 with each one stacked on top of each other. A tray cover 34 is disposed on top of the top fiber optic equipment tray 20 disposed in the chassis 12 and within the tray rail guides 32A, 32B. As will be discussed later in this application, each fiber optic equipment tray 20 contains a fiber routing tray 36 attached thereto to support routing of optical fibers connected to the fiber optic modules 22. The fiber routing tray 36 can be extended and lowered as desired to obtain access to the fiber optic modules 22 from the front end 24 of the fiber optic equipment 10.

FIG. 2B illustrates the tray rail guides 32A, 32B in more detail. As illustrated therein, the tray rail guides 32A, 32B form a series of channels 38A-38C, wherein each channel 38A-38C is configured to receive a fiber optic equipment tray 20. The tray rail guides 32A, 32B allow a plurality of fiber optic trays 20 arranged in a column format. The tray rail guides 32A, 32B comprise an end portion 40 by which the channels 38A-38C stop and the fiber optic equipment trays 20 cannot extend beyond. This end portion 40 is disposed in an orientation such that it is adjacent the rear section 26 of the fiber optic equipment 10. The tray rail guides 32A, 32B also contain an entry portion 42 through which the fiber optic equipment trays 20 can be inserted into the channels 38A-38C. Note that the entry portion 42 does not close off the channels 38A-38C such that the fiber optic equipment trays 20 can be extended beyond the entry portion 42 back towards the rear section 26 of the chassis 12. In this manner, the tray rail guides 32A, 32B support rear installation of fiber optic equipment trays 20 into the chassis 12 from the rear section 26.

Figure 3:
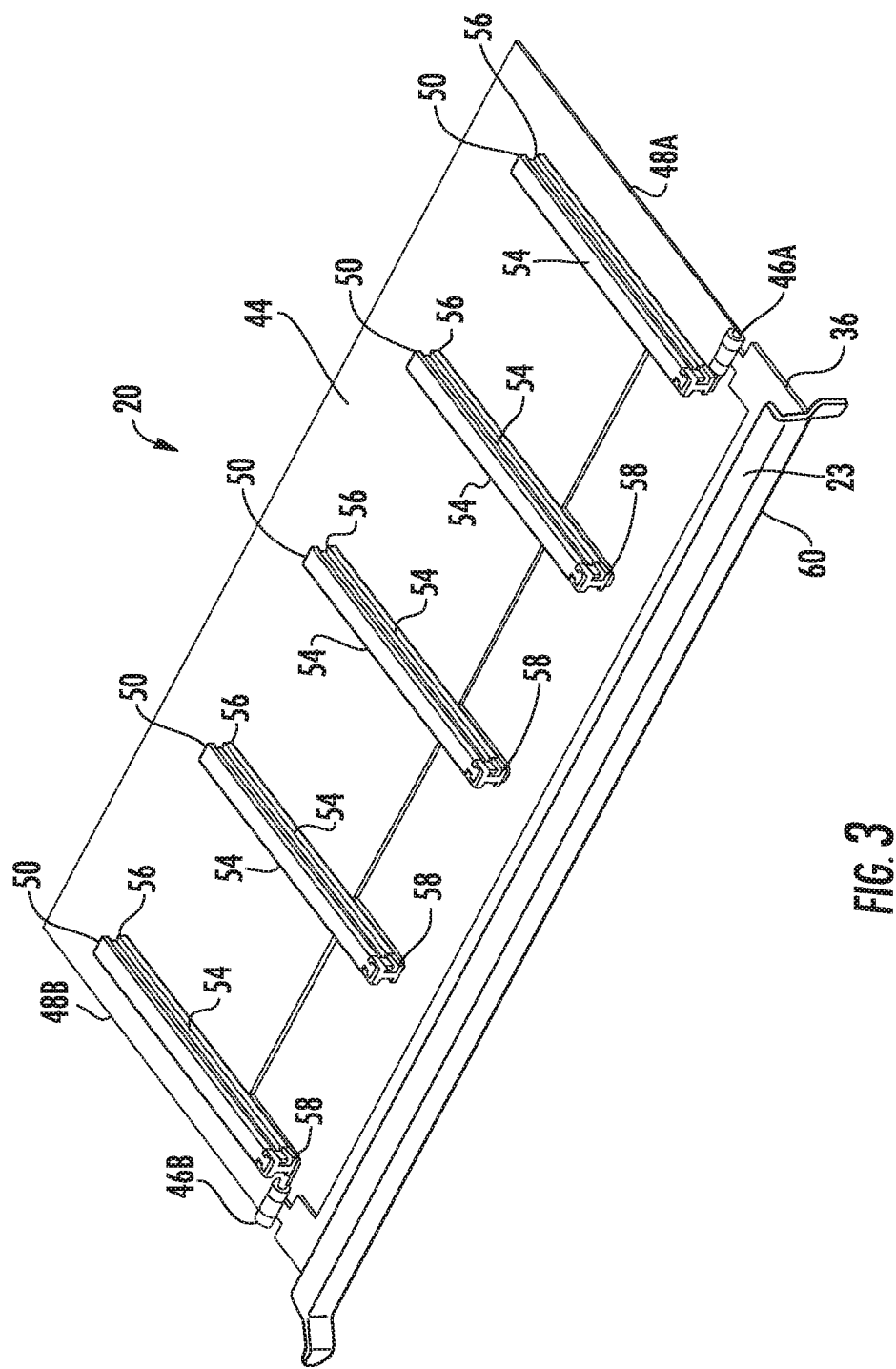
FIG. 3 is a front perspective view of an individual fiber optic equipment tray in the fiber optic equipment of FIG. 1 without rear-installable fiber optic modules installed in module guides disposed in the fiber optic equipment tray.

FIG. 3 illustrates an individual fiber optic equipment tray 20 not disposed in the chassis 12 or contained within the tray rail guides 32A, 32B for further discussion and illustration. As illustrated therein, the fiber optic equipment tray 20 contains a main tray portion 44 and the fiber routing tray 36 attached thereto. The fiber routing tray 36 is attached to the main tray portion 44 via hinge mechanisms in the form of hinges 46A, 46B disposed on each end 48A, 48B of the main tray portion 44. The main tray portion 44 contains a plurality of module guides in the form of module rail guides 50 that support the fiber optic modules 22. More specifically, the fiber optic modules 22 contain rails (elements 52A, 52B in FIG. 4) that couple to tray channels 54 disposed within the module rail guides 50. The fiber optic modules 22 are disposed in a row arrangement if at least one intermediate module rail guide 50 is disposed in the fiber optic equipment tray 20. Providing a plurality of tray channels 54 in each module rail guide 50 allows a plurality of fiber optic modules 22 to be stacked on top of each other in a column arrangement. The fiber optic modules 22 can be moved within the module rail guides 50 in the fiber optic equipment tray 20 either towards the front end 24 of the chassis 12 or the rear section 26 or the chassis 12. The fiber optic equipment trays 20 can also be moved about the tray rail guides 32A, 32B. In this manner, the fiber optic equipment trays 20 can be translated independently of each other about the tray rail guides 32A, 32B, and each of the fiber optic modules 22 within a given fiber optic equipment tray 20 can be independently translated within their respective module rail guides 50.

Note that in FIG. 3, the fiber optic equipment tray 20 contains five (5) module rail guides 50, which means that the fiber optic equipment tray 20 can support four (4) individual fiber optic modules 22. Four (4) fiber optic modules 22 can be installed in the fiber optic equipment tray 20 of FIG. 3, or less than four as desired or as required according to installation requirements. Also as shown in FIG. 3 and as illustrated in more detail in FIG. 4, the module rail guides 50 are configured such that the tray channels 54 are open on a rear end 56 of the module rail guides 50. This allows the fiber optic modules 22 to be rear-installable into the fiber optic equipment trays 20 from the rear section 26 of the chassis 12. More specifically, the fiber optic equipment tray 20 is disposed in the chassis 12 such that the rear ends 56 of the module rail guides 50 are oriented towards the rear section 26 of the chassis 12. Thus, as will be discussed in more detail below, the fiber optic modules 22 can be inserted into the rear ends 56 of the module rail guides 50 and pushed forward within the module rail guides 50 until the fiber optic modules 22 reach a front end 58 of each module rail guide 50. A locking feature not illustrated in FIG. 3, but described later below in this application, can be provided to prevent the fiber optic module 22 from extending beyond the front end 58 of the module rail guides 50 unless a release is engaged. In this manner, the fiber optic modules 22 can be installed from the rear of the chassis 12, but can also be extended and removed from the front end 24 of the chassis 12 as well.

Also as illustrated in FIG. 3, the fiber routing tray 36 is formed from sheet metal or other material that is bent on top of itself in a U-shape on a front end 60 of the fiber routing tray 36. In this manner, optic fibers extending from the fiber optic modules 22 installed in the fiber optic equipment tray 20, and in particular the module rail guides 50 disposed therein, can be routed underneath a lip section 23 contained in the fiber routing tray 36 and disposed to either end 48A, 48B of the fiber optic equipment tray 20 to be routed for connection to other fiber optic equipment.

Figure 2:
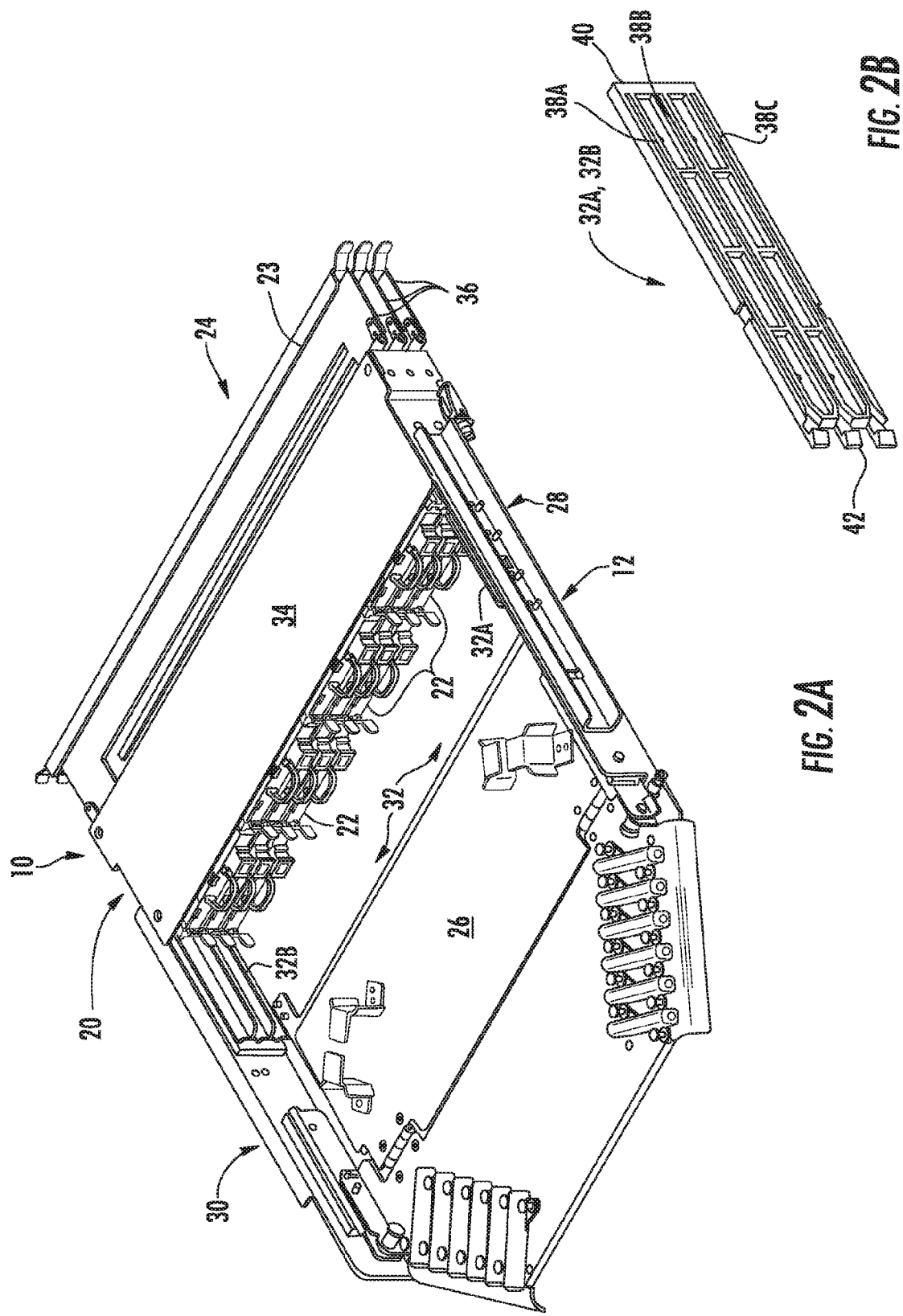
FIG. 2A is a rear perspective view of the fiber optic equipment supporting the rear-installable fiber optic modules of FIG. 1.
FIG. 2B is a perspective view of fiber optic equipment tray guides disposed in the fiber optic equipment of FIG. 1.
Figure 4:
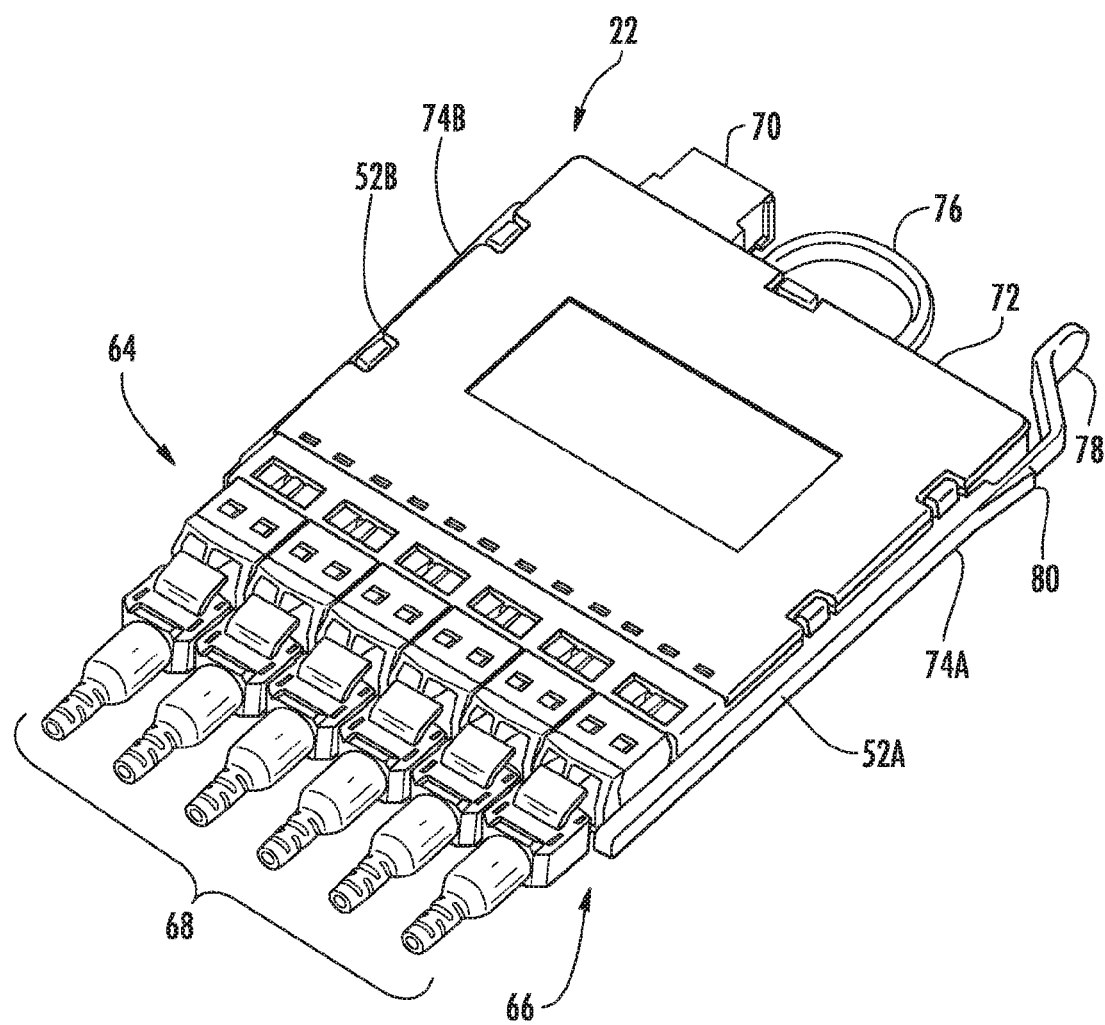
FIG. 4 is a front perspective view of a fiber optic module that is rear-installable in the fiber optic equipment tray of FIG. 3.

FIG. 4 illustrates an example of a fiber optic module 22 that is supported in the fiber optic equipment tray 20 in FIGS. 1-3. As illustrated therein, the fiber optic module 22 is comprised of a number of fiber optic adapters 64 disposed on a front end 66 of the fiber optic module 22. In this example, the fiber optic adapters 64 accept duplex LC fiber optic connectors 68. However, any fiber optic connection type desired can be provided in the fiber optic modules 22. Fiber optic cables (not shown) extend from the fiber optic connectors 68 to establish fiber optic connections with other equipment. Another fiber optic adapter 70 is disposed on a rear end 72 of the fiber optic module 22. In this example, the fiber optic adapter 70 is an MTP fiber optic adapter equipped to establish connections to up to twelve (12) optical fibers. The fiber optic module 22 may also manage polarity between the fiber optic connectors 68 and the fiber optic adapters 64 disposed on the front end 66 of the fiber optic module 22 and the fiber optic adapter 70 disposed on the rear end 72 of the fiber optic module 22.

Module rails 52A, 52B are disposed on each side 74A, 74B of the fiber optic module 22. The module rails 52A, 52B are configured to be inserted within the tray channels 54 of the module rail guides 50 in the fiber optic equipment tray 20 as illustrated in FIG. 3. In this manner, when it is desired to install the fiber optic module 22 in the fiber optic equipment tray 20, the front end 66 of the fiber optic module 22 can be inserted from the rear section 26 of the chassis 12. More specifically, the front end 66 of the fiber optic module 22 is inserted into the tray channels 54 of the module rail guides 50 at their rear ends 56. In this manner, the fiber optic module 22 is rear-installable in the fiber optic equipment tray 20 and the chassis 12. The fiber optic module 22 can then be pushed forward within the tray channels 54 until the fiber optic module 22 reaches the front end 58 of the module rail guides 50. In this manner, a technician can install a fiber optic connection to the fiber optic adapter 70 disposed on the rear end 72 of the fiber optic module 22 and can then install the fiber optic module 22 from the rear section 26 of the chassis 12 into the fiber optic equipment tray 20.

Figure 5:
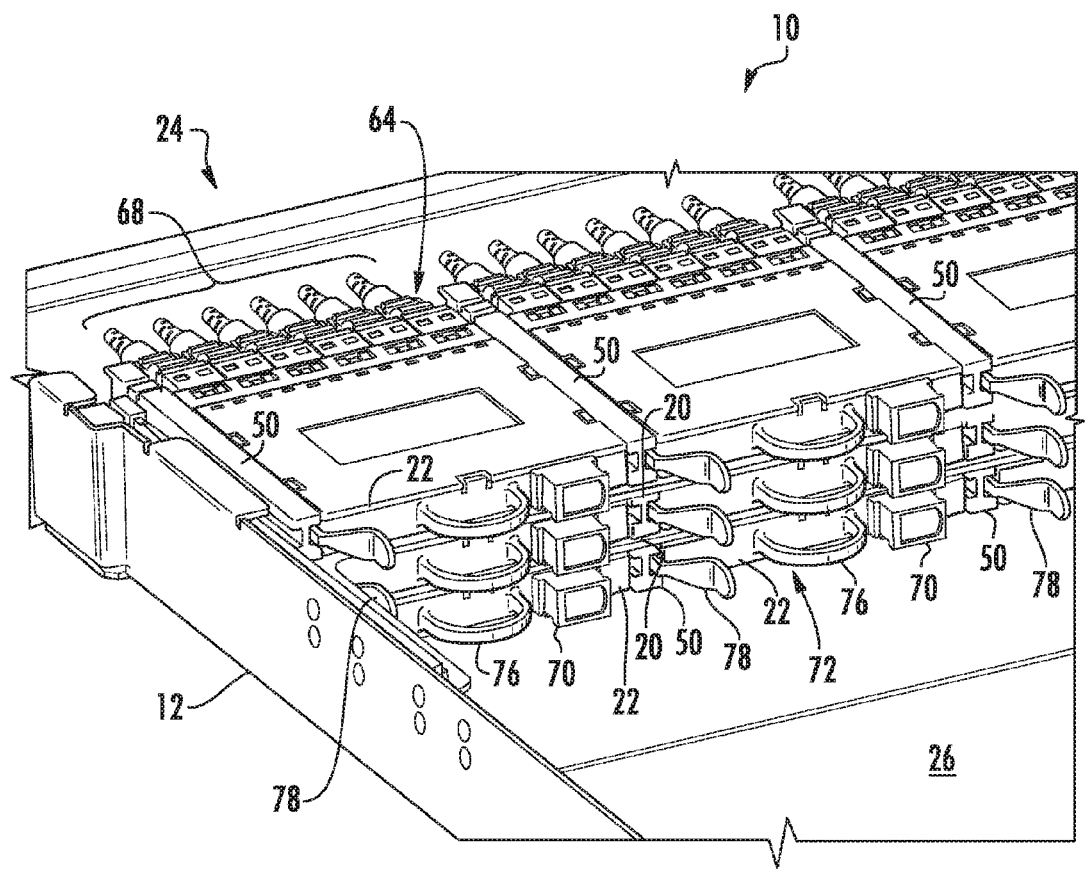
FIG. 5 is a rear perspective close-up view of the rear-installable fiber optic module of FIG. 4 installed in the fiber optic equipment tray of FIG. 3.

In this regard, FIG. 5 illustrates a rear perspective view of the fiber optic modules 22 installed in the fiber optic equipment trays 20 and the module rail guides 50 disposed therein. As illustrated therein, when the fiber optic module 22 is installed in the tray channels 54 of the module rail guides 50 from the rear section 26 of the chassis 12, the module rails 52A, 52B of the fiber optic module 22 move towards the front end 24 within the tray channels 54. The fiber optic module 22 can be moved towards the front end 24 until the fiber optic modules 22 reach a stop or locking feature disposed in the front end 24 as will described later in this application. A locking feature in the form of a locking latch 78 and a protrusion 80 (FIG. 4) engage a complementary protrusion disposed in the tray channel 54 such that the fiber optic module 22. The locking latch 78 is inwardly biased such that the fiber optic module 22 can be installed in the tray rail guides 32, but cannot be pulled back towards the rear section 26 of the chassis 12 until the locking latch 78 is disengaged to prevent the protrusion 80 from engaging with the module rail guides 50. The locking latch 78 is disengaged by pushing it inward towards the fiber optic module 22 to release the protrusion 80 from the tray channel 54.

If it is desired to remove the fiber optic module 22 from the fiber optic equipment tray 20, the fiber optic module 22 can be removed from either the rear section 26 of the chassis 12 or from the front end 24 of the chassis 12. To remove the fiber optic module 22 from the rear section 26 of the chassis 12, a pulling loop 76 disposed in the rear end 72 of the fiber optic module 22 can be pulled once the locking latch 78 is disengaged inward. The locking latch 78 controls the position of the protrusion 80 extending outward from the module rail 52A such that when the fiber optic module 22 is extended along a certain portion of the module rail guides 50, the protrusion 80 prevents the fiber optic module 22 from moving backwards along the tray channels 54 towards the rear section 26 of the chassis 12.

Figure 6:
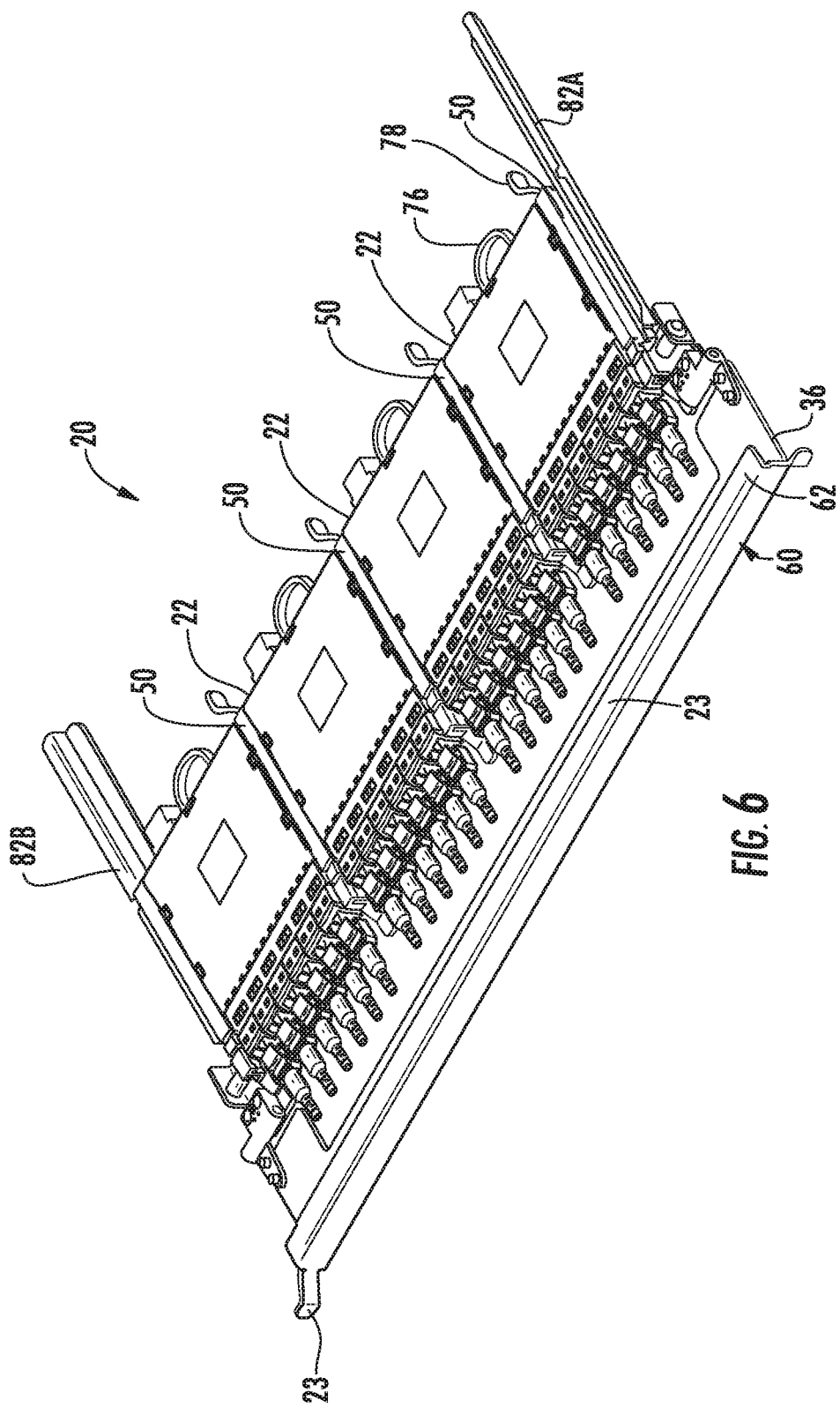
FIG. 6 is a front perspective view of the fiber optic equipment tray of FIG. 3 with rear-installable fiber optic modules installed in the module guides.

FIG. 6 illustrates the fiber optic equipment tray 20 of FIG. 3; however, with the rear-installable fiber optic modules 22 installed therein. The fiber optic modules 22 are installed in the module rail guides 50 disposed in the fiber optic equipment tray rails 82A, 82B. These fiber optic equipment tray rails 82A, 82B are configured to be disposed in the module rail guides 32A, 32B attached to the chassis 12 as illustrated in FIG. 2A such that the fiber optic equipment tray 20 is translatable with respect to the chassis 12.

Figure 7:
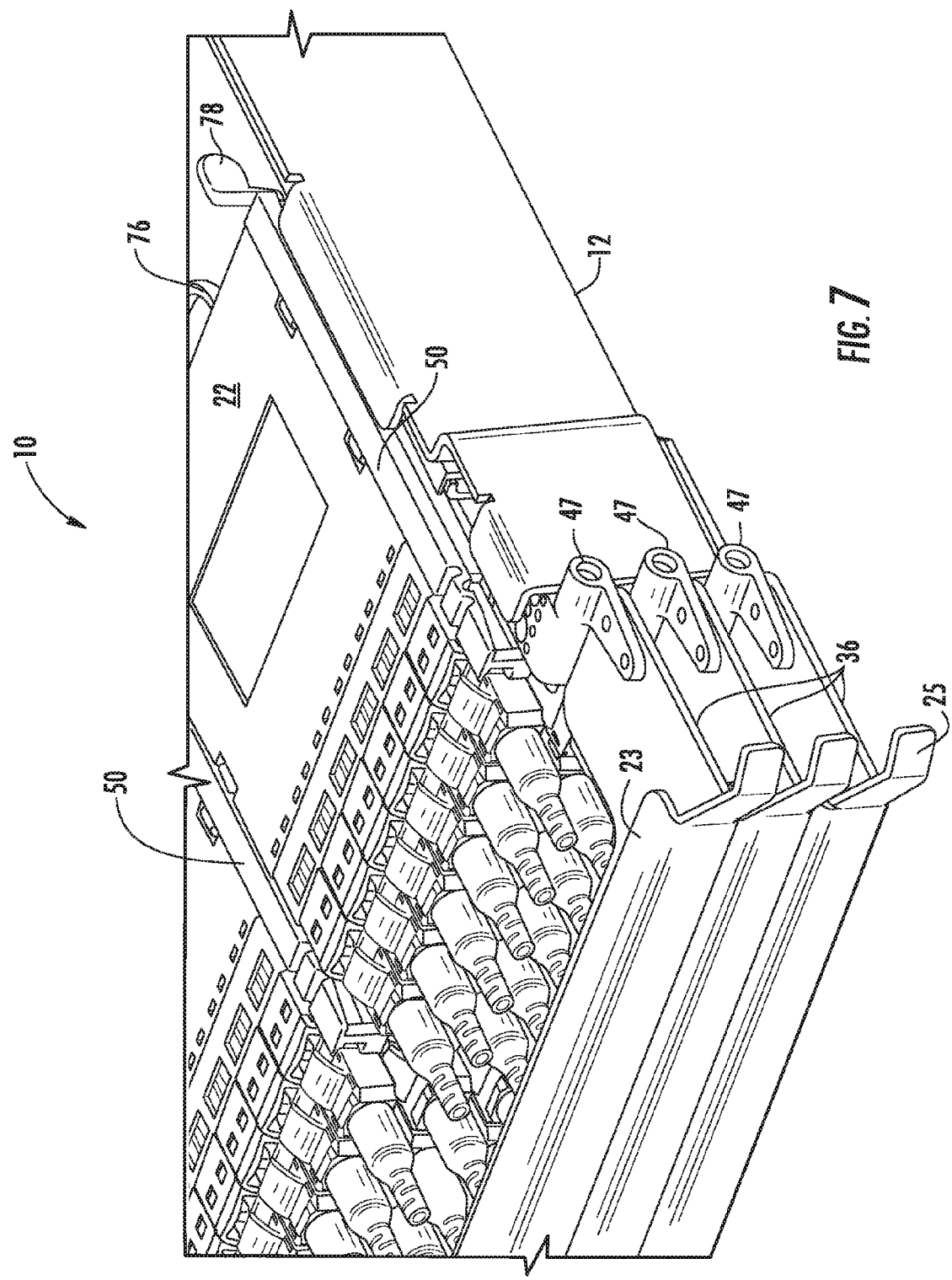
FIG. 7 is a front perspective close-up view of the fiber optic equipment tray of FIG. 3 with rear-installable fiber optic modules installed in the module guides.
Figure 8:
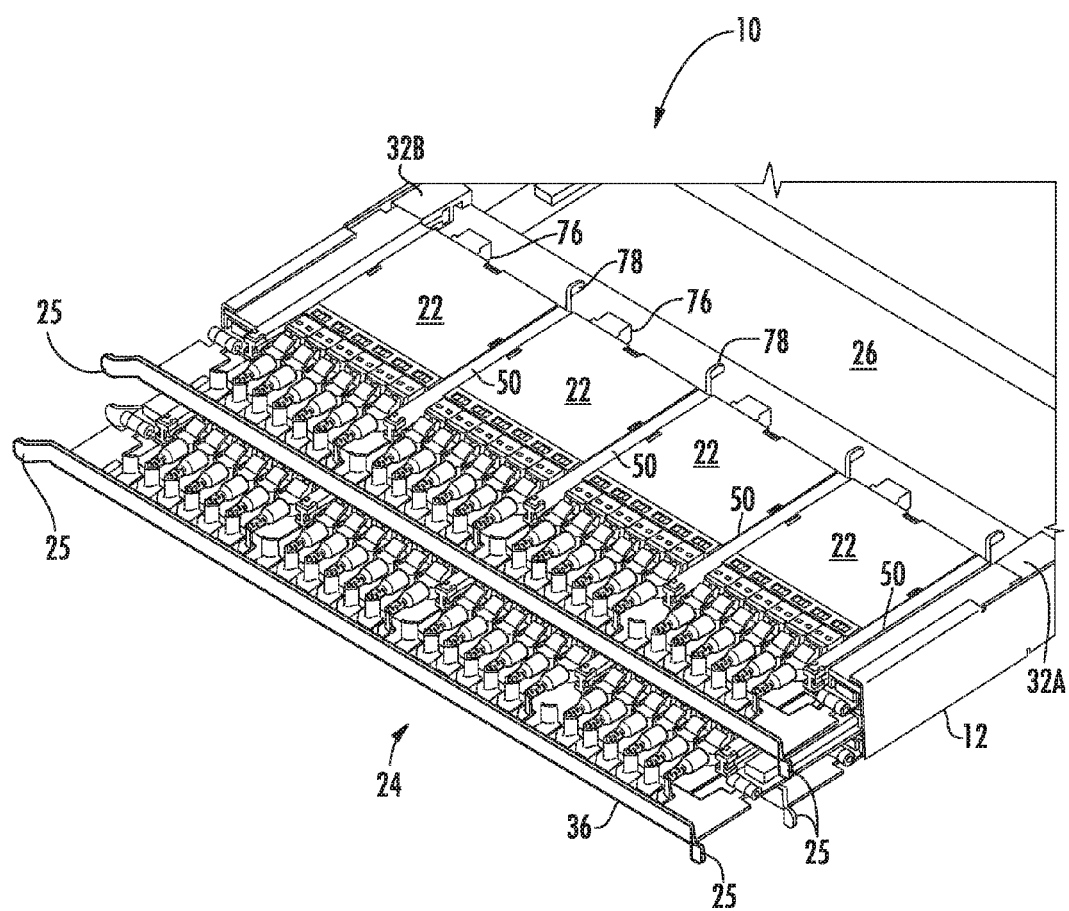
FIG. 8 is a front perspective view of a fiber optic equipment tray extended from the fiber optic equipment.
Figure 9:
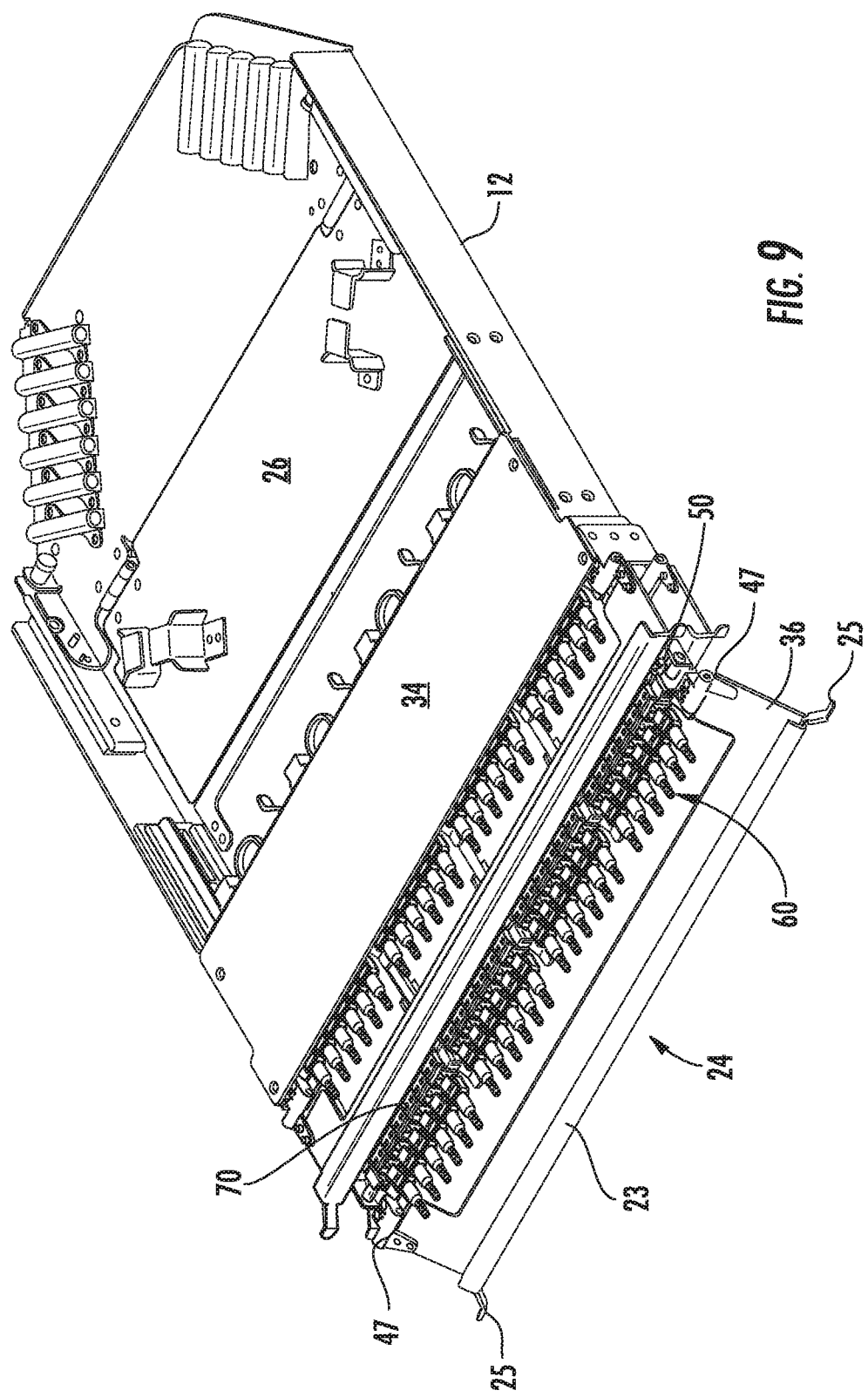
FIG. 9 is a front perspective view of a fiber routing guide tray of a fiber optic equipment tray lowered to obtain front access to the fiber optic modules supported in the fiber optic equipment tray.

FIG. 7 illustrates a front perspective view of the fiber optic equipment tray 20 in FIG. 6 in more detail. As illustrated therein, three (3) fiber optic equipment trays 20 are disposed within the tray rail guides 32A, 32B of the chassis 12. As illustrated therein, the hinges 46A, 46B that hingedly attach the fiber routing tray 36 to the fiber optic equipment trays 20 are provided in the form of position hinges 47. The position hinges 47 are configured to engage with the module rail guides 50 such that the fiber optic module 22 cannot be extended forward when the position hinges 47 are engaged. If it is desired to access the fiber optic module 22, the pulling tab 25 attached to the fiber routing tray 36 can be pulled forward to cause the fiber optic equipment tray 20 to extend forward from the front end 24 of the chassis 12 as illustrated in FIG. 8. Thereafter, the fiber routing tray 36 can be tilted downward as illustrated in FIG. 9. When the fiber optic equipment tray 20 and its fiber routing tray 36 are tilted downward, the position hinges 47 on each side of the fiber optic equipment tray 20 are disengaged with the module rail guides 50 for that particular fiber optic equipment tray 20 such that the fiber optic modules 22 supported by that fiber optic equipment tray 20 can be removed from the front end 24 of the chassis 12. Also, by allowing the fiber routing tray 36 to be tilted downward, unobstructed access can be obtained to the fiber optic module adapter 70 and fiber optic connectors 68 for establishing or disconnecting fiber optic connections.

Figure 10:
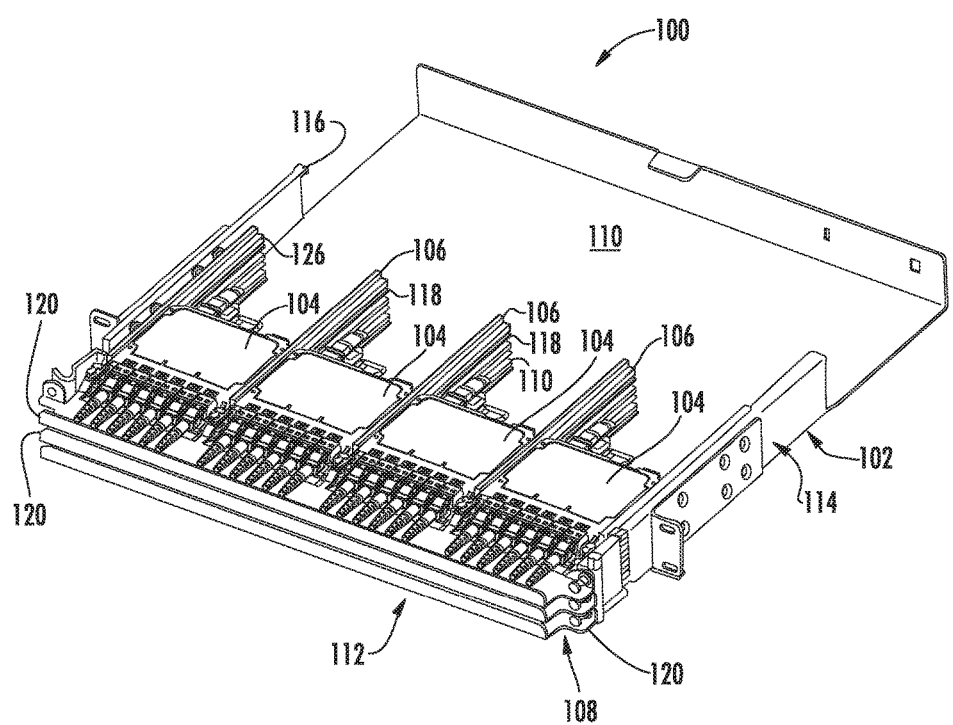
FIG. 10 is a front perspective view of another exemplary fiber optic equipment supporting rear-installable fiber optic modules disposed in module guides.

A plurality of fiber optic modules can also be disposed in a module guide system in the fiber optic equipment without need or requirement for an intermediate fiber optic equipment tray. In this manner, each of the fiber optic modules translate independently of other fiber optic modules disposed within the module guide system. In this regard, FIG. 10 illustrates another embodiment of fiber optic equipment 100. Fiber optic equipment 100 includes a module guide system disposed in a chassis 102 that supports rear-installable fiber optic modules. As will be described later in this application, the fiber optic equipment 100 provides an alternative guide system for rear-installable fiber optic modules. In FIG. 10, fiber optic modules 104 are supported within module rail guides 106 disposed in a chassis 102 of the fiber optic equipment 100. This is opposed to the fiber optic equipment 10 in FIGS. 1-9, wherein fiber optic modules are disposed in intermediate fiber optic equipment trays attached to a chassis. In this manner and as illustrated in FIG. 10, the fiber optic equipment 100 allows fiber optic modules 104 to be inserted into module rail guides 106 disposed in the chassis 102 and independently translated about the module rail guides 106.

Turning to FIG. 10, a plurality of rear installable fiber optic modules 104 are installed in the fiber optic equipment 100. The fiber optic modules 104 are supported by a plurality of module rail guides 106. Unlike the fiber optic equipment 10 of FIG. 1, the module rail guides 106 are attached directly to the chassis 102. Fiber optic equipment trays 108 are still provided to support the forward translation of the fiber optic modules 104 from the fiber optic equipment 100. As will be described later in this application, when the fiber optic modules 104 are installed from a rear section 110 of the chassis 102 into the module rail guides 106. The fiber optic modules 104 can then be moved forward within the module rail guides 106 to a front end 112 of the chassis 102. The fiber optic modules 104 will then engage with a latch (not shown) that will then attach the fiber optic modules 104 to fiber optic equipment trays 108. In this manner, when the fiber optic equipment tray 108 is pulled forward from the chassis 102, the fiber optic module 104 will also move outward with the fiber optic equipment tray 108 due to the interlock between the fiber optic modules 104 and the fiber optic equipment tray 108, although is still supported by the module rail guides 106. Thus, in the fiber optic equipment 100 in FIG. 10, the fiber optic equipment trays 108 are independently movable with respect to the chassis 102; however, the fiber optic modules 104 are not independently movable within the fiber optic equipment tray 108 like provided in the fiber optic equipment 10 of FIG. 1.

The chassis 102 also comprises a first end 114 and a second end 116, wherein the second end 116 is disposed on the opposite side from the first end 114. A plurality of module rail guides 106 are disposed within the chassis 102 between the first end 114 and the second end 116. A minimum of two (2) module rail guides 106 are required to support at least one (1) fiber optic module 104. However, as illustrated in FIG. 10, five (5) module rail guides 106 are provided to support four (4) fiber optic modules 104 per level. As will be described later in this application in more detail, the module rail guides 106 can contain a plurality of channels 118 to support more than one level or plane of fiber optic modules 104. In the example of the fiber optic equipment 100 in FIG. 10, three (3) levels of fiber optic modules 104 are provided; thus, three (3) channels 118 are provided in each module rail guide 106. The fiber optic equipment trays 108 each contain a routing tray 120 that can be pulled in order to remove a fiber optic equipment tray 108 from the chassis 102.

Figure 11:
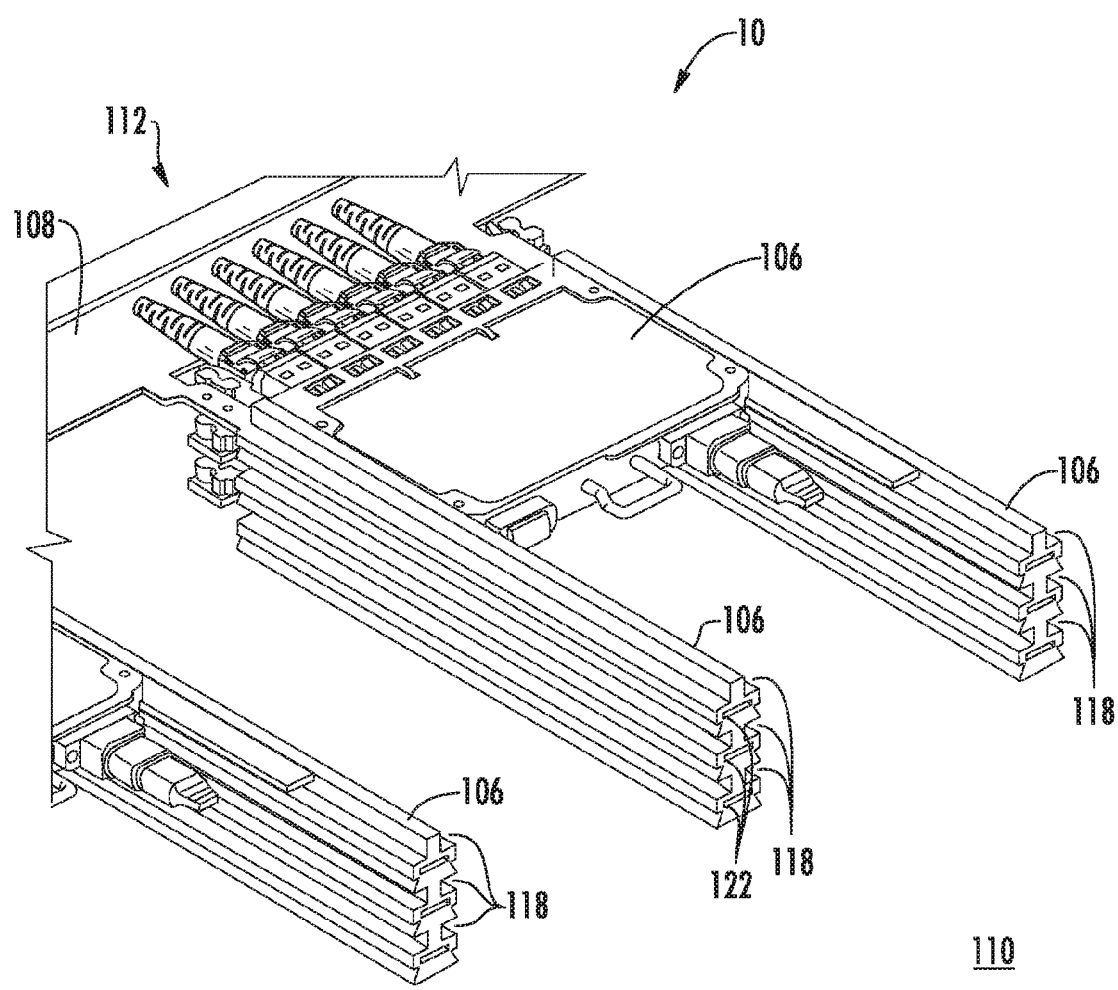
FIG. 11 is a rear perspective view of the fiber optic equipment supporting the rear-installable fiber optic modules of FIG. 10.

FIG. 11 illustrates a rear perspective view of the module rail guides 106 disposed within the chassis 102 and how the fiber optic module 104 is installed from the rear section 110 of the chassis 102. Further, FIG. 11 illustrates how the fiber optic equipment trays 108 are also supported by the module rail guides 106 and how the fiber optic modules 104 attach to the fiber optic equipment trays 108 when pulled forward. As illustrated in FIG. 11, the module rail guides 106 are provided wherein a fiber optic module 104 can be inserted from the rear section 110 into the channels 118. The fiber optic module 104 can then be pushed forward with the module rail guides 106 towards the front end 112 of the chassis 102. The module rail guides 106 also contain a series of tray guides 122 disposed in the plane substantially orthogonal to the channels 118 to receive fiber optic equipment trays 108, although any orientation is possible.

Figure 12:
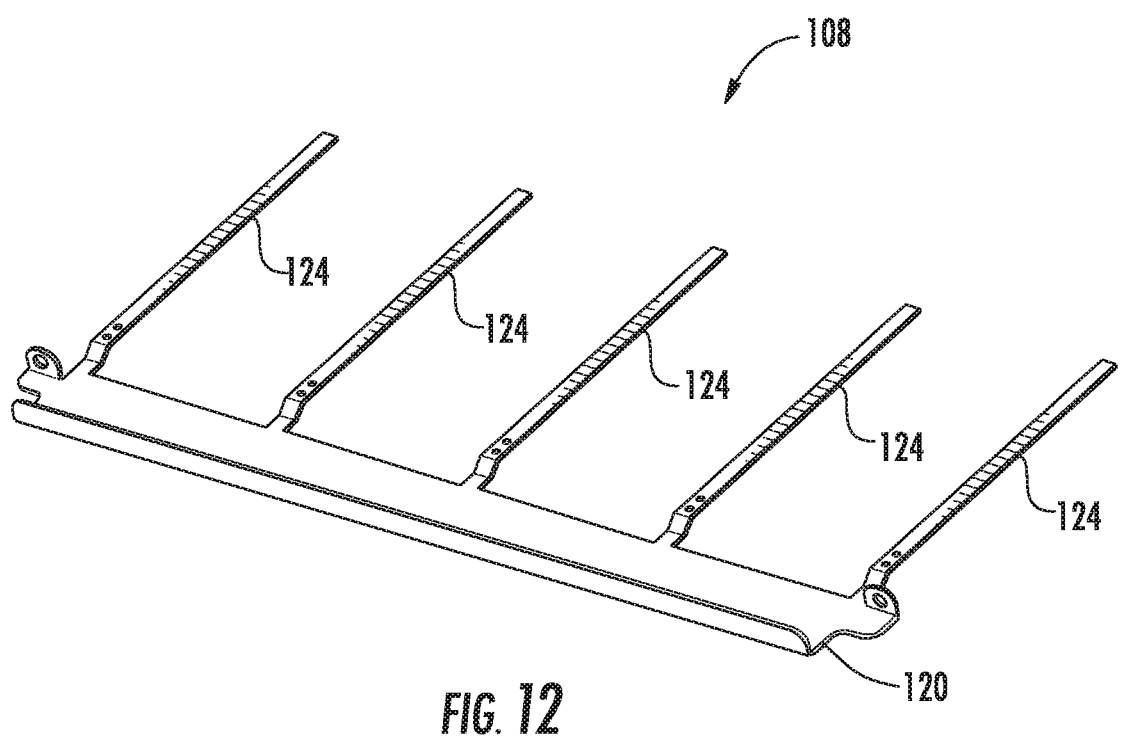
FIG. 12 is a front perspective view of an individual fiber optic equipment tray in the fiber optic equipment of FIG. 10.
Figure 13:
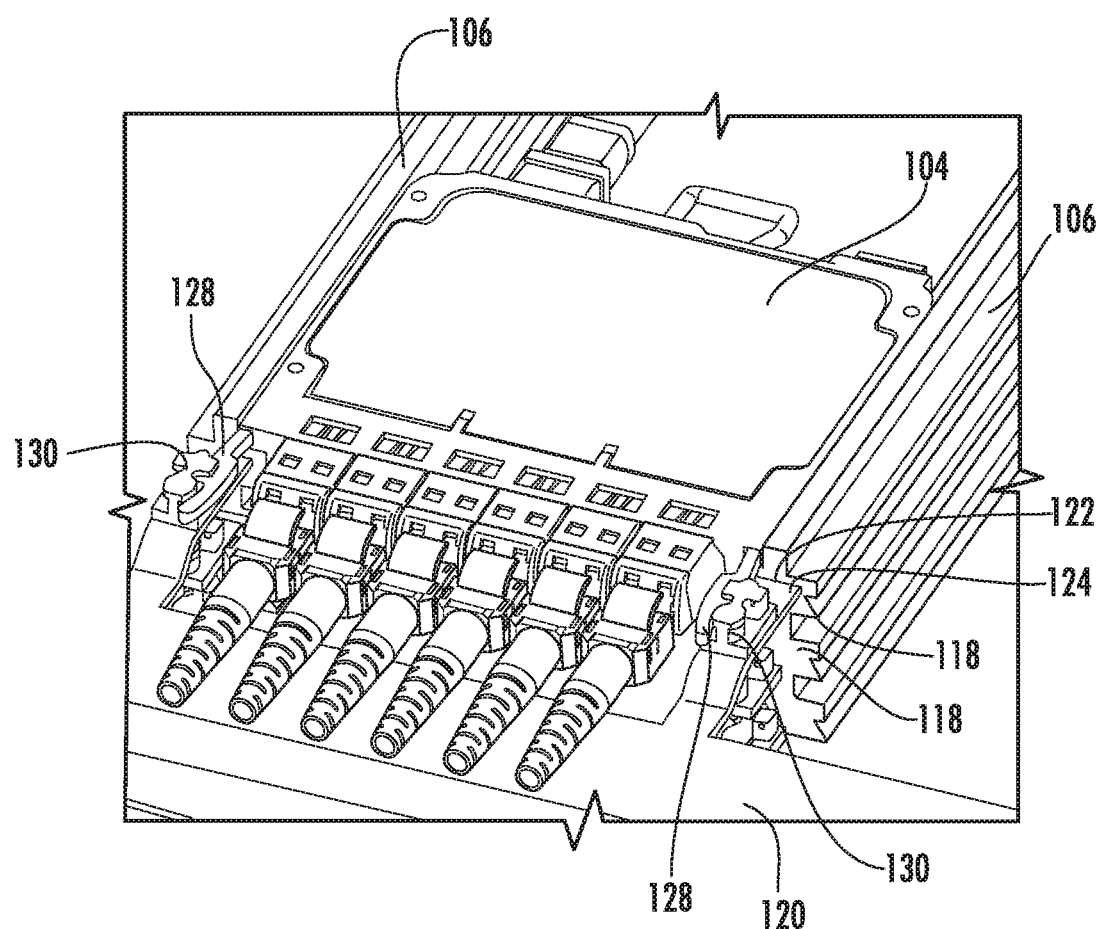
FIG. 13 is a rear perspective view of the rear-installable fiber optic module installed in the module guides disposed in the fiber optic equipment of FIG. 10.
Figure 14:
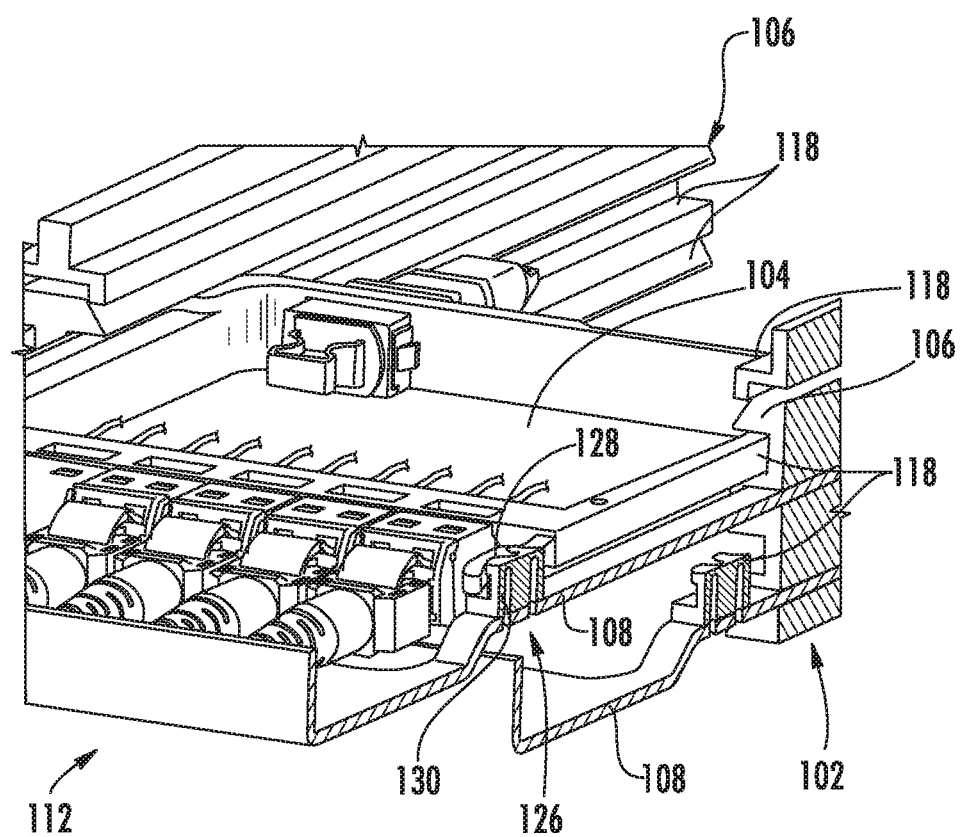
FIG. 14 is a rear perspective close-up view of the rear-installable fiber optic module disposed within module guides in the fiber optic equipment of FIG. 10 and locked into the fiber optic equipment tray of FIG. 12 when the fiber optic module is pulled forward.
Figure 15:
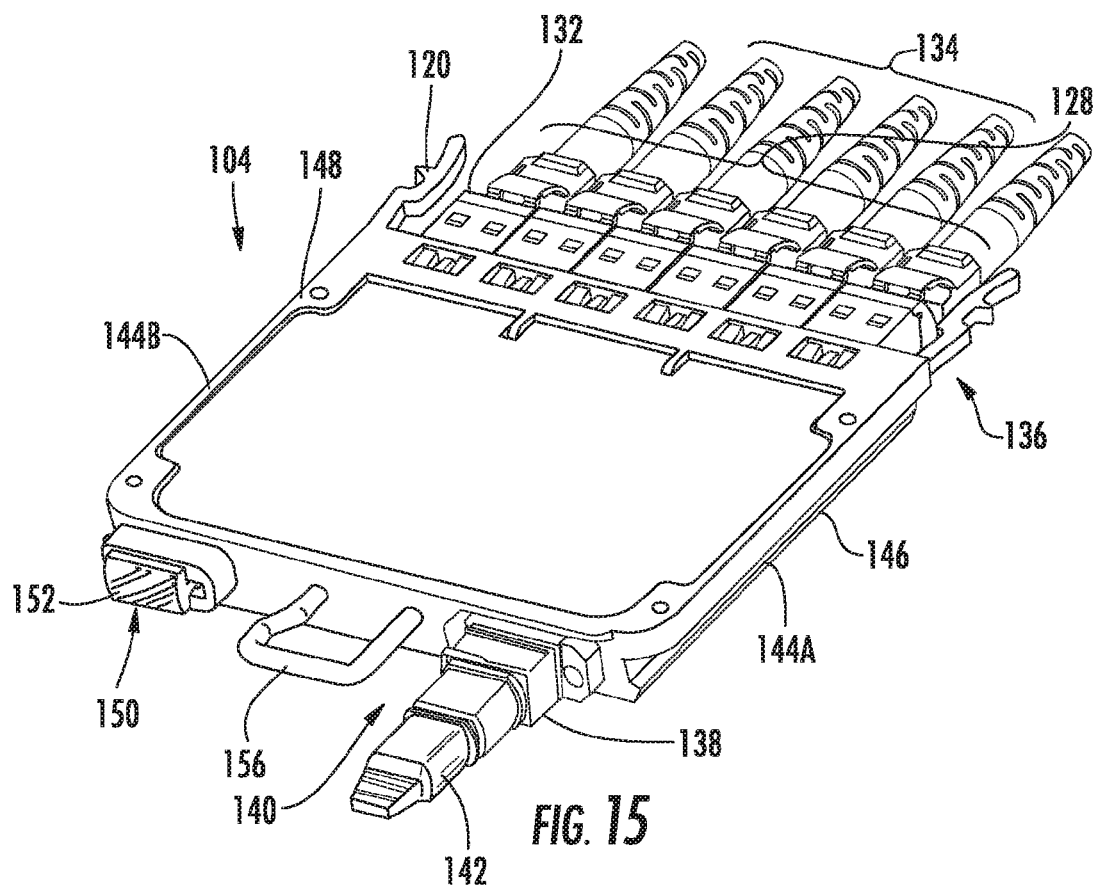
FIG. 15 is a rear perspective view of the fiber optic module in FIG. 14.

As illustrated in FIG. 12, the fiber optic equipment tray 108 contains a series of elongated sections 124. The elongated sections 124 are configured to be inserted into the tray guides 122 disposed inside the module rail guides 106 along the longitudinal axis of the channels 118. Thus, as illustrated in FIGS. 13 and 14, when the fiber optic module 104 is pulled all the way forward along the module rail guide 106 to a front portion 126 of the fiber optic equipment tray 108, a locking feature in the form of a front module latch 128 interlocks with a detent feature 130 disposed adjacent the front end 112 of the chassis 102. The detent feature 130 is secured to the fiber optic equipment tray 108. In this manner, the fiber optic module 104 becomes interlocked with the fiber optic equipment tray 108 such that when the fiber optic equipment tray 108 is translated forward on the first end 114 of the chassis 102, the fiber optic module 104 travels forward with the fiber optic equipment tray 108. The elongated sections 124 and the fiber optic modules 104 interlocked with the fiber optic equipment tray 108 translate together about the tray guides 122 even though the fiber optic module 104 is still supported by the module rail guides 106. FIG. 15 illustrates the fiber optic module 104 and more detail regarding the front module latch 128 in particular.

As illustrated in FIG. 15, the fiber optic module 104 is comprised of a plurality of fiber optic adapters 132 configured to support fiber optic connectors 134 on a front end 136 of the fiber optic module 104. A fiber optic adapter 138 is disposed on a rear end 140 of the fiber optic module 104. In this example of the fiber optic module 104 of FIG. 15, the fiber optic adapters 132 are duplex LC fiber optic adapters, and the fiber optic adapter 138 disposed in the rear end 140 of the fiber optic module 104 is an MTP fiber optic adapter, although any fiber connection type is possible. Fiber optic connections are established between the fiber optic connectors 134 and an MTP fiber optic connector 142 connected to the MTP fiber optic adapter 138. Optical fibers establishing connections between the fiber optic adapters 132, 138 are provided inside the fiber optic module 104.

The fiber optic module 104 also contains two (2) module rails 144A, 144B on a first side 146 and a second side 148, respectively, of the fiber optic module 104. The module rails 144A, 144B are configured to be inserted into the channels 118 of the module rail guides 106 such that the fiber optic module 104 can be translated within the module rail guides 106. In this regard, because the channels 118 in the module rail guides 106 are open in the rear section 110, as illustrated in FIG. 11, the fiber optic modules 104 are rear-installable into the fiber optic equipment 100. The fiber optic module 104 can then be translated forward within the channels 118 until the front module latch 128 reaches the detent feature 130. The front module latch 128 is biased inward such that when it reaches the detent feature 130, the front module latch 128 flexes inward and is retained in the detent feature 130. Once the front module latch 128 is retained in the detent feature 130, the fiber optic module 104 cannot be pulled back towards the rear section 110 or towards the front end 112 independent of the fiber optic equipment tray 108 unless the front module latch 128 is released from the detent features 130. In this manner, the front module latch 128 releasably retains the fiber optic module 104.

Figures 16A, 16B:
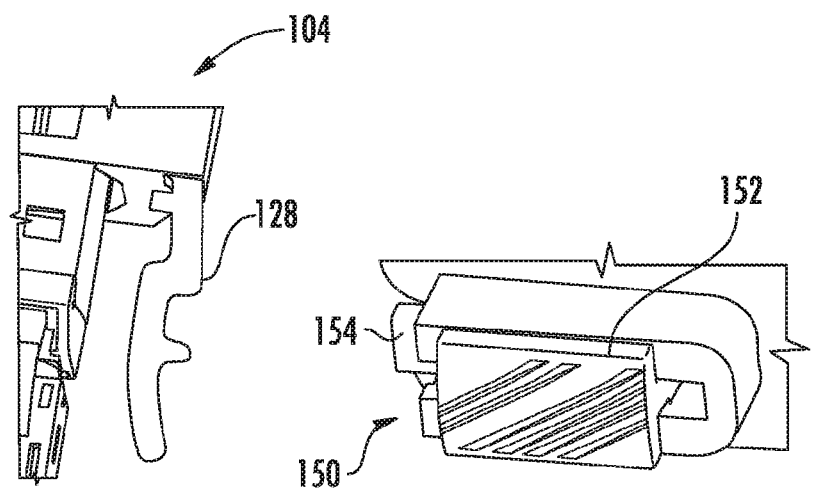
FIG. 16A is a perspective close-up view of a front locking latch in the fiber optic module of FIG. 15.
FIG. 16B is a perspective close-up view of a rear lock in the fiber optic module of FIG. 15.

FIG. 16A illustrates the front module latch 128 for the fiber optic module 104 in more detail. FIG. 16B illustrates a locking feature in the form of a rear module lock 150 that may be provided in the rear end 140 of the fiber optic module 104 to lock the fiber optic module 104 within the module rail guides 106. In this manner, the fiber optic module 104 cannot be removed towards the rear section 110 of the fiber optic equipment 100 unless the rear module lock 150 is unlocked by pushing a rear module lock button 152 to the right as illustrated. When the rear module lock button 152 is moved to the right as illustrated, a latch 154 is disengaged from the channel 118 of the module rail guide 106 such that the fiber optic module 104 can be removed from the rear section 110. The fiber optic module 104 may be removed from the rear section 110 by pulling on a pulling loop 156 (as shown in FIG. 15) attached to the rear end 140 of the fiber optic module 104.

Figure 17:
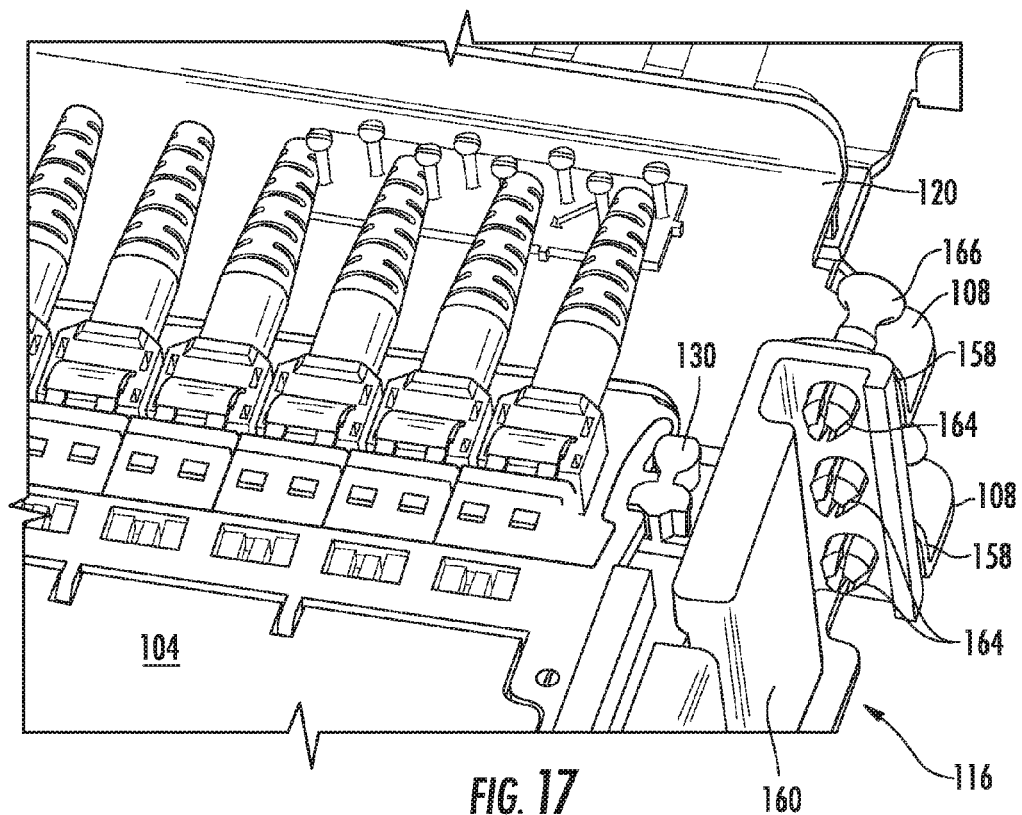
FIG. 17 is a rear perspective close-up view of the rear-installable fiber optic modules installed in module guides.
Figure 18:
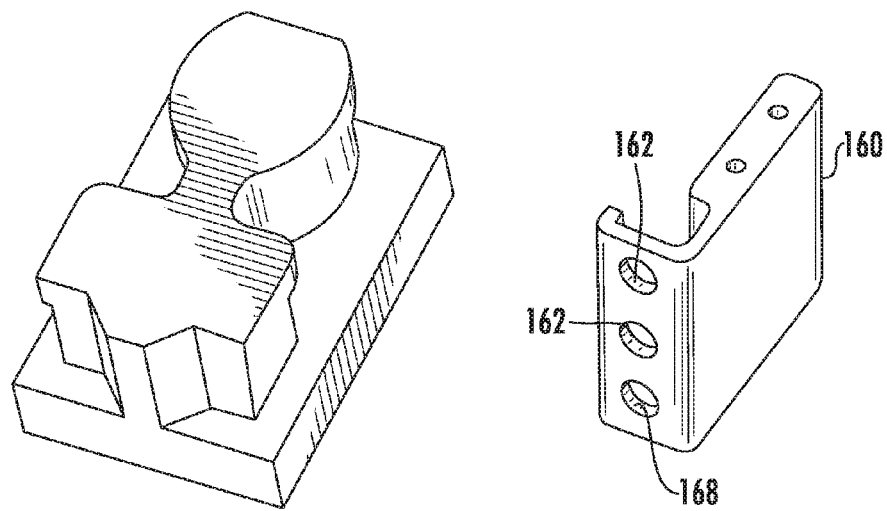
FIG. 18 is a perspective view of the locking features to lock fiber optic modules to fiber optic equipment tray and the fiber optic equipment trays to the chassis of the fiber optic equipment of FIG. 10.

FIGS. 17 and 18 illustrate the detent feature 130 and how the fiber optic equipment trays 108 are interlocked into the chassis 102. As illustrated therein, the fiber optic equipment tray 108 contains an upwardly extending tab 158 that is secured to a bracket 160 wherein the bracket 160 is attached to the chassis 102. The bracket 160 contains a series of apertures 162 that are adapted to receive flanges 164 from plungers 166. Each fiber optic equipment tray 108 contains a plunger 166 disposed through the upwardly extending tab 158 that is adapted to engage with the aperture 162. When it is desired to lock the fiber optic equipment tray 108 to the chassis 102, the plunger 166 is engaged in the aperture 162. As illustrated in FIGS. 17 and 18, three (3) apertures 162 are provided in the bracket 160 because three (3) fiber optic equipment trays 108 are provided. Each aperture 162 is designed to retain the upwardly extending tab 158 from a particular fiber optic equipment tray 108. FIG. 17 illustrates the bracket 160 disposed on the second end 116 of the chassis 102. Although not shown, the bracket 160 is also disposed on the first end 114 of the chassis 102 as illustrated in FIG. 10. When it is desired to release the fiber optic equipment tray 108 from the chassis 102, such as to pull it forward for access, the plunger 166 is pulled and disengaged from the corresponding aperture 162 in the bracket 160. In this manner, each fiber optic equipment tray 108 is free to independently translate outwardly towards the front end 112 wherein the elongated sections 124 are moved forward about the tray guides 122 within the module rail guides 106.

Figure 19:
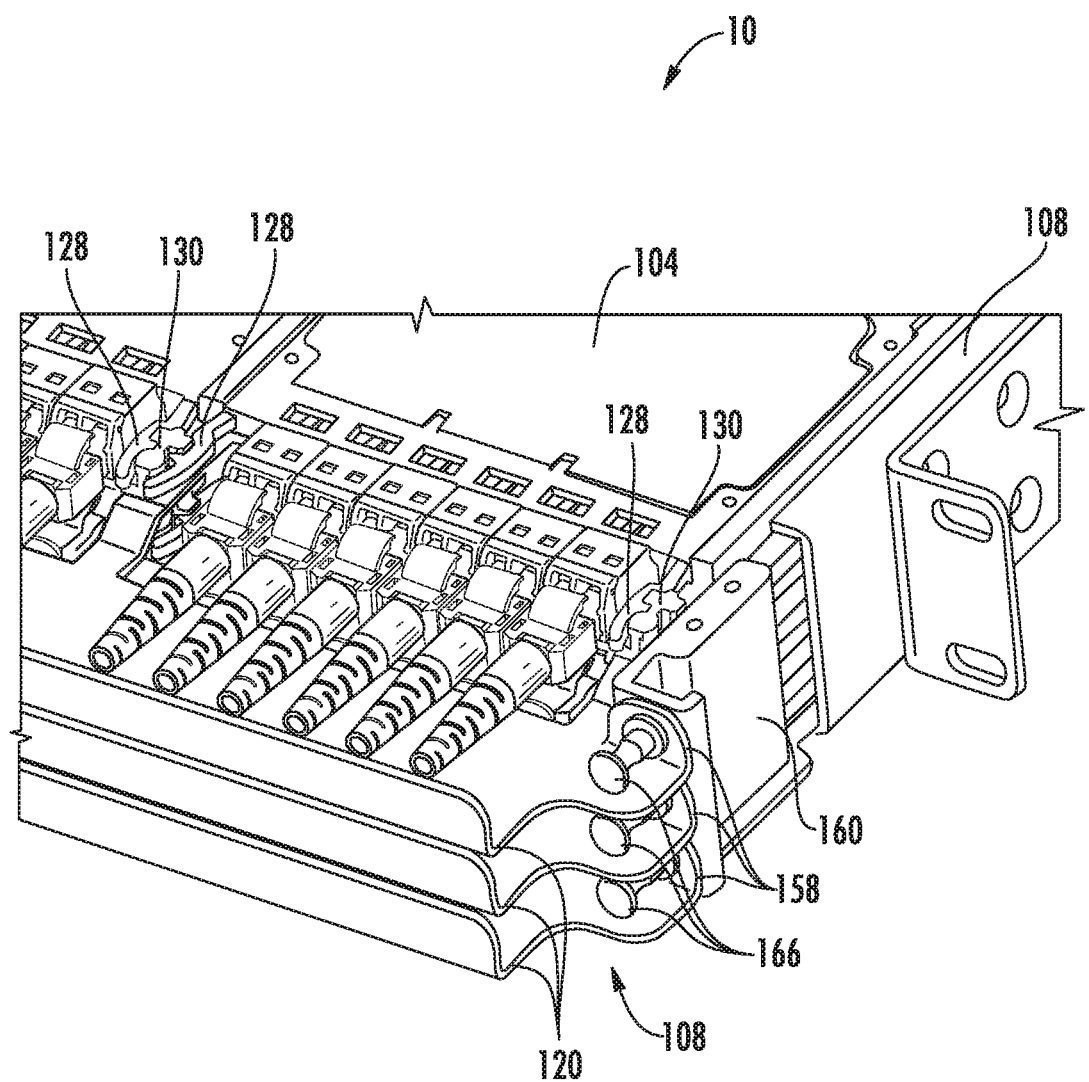
FIG. 19 is a front perspective view of the fiber optic equipment of FIG. 10 with rear-installable fiber optic modules disposed in the module guides.
Figure 20:
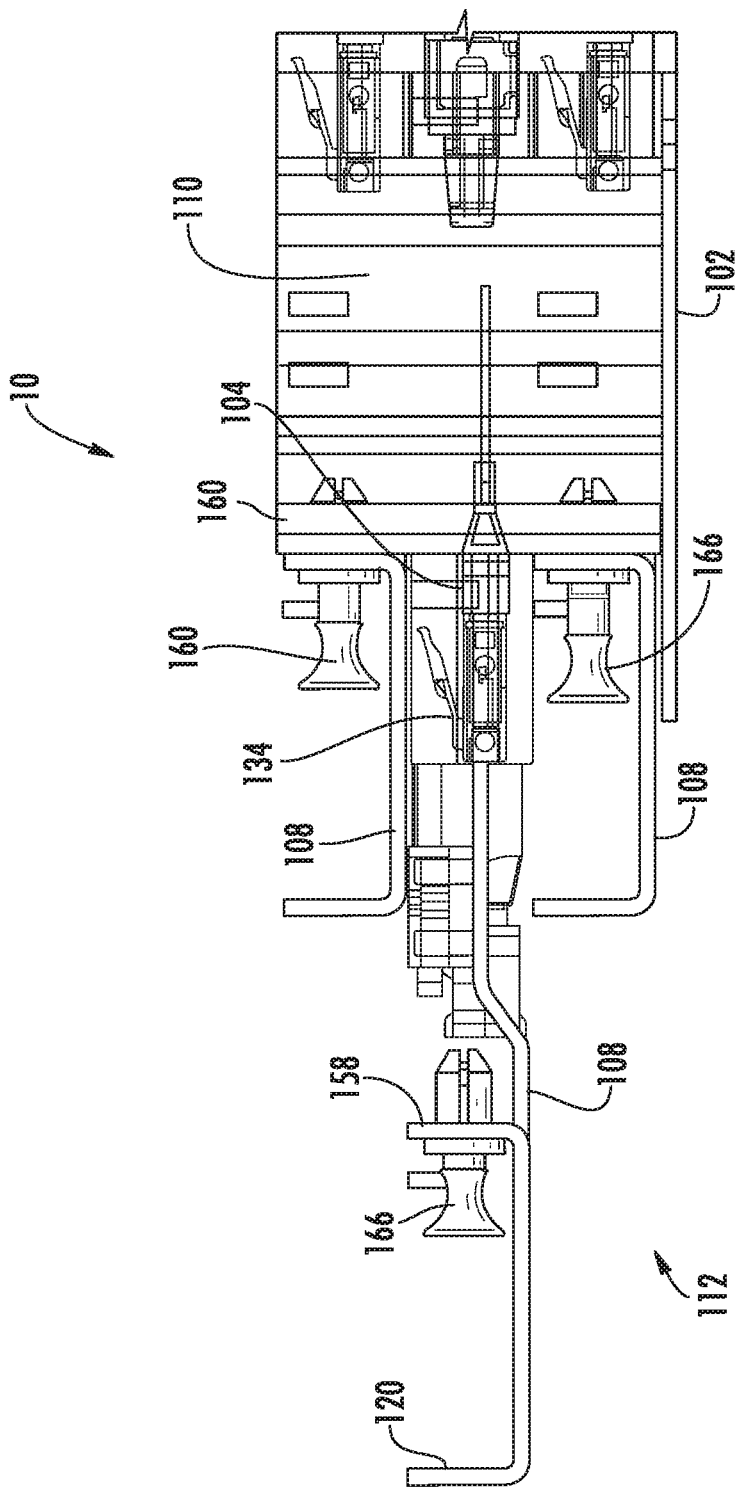
FIG. 20 is a side cross-sectional view of the fiber optic equipment of FIG. 10 with rear-installable fiber optic modules disposed in the module guides and interlocked with the fiber optic equipment trays, with one fiber optic equipment tray extended forward.
Figure 21:
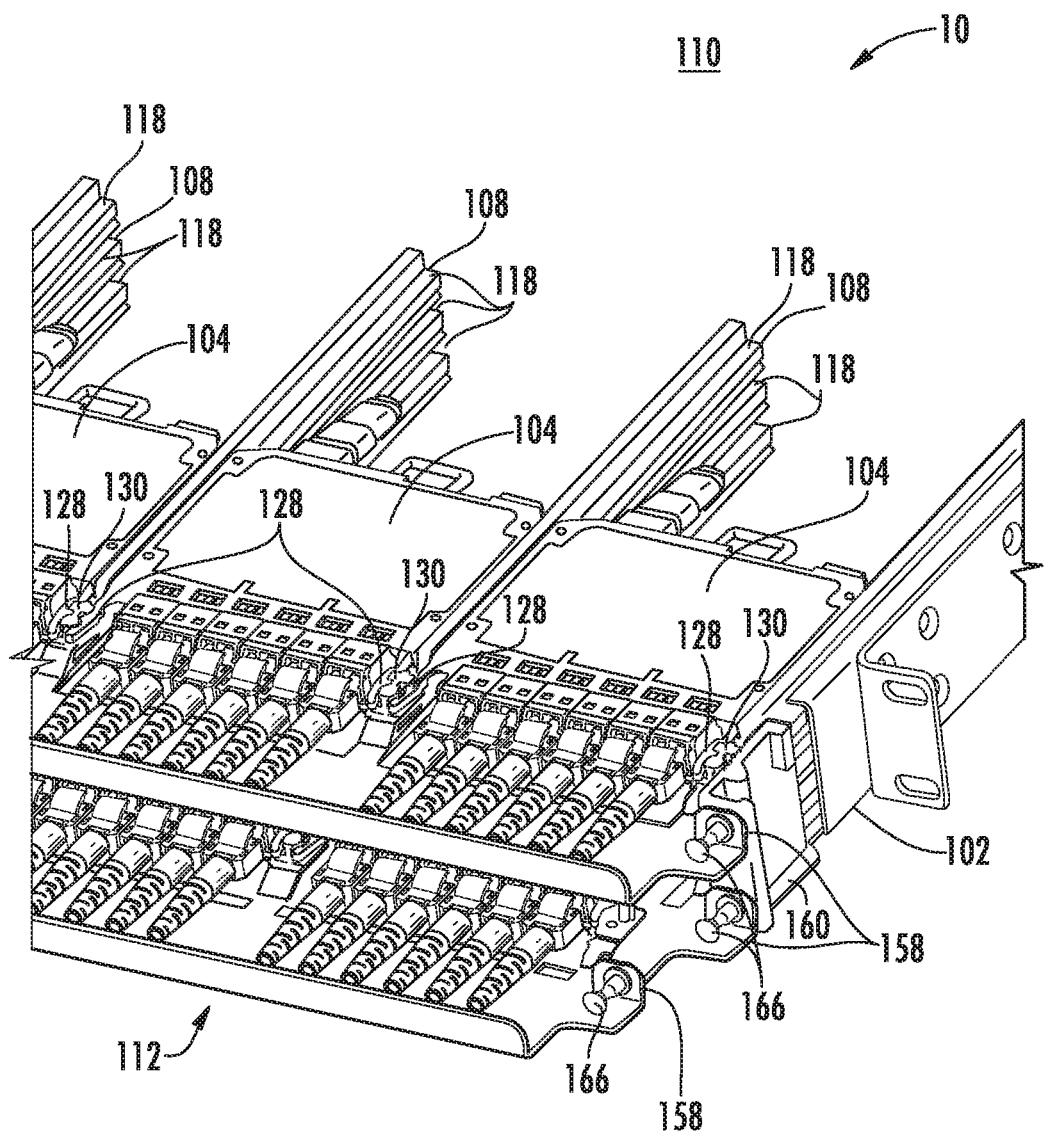
FIG. 21 is a front perspective view of the fiber optic equipment of FIG. 20.

FIG. 19 illustrates a front perspective view of the fiber optic equipment 100 and the fiber optic modules 104 locked into the fiber optic equipment trays 108 via the front module latch 128 engaging with the detent feature 130. As illustrated therein, each of the fiber optic equipment trays 108 are secured to the chassis 102 via their plungers 166 being engaged with the bracket 160. In order to disengage the fiber optic equipment tray 108 from the chassis 102, the plunger 166 is pulled to disengage the plunger 166 from the aperture 162 in the bracket 160. In this manner, the pulling force applied towards the front end 112 will translate the fiber optic equipment tray 108 forward. This is illustrated in FIGS. 20 and 21. FIG. 20 is a side cross-sectional view of the fiber optic equipment 100 shown in perspective view in FIG. 21 with a middle fiber optic equipment tray 108 extended. As illustrated therein, the middle fiber optic equipment tray 108 is extended from the chassis 102. The plunger 166 for the middle fiber optic equipment tray 108 is disengaged from the bracket 160 and the aperture 162 therein.

Figure 22:
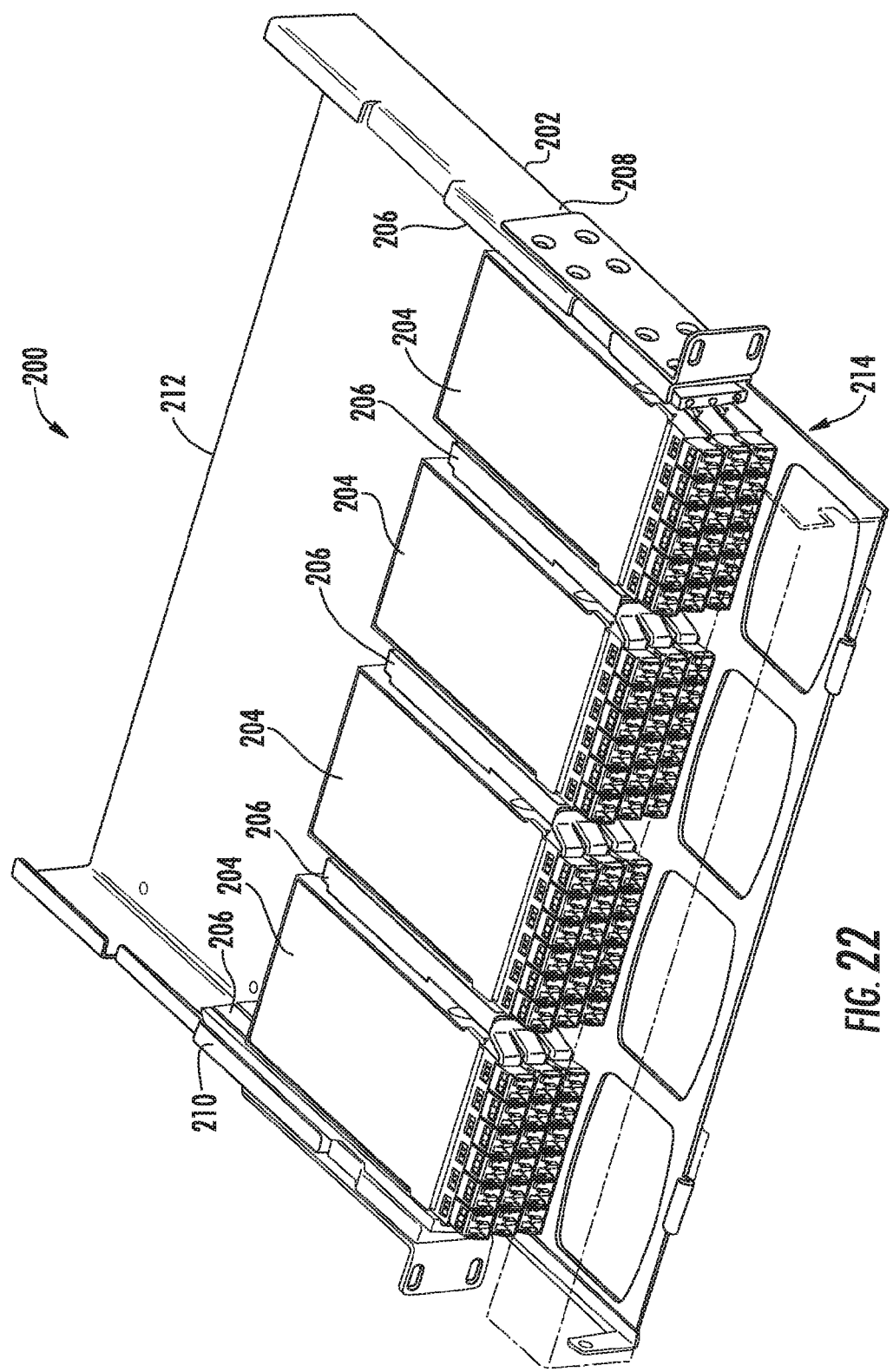
FIG. 22 is a front perspective view of another exemplary fiber optic equipment supporting rear-installable fiber optic modules.

FIG. 22 illustrates yet another example of fiber optic equipment 200 that also provides for rear-installable fiber optic modules. Like the fiber optic equipment 100 in FIGS. 10-21, each fiber optic module supported in the fiber optic equipment 200 of FIG. 22 is supported in module rails disposed in the chassis. The fiber optic modules are also independently translatable within the module rails.

As illustrated in FIG. 22, the fiber optic equipment 200 is provided, which includes a chassis 202 configured to hold one or more fiber optic modules 204. The fiber optic modules 204 are supported on a guide system in the form of module rail guides 206 that are disposed within and attached to the chassis 202 similar to the fiber optic equipment 100 in FIGS. 10-21. The module rail guides 206 are attached to the chassis 202. Only two module rail guides 206 are required to be provided on a first end 208 of the chassis 202 and a second end 210 of the chassis 202 such that a fiber optic module 204 can be installed in a rear section 212 of the chassis 202 and moved along the module rail guides 206 to a front end 214 of the chassis 202.

As will be described in further detail in this application, the module rail guides 206 contain one or more channels 216 (shown in FIGS. 24A and 24B) that are adapted to receive rails (element 215 in FIG. 25) disposed on each side of the fiber optic modules 204. The channels 216 are open in the rear section 212 such that the rails of the fiber optic module 204 can be inserted into the module rail guides 206 in the rear section 212 of the chassis 202 and moved forward within the module rail guides 206 until the fiber optic module 204 reaches the front end 214 of the chassis 202. This is further illustrated in FIG. 23. As illustrated therein, a fiber optic module 204 is shown as being inserted partially into the module rail guides 206. Module rails 215A, 215B are disposed on each side of the fiber optic module 204 such that the module rails 215A, 215B mate with the channels 216 in the module rail guides 206 so that the fiber optic module 204 may be slid from the rear section 212 to the front end 214 of the chassis 202.

Figure 23:
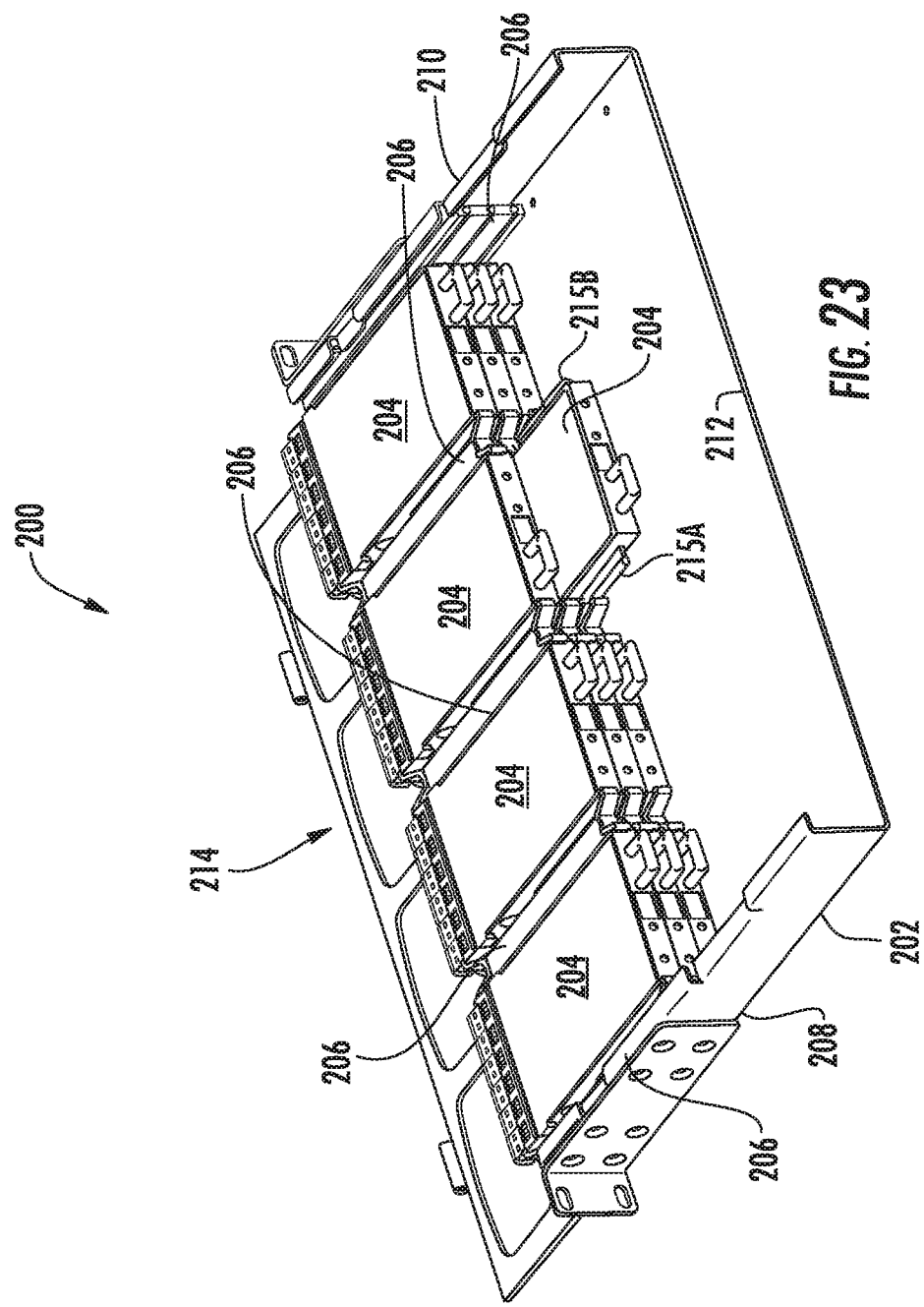
FIG. 23 is a rear perspective view of the fiber optic equipment supporting the rear-installable fiber optic modules of FIG. 22.
Figures 24A, 24B:
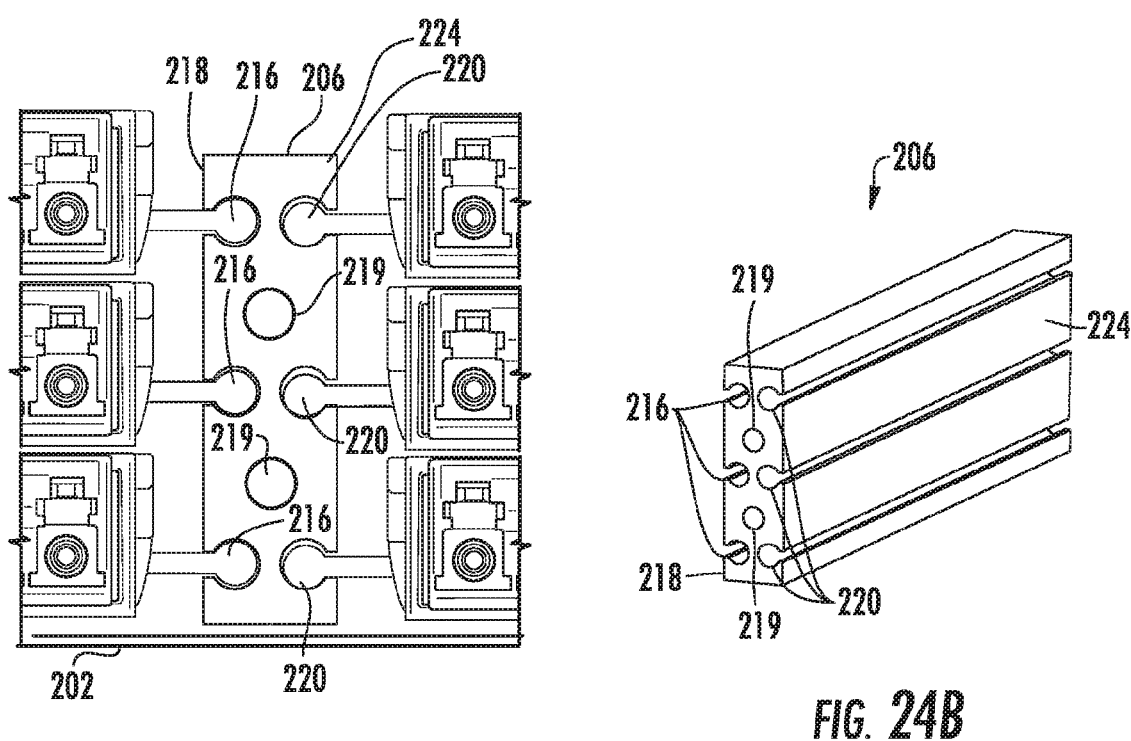
FIG. 24A is a front view of a module guide supporting rear-installable fiber optic modules in the fiber optic equipment of FIG. 22.
FIG. 24B is a perspective view of the module guide illustrated in FIG. 24A.

FIGS. 24A and 24B illustrate more detail regarding the module rail guides 206 that are disposed in the fiber optic equipment 200 of FIGS. 22 and 23. As illustrated therein, a module rail guide 206 is disclosed that is provided between the first end 208 and the second end 210. For this type of module rail guide 206, the channels 216 are disposed on a first side 218 of the module rail guides 206. Channels 220 are also provided on a second side 224 of the module rail guides 206. In this manner, the module rail guide 206 can support rails of fiber optic modules 204 on each side. The module rail guide 206 illustrated in FIG. 24A would be provided as an intermediate module rail guide if more than one fiber optic module 204 in a given plane is supported by the fiber optic equipment 200. In this case, at least one intermediate module rail guide 206 is provided with channels 216, 220 disposed on each side 218, 224. As illustrated in FIG. 24A, the module rail guide 206 is attached to the chassis 202 such that when the module rails 215A, 215B of the fiber optic modules 204 are disposed within the channels 216, 220, the fiber optic modules 204 are supported by the chassis 202. Also, as will be described in greater detail below with regard to FIGS. 26A and 26B, the module rail guides 206 also contain a series of internal apertures 219 that support attaching module locks or stops to the chassis 202. The module locks or stops prevent the fiber optic modules 204 from translating beyond the front end 214 of the chassis 202.

Figure 25:
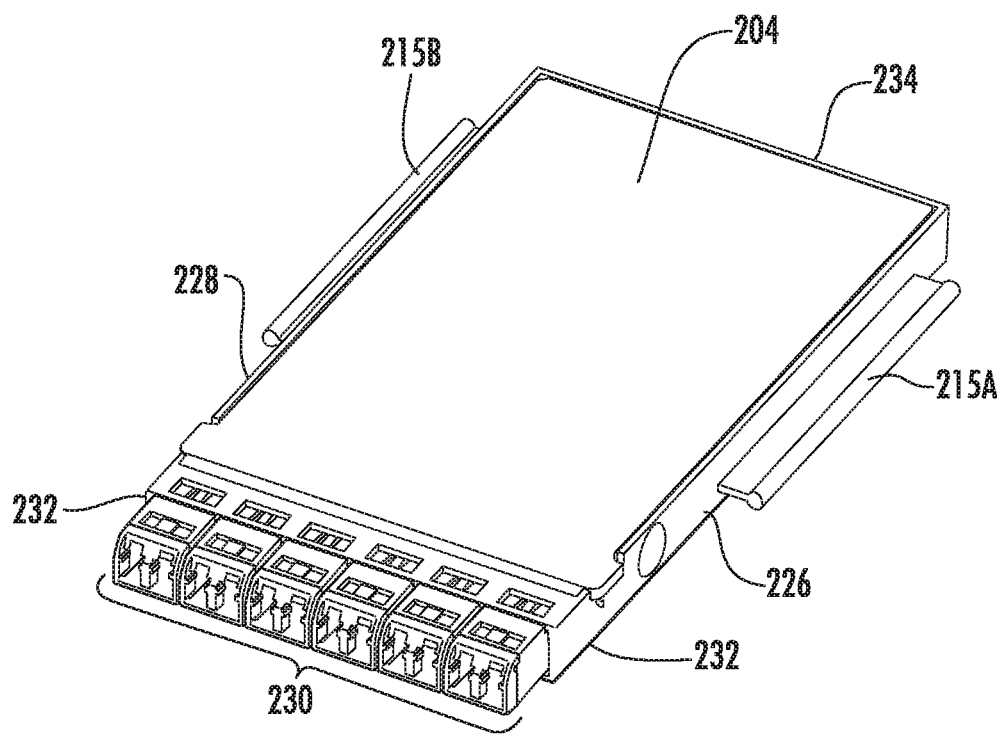
FIG. 25 is a front perspective view of the fiber optic modules disposed in the module guides provided in the fiber optic equipment of FIG. 22.

FIG. 25 illustrates the rear-installable fiber optic module 204 that is adapted to be supported by the module rail guides 206 of the fiber optic equipment 200. As illustrated therein, module rails 215A, 215B are disposed on sides 226, 228, respectively, of the fiber optic module 204. These module rails 215A, 215B can be inserted into the module rail guides 206 to insert the fiber optic module 204 into the fiber optic equipment 200. Because the channels 220 in the module rail guides 206 are open in the rear section 212 of the chassis 202, the fiber optic modules 204 are rear-installable, meaning they can be installed from the rear section 212 of the chassis 202. The fiber optic module 204 contains a series of fiber optic adapters 230 disposed on a front end 232 of the fiber optic module 204. One or more fiber optic adapters 230 optically connected to the fiber optic adapters 230 are disposed on a rear end 234 of the fiber optic module 204. In this manner, connectorized fiber optic cables (not shown) connected to the fiber optic adapters 230 establish a fiber optic connection with fiber optic cables (not shown) installed in the fiber optic adapters 230 in the rear end 234 of the fiber optic module 204.

Figure 26A:
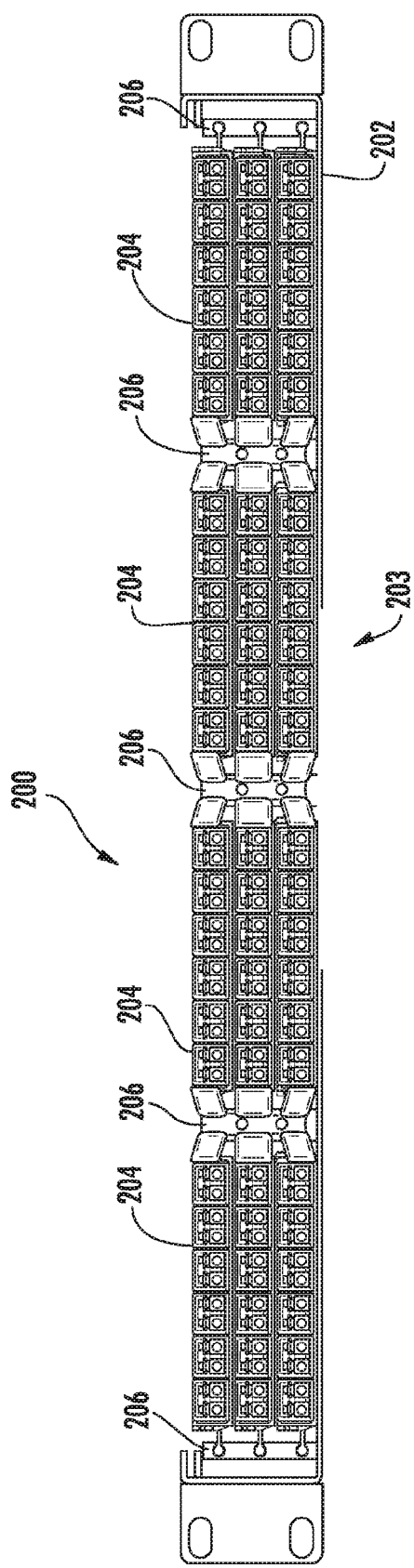
FIGS. 26A and 26B are a front view of the fiber optic equipment of FIG. 22 with fiber optic modules installed in all module guides and a locking feature to prevent the fiber optic modules from being pulled forward beyond a front end of the fiber optic equipment.
Figure 26B:
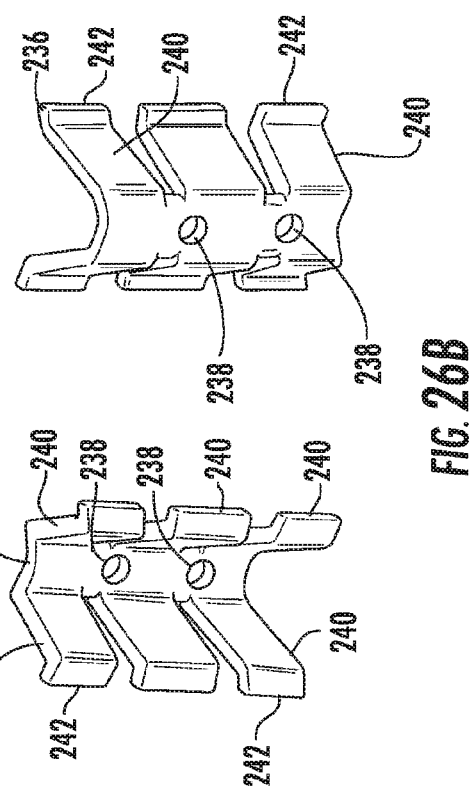

FIG. 26A illustrates a front view of the fiber optic equipment 200 with fiber optic modules 204 installed in the module rail guides 206 as previously described. To prevent the fiber optic modules 204 from extending beyond the first end 208 of the chassis 202, stop or lock features 236 are disposed between the rows of fiber optic modules 204 on the intermediate module rail guides 206. FIG. 26B illustrates the stop or lock features 236 in more detail wherein front and rear perspective views are illustrated. The stop or lock features 236 contain a series of apertures 238 that align with the apertures 219 disposed in the module rail guides 206 as illustrated previously in FIG. 24B. A fastener (not shown) can be inserted into the apertures 238 to fasten the stop or lock features 236 to the module rail guides 206. The stop features 236 contain opposing flared portions 240 on each side of the stop or lock feature 236 which contain platforms 242 of which the front end 232 of the fiber optic modules 204 abut against to prevent the fiber optic modules 204 from extending forward from the first end 208 of the chassis 202.

Figure 27:
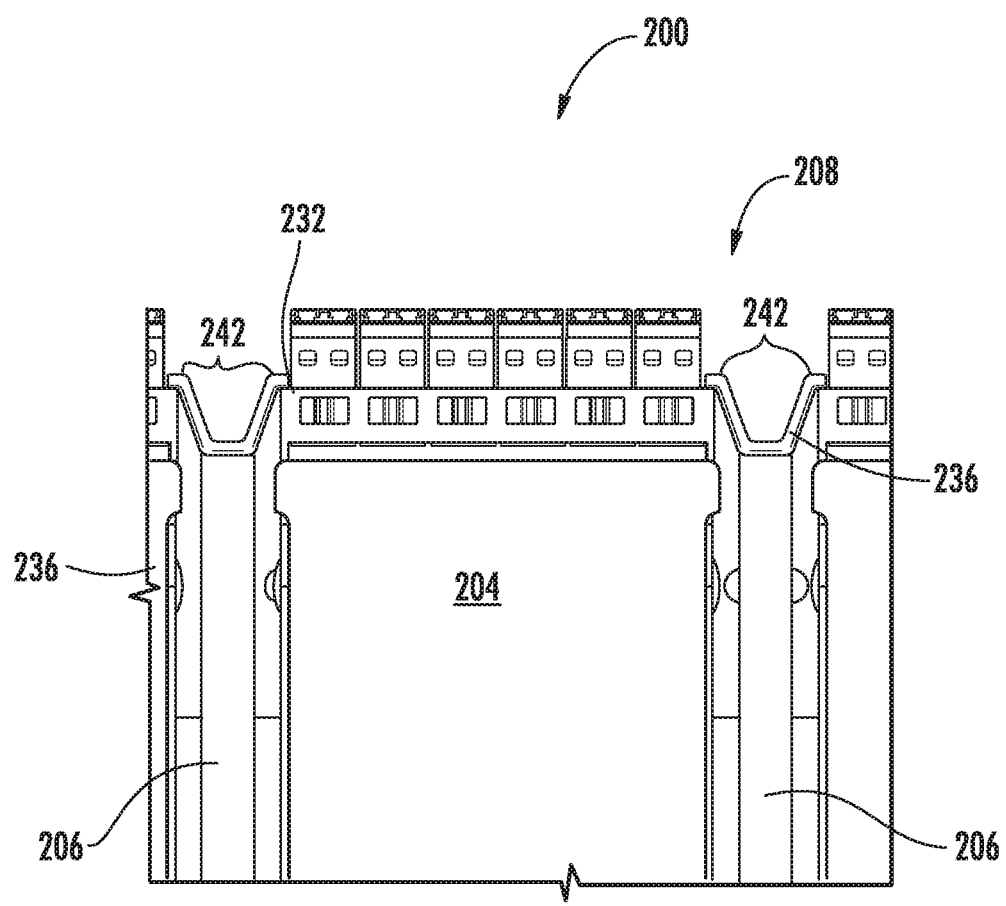
FIG. 27 is a top view of a fiber optic module supported by module guides disposed in the fiber optic equipment of FIG. 22.

FIG. 27 illustrates a top view of the fiber optic equipment 200 with the fiber optic module 204 installed therein between two module rail guides 206. As illustrated therein, the fiber optic module 204 is extended forward to the front end 214 of the chassis 202 wherein the front end 232 of the fiber optic module 204 abut against the platforms 242 in the stop or lock features 236 to prevent the fiber optic modules 204 from being extended beyond the front end 214 of the fiber optic equipment 200.

Figure 28:
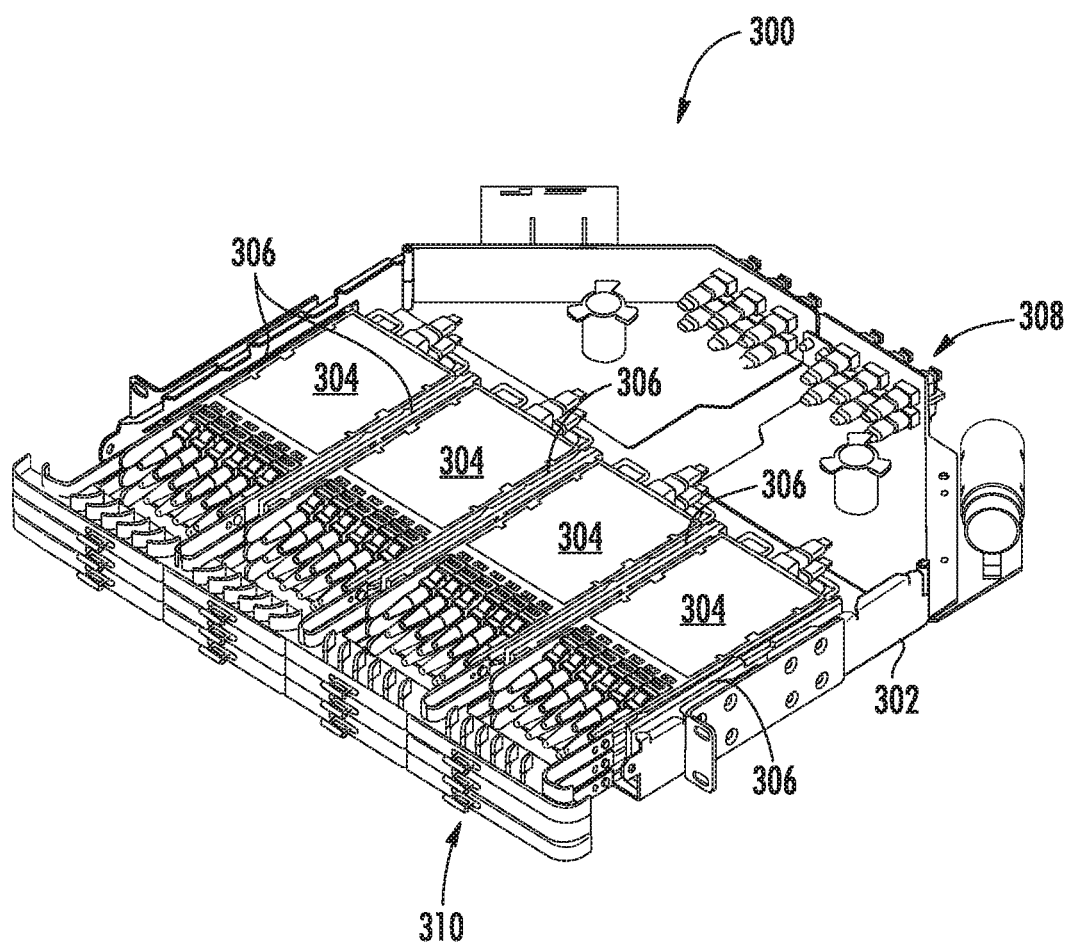
FIG. 28 is a front perspective view of another exemplary fiber optic equipment supporting rear-installable fiber optic modules.

FIG. 28 illustrates yet another embodiment of fiber optic equipment that is configured to allow and support rear-installable fiber optic modules. As illustrated in FIG. 28, the fiber optic equipment 300 contains a chassis 302 that supports one or more fiber optic modules 304. The fiber optic modules 304 are supported by a guide system in the form of module rail guides 306 that are attached to the chassis 302 such that each of the fiber optic modules 304 can translate about the module rail guides 306. More specifically, the fiber optic modules 304 can be rear-installable from a rear section 308 of the chassis 302 into the module rail guides 306 and extended forward within the module rail guides 306 to a front end 310 of the chassis 302.

Figure 29:
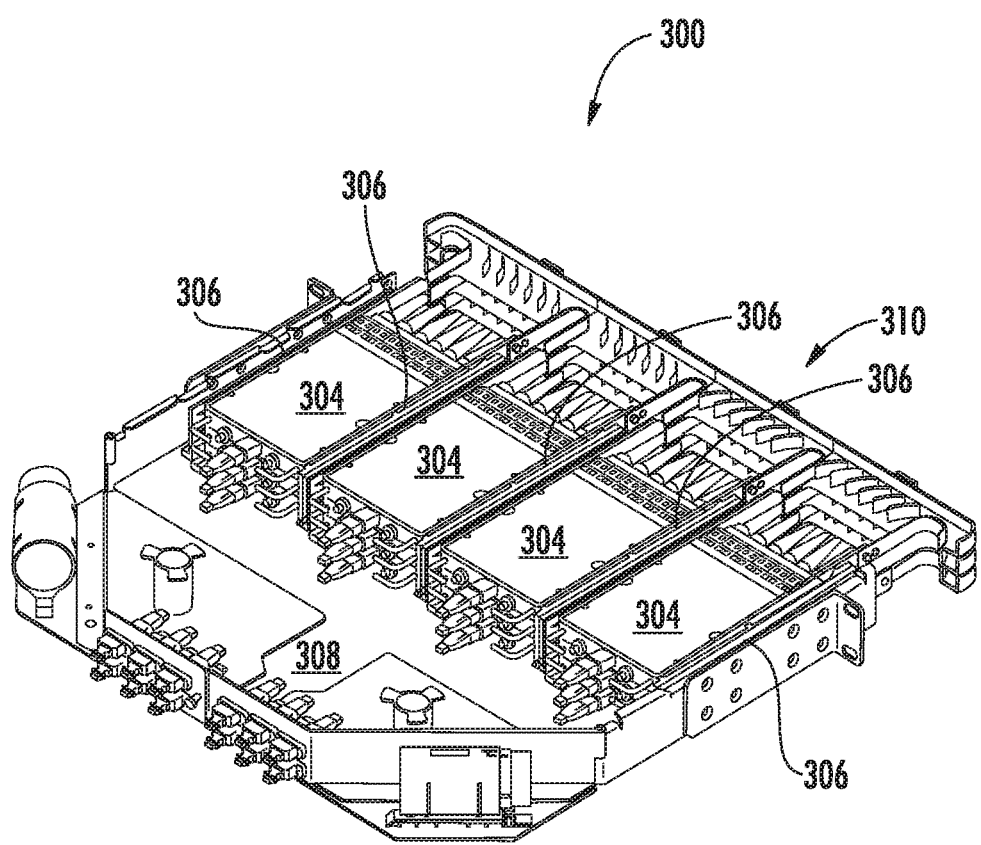
FIG. 29 is a rear perspective view of the fiber optic equipment supporting the rear-installable fiber optic modules of FIG. 28.

FIG. 29 illustrates a rear perspective view of the fiber optic equipment 300 illustrated in FIG. 28 showing a series of rear-installable fiber optic modules 304 installed therein. It is noted that the module rail guides 306 can be provided that support more than one plane or row of fiber optic modules 304. In such a case, a plurality of channels will be provided in the module rail guides 306 to support more than one row of fiber optic modules 304.

Figure 30:
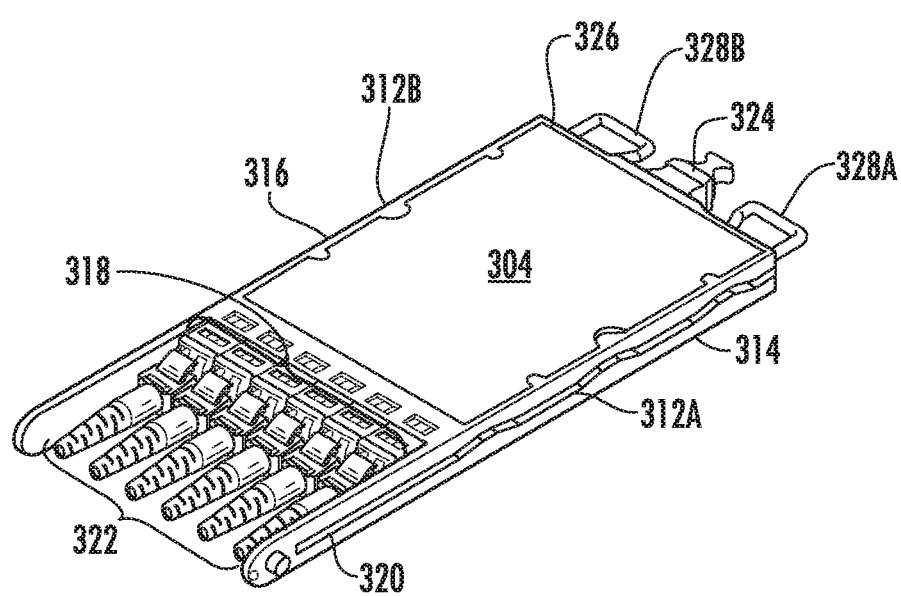
FIG. 30 is a front perspective view of the fiber optic modules provided in the fiber optic equipment of FIG. 22.

FIG. 30 illustrates the fiber optic module 304 illustrated in FIGS. 28 and 29 in more detail. As illustrated therein, the fiber optic module 304 contains module rails 312A, 312B disposed on each side 314, 316 of the fiber optic module 304. The module rails 312A, 312B are adapted to be received into channels of the module rail guides 306 to support the fiber optic modules 304. Each fiber optic module 304 is independently movable about the module rail guides 306. Intermediate fiber optic equipment trays are not provided. The fiber optic module 304 contains a series of fiber optic adapters 318 disposed on a front end 320 of the fiber optic module 304. A series of fiber optic connectors 322 may be connected to the fiber optic adapters 318 to establish fiber optic connections. A fiber optic adapter 324 is disposed in a rear end 326 of the fiber optic module 304 such that a fiber optic connector 322 connected to the fiber optic adapter 324 will establish an optical connection with optical fibers connected to the fiber optic connectors 322. The fiber optic module 304 also contains a series of pulling loops 328A, 328B disposed on each side of the fiber optic adapter 324 that may assist in removing the fiber optic module 304 from the rear section 308 of the fiber optic equipment 300.

Figure 31:
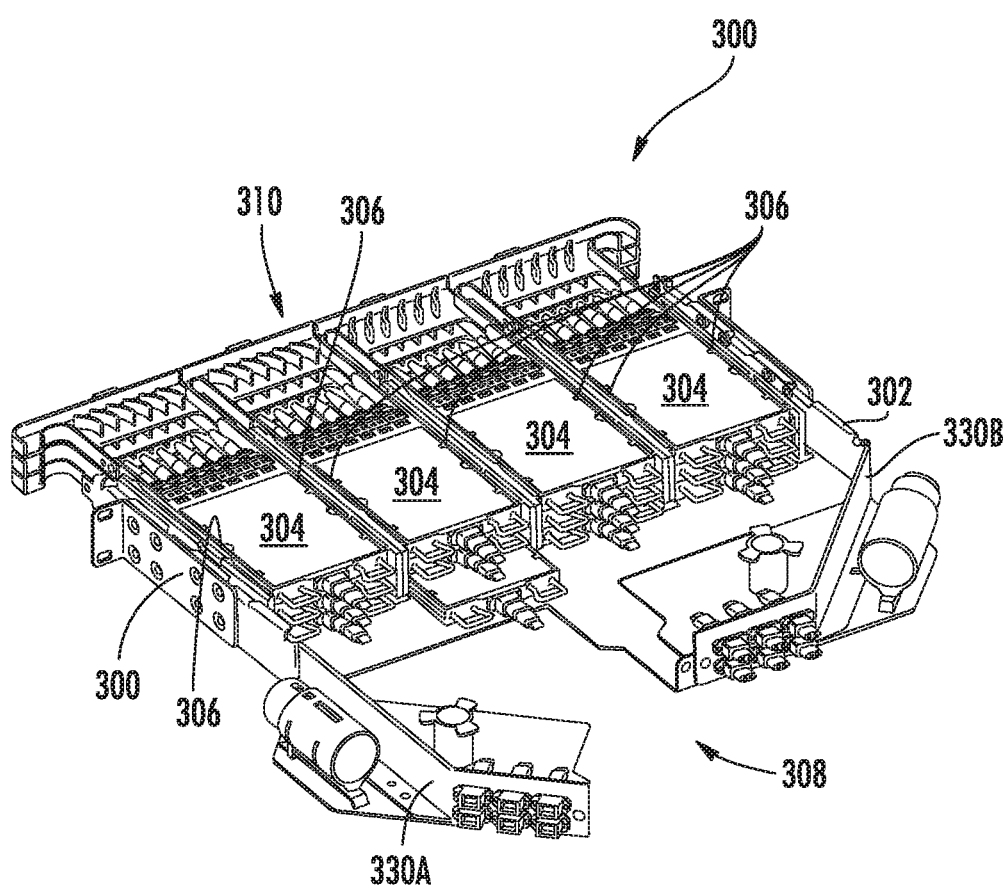
FIG. 31 is another rear perspective view of the fiber optic equipment supporting the rear-installable fiber optic modules of FIG. 28.

In order to install a fiber optic module 304 from the rear section 308 of the fiber optic equipment 300, as illustrated in FIG. 31, hinged portions 330A, 330B of the rear section 308 of the chassis 302 are pulled outward such that the module rail guides 306 are accessible to a technician. Thereafter, the fiber optic module 304 and its module rails 312A, 312B are inserted into channels in the module rail guides 306 as illustrated in FIG. 31. The fiber optic module 304 is then pushed forward within the module rail guides 306 until the fiber optic module 304 reaches the front end 310 of the chassis 302. Once the fiber optic modules 304 are installed as desired, the hinged portions 330A, 330B are closed.

Figure 32:
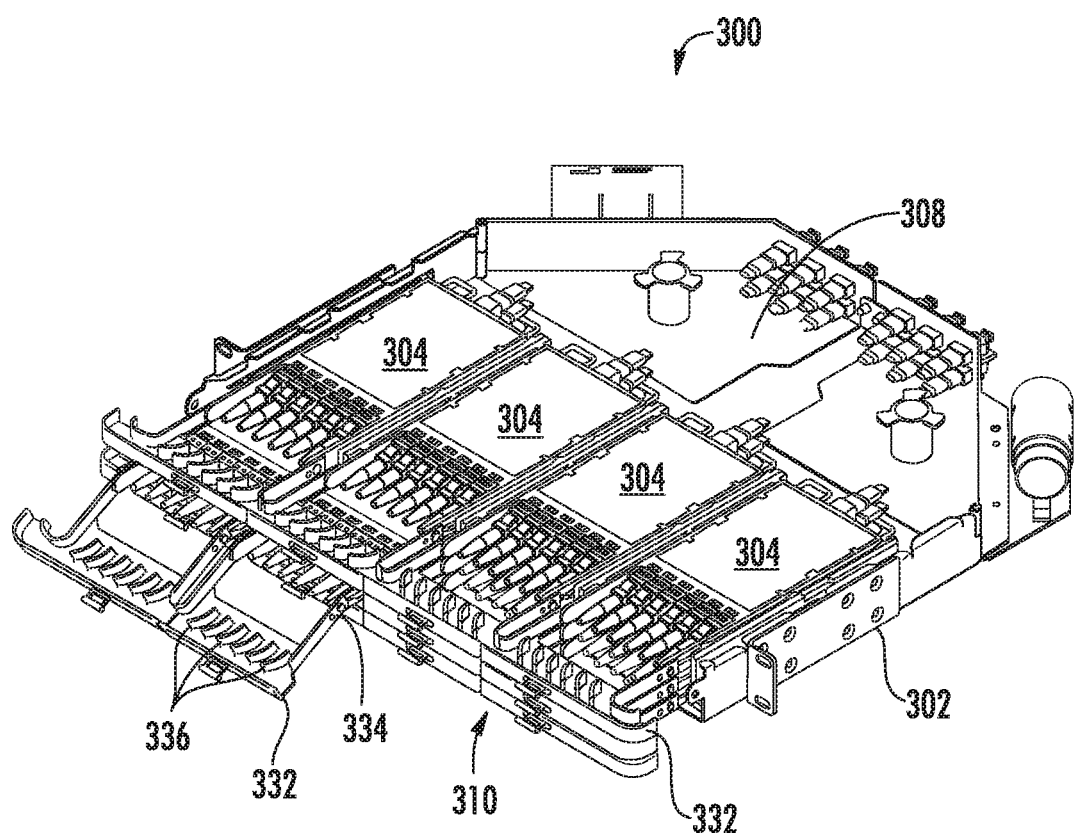
FIG. 32 is another front perspective view of the fiber optic equipment supporting the rear-installable fiber optic modules of FIG. 28 with a fiber routing tray extended and tilted downward to provide access to certain fiber optic modules.
Figure 33:
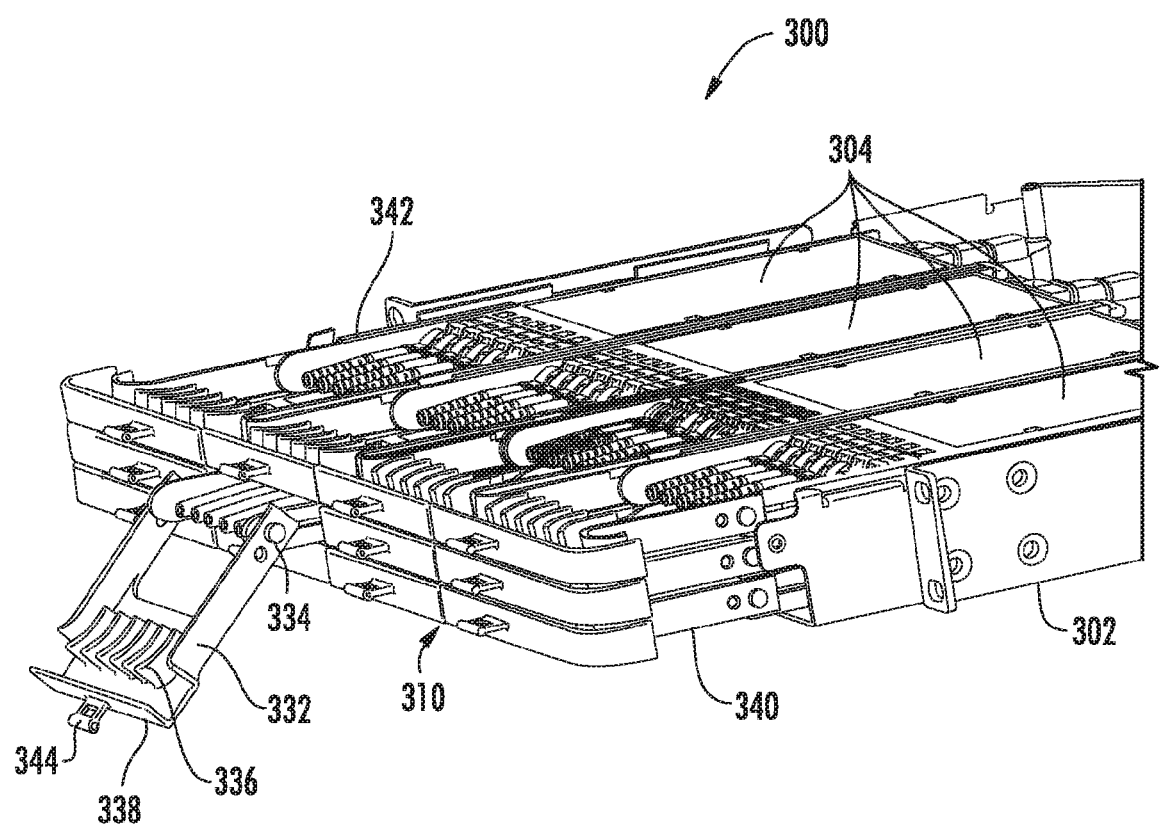
FIG. 33 is another front perspective view of the fiber optic equipment supporting the rear-installable fiber optic modules of FIG. 28 with the fiber routing tray extended and tilted downward.

In order to access the fiber optic connectors 322 of the fiber optic modules 304, a module guide tray 332, which is hingedly attached via hinges to the module rail guides 306, can be pulled forward and tilted downward as illustrated in FIG. 32. Each fiber optic module 304 has its own module guide tray 332 such that each fiber optic module 304 is individually accessible and independently movable about the module rail guides 306. The module guide tray 332 may contain a series of fiber routing guides 336 that support routing of connectorized fiber optic cables (not shown) connected to the fiber optic adapters 318 of the fiber optic module 304. FIG. 33 illustrates a side perspective view illustrating more detail regarding the module guide tray 332. The module guide tray 332 is pulled forward and hingably tilted via hinge 334 downward to access the fiber optic adapters 318 of the fiber optic modules 304. The module guide tray 332 may contain a U-shaped flange 338 to allow optical fibers to be routed therein to either the left or right of the tray to the sides 340, 342 of the chassis 302. Further, a handle 344 may be provided and attached to the module guide tray 332 to allow for pulling and pushing for easy translation of the fiber optic module 304.

Figure 34:
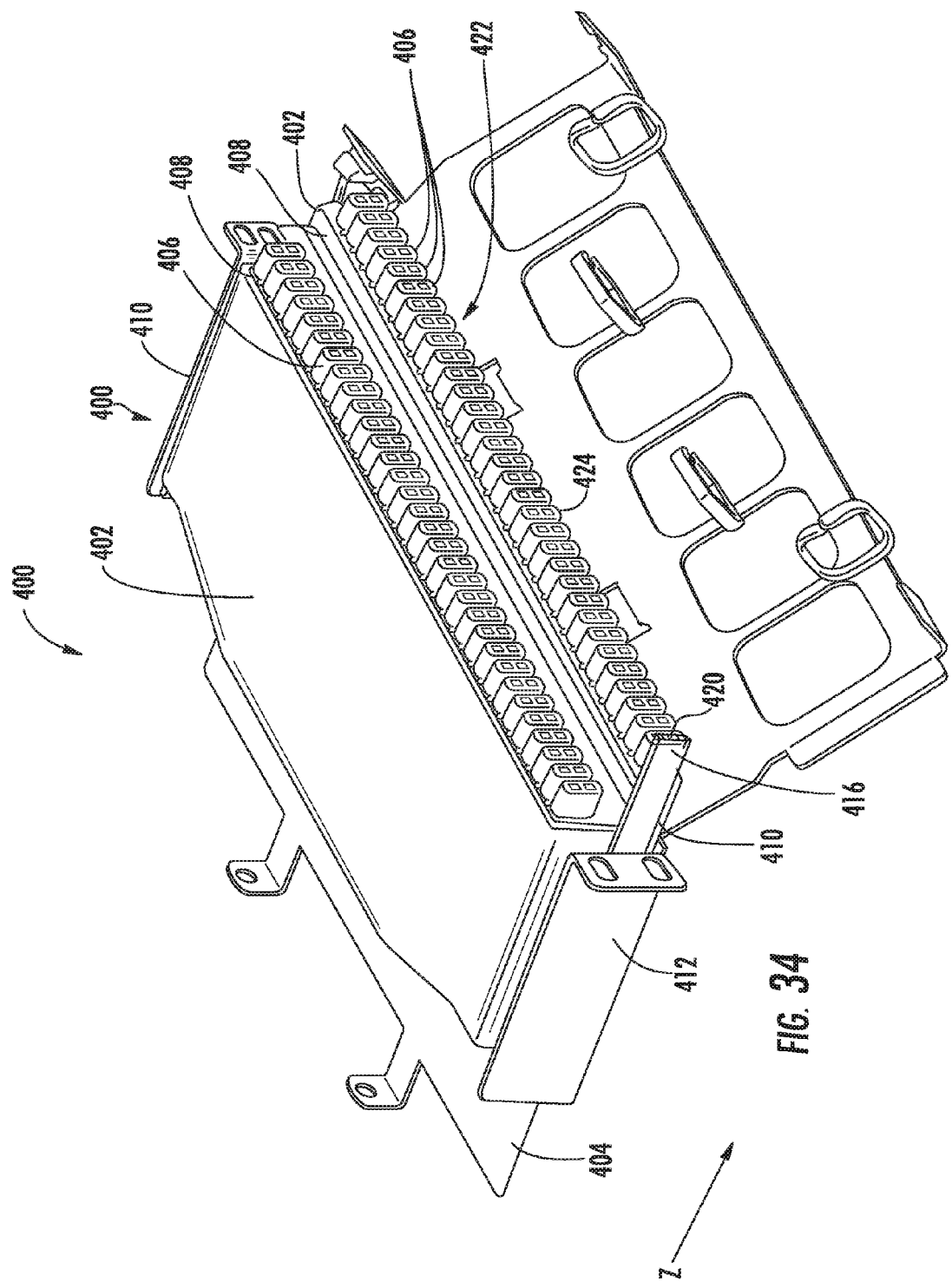
FIG. 34 is a front perspective view of another exemplary fiber optic equipment supporting rear-installable fiber optic modules.
Figure 35:
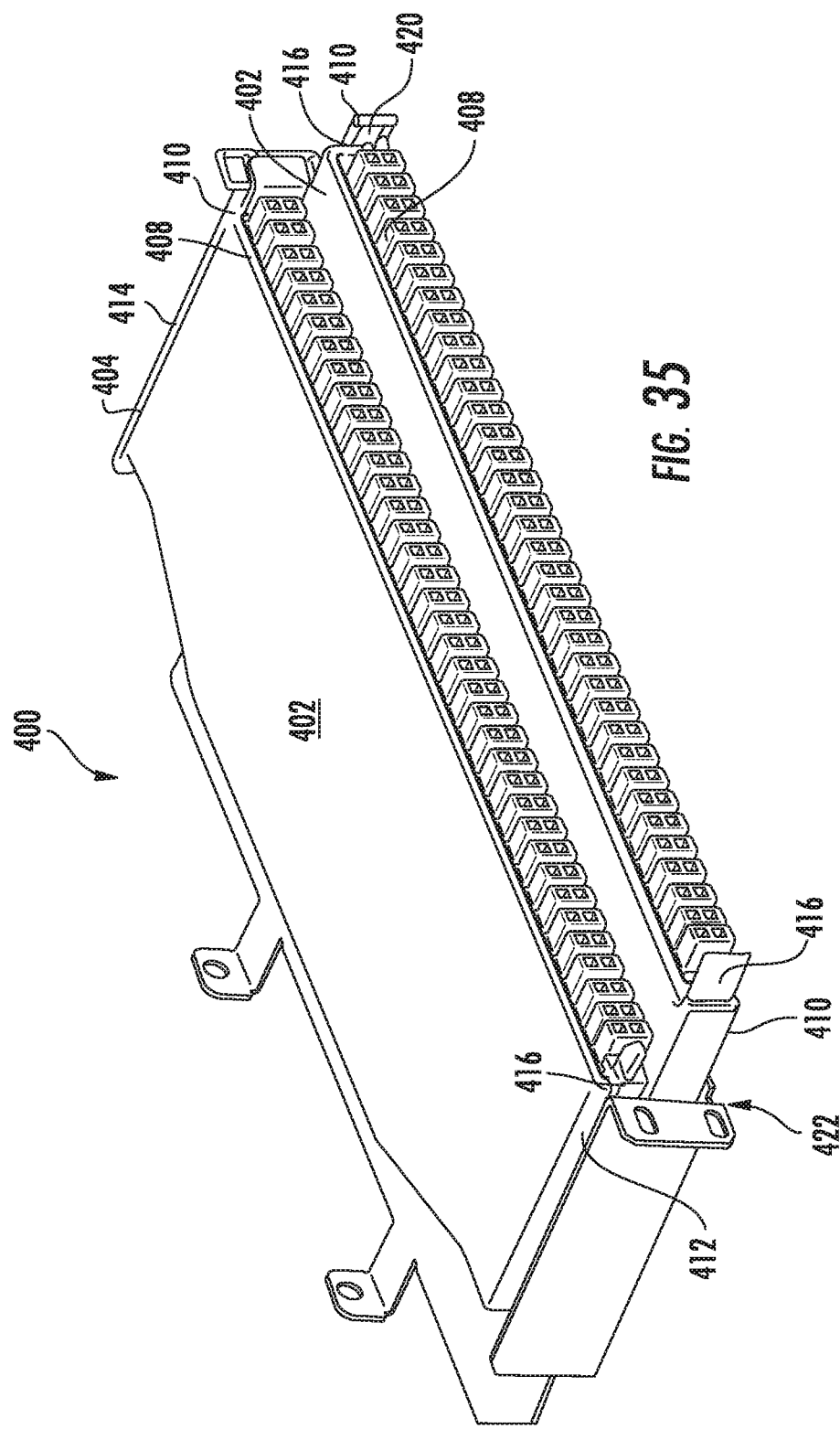
FIG. 35 is another front perspective view of another exemplary fiber optic equipment supporting rear-installable fiber optic modules.

FIGS. 34 and 35 illustrate yet another embodiment of fiber optic equipment 400. In this embodiment, a module guide system is provided to allow fiber optic modules 402 to translate independently of each other about a chassis 404 outward in the Z-axis direction. As illustrated herein, two (2) fiber optic modules 402 are provided. Each fiber optic module 402 contains a series of fiber optic adapters 406 disposed in a front end 408 of the fiber optic module 402. A module rail guide 410 is disposed in the fiber optic equipment 400 for each fiber optic module 402. As illustrated in FIGS. 34 and 35, two fiber optic modules 402 are provided that expand the entire width of the chassis 404. Thus, no intermediate module rail guides 410 are necessary or provided in the fiber optic equipment 400. Only two (2) module rail guides 410 are disposed on a first end 412 and a second end 414 of the chassis 404, although intermediate module rail guides can be provided if the fiber optic equipment 400 is designed to support multiple fiber optic modules in a single level or plane. Each fiber optic module 402 comprises a module rail 416 that is configured to be disposed within a channel 420 of the module rail guides 410. In this manner, the fiber optic modules 402 may be rear-installable and may be independently movable from each other along their dedicated module rail 416 so they can be pulled out towards a front end 422 of the fiber optic equipment 400 and chassis 404. This is illustrated in FIGS. 34 and 35 wherein the bottom fiber optic module 402 is pulled forward along its module rail 416 to provide access. After any access desired is completed, the bottom fiber optic module 402 can be pushed back in along its module rail 216 into the chassis 404 such that the front end 422 of the fiber optic module 402 will be disposed within the front end 408 of the chassis 404.

Many modifications and other embodiments of the invention set forth herein will come to mind to one skilled in the art to which the invention pertains having the benefit of the teachings presented in the foregoing descriptions and the associated drawings. These modifications include, but are not limited to, number or type of fiber optic modules, use of a fiber optic equipment tray, fiber optic connection type, number of fiber optic adapters, density, etc.

Therefore, it is to be understood that the invention is not to be limited to the specific embodiments disclosed and that modifications and other embodiments are intended to be included within the scope of the appended claims. It is intended that the present invention cover the modifications and variations of this invention provided they come within the scope of the appended claims and their equivalents. Although specific terms are employed herein, they are used in a generic and descriptive sense only and not for purposes of limitation.

What is claimed is:

1. A fiber optic apparatus, comprising:
   a chassis configured to be disposed in an equipment rack, the chassis comprising opposite front and rear ends that are spaced apart from one another in a longitudinal direction, and comprising opposite first and second ends that are spaced apart from one another in a lateral direction that extends crosswise to the longitudinal direction;
   a guide system configured to be disposed within the chassis;
   at least one fiber optic equipment tray slidably engaged within the guide system; and
   a plurality of fiber optic modules configured to be received by the at least one fiber optic equipment tray, wherein each fiber optic module of the plurality of fiber optic modules is configured to be independently movable in the longitudinal direction relative to the at least one fiber optic equipment tray;

wherein each fiber optic module of the plurality of fiber optic modules comprises a front end, a rear end, an interior, a plurality of first fiber optic adapters disposed through the front end, at least one second fiber optic adapter disposed through the rear end, at least one optical fiber disposed within the interior and establishing at least one optical connection between the at least one second fiber optic adapter and at least one first fiber optic adapter of the plurality of first fiber optic adapters, and a locking latch comprising a lateral protrusion configured to prevent the fiber optic module from moving rearward relative to the at least one fiber optic equipment tray, the locking latch being actuatable by a user from a rear of the fiber optic module; and wherein the at least one fiber optic equipment tray and the plurality of fiber optic modules are configured to permit each fiber optic module of the plurality of fiber optic modules to be removable from a front of the at least one fiber optic equipment tray, and releasably removable from a rear of the at least one fiber optic equipment tray.

2. The fiber optic apparatus of claim 1, wherein for each fiber optic module, the locking latch extends rearward beyond the rear end of the fiber optic module.

3. The fiber optic apparatus of claim 2, wherein for each fiber optic module, the locking latch extends rearward from a lateral edge of the fiber optic module.

4. The fiber optic apparatus of claim 1, further comprising a module guide system comprising a plurality of module guides configured to be carried by the at least one fiber optic equipment tray, wherein for each fiber optic module of the plurality of fiber optic modules, the locking latch is configured to be pulled inward toward a medial portion of the fiber optic module to permit disengagement of the lateral protrusion from at least one module guide of the plurality of module guides.

5. The fiber optic apparatus of claim 4, wherein the plurality of module guides is configured to support at least four fiber optic modules of the plurality of fiber optic modules.

6. The fiber optic apparatus of claim 4, wherein for each fiber optic module of the plurality of fiber optic modules, a portion of the locking latch is configured to flex upon actuation of the locking latch by a user pulling the locking latch inward toward the medial portion of the fiber optic module.

7. The fiber optic apparatus of claim 1, wherein each fiber optic module of the plurality of fiber optic modules is configured to move by translation in the longitudinal direction.

8. The fiber optic apparatus of claim 1, wherein a number of adapters of the plurality of first fiber optic adapters exceeds a number of adapters of the at least one second fiber optic adapter.

9. The fiber optic apparatus of claim 1, wherein the at least one fiber optic equipment tray comprises a plurality of fiber optic equipment trays.

10. The fiber optic apparatus of claim 9, wherein the plurality of fiber optic equipment trays comprises fiber optic equipment trays arranged in a stacked configuration.

11. The fiber optic apparatus of claim 9, wherein each fiber optic equipment tray of the plurality of fiber optic equipment trays is configured to receive multiple fiber optic modules of the plurality of fiber optic modules.

12. The fiber optic apparatus of claim 1, wherein the at least one fiber optic equipment tray comprises a plurality of module guides, and each fiber optic module of the plurality of fiber optic modules is configured to move and be guided between a different pair of laterally spaced module guides of the plurality of module guides.

13. The fiber optic apparatus of claim 12, wherein at least one module guide of the plurality of module guides comprises a stop feature arranged to limit forward translation in the longitudinal direction of a fiber optic module of the plurality of fiber optic modules.

14. The fiber optic apparatus of claim 12, wherein at least one module guide of the plurality of module guides comprises at least one module locking feature disposed adjacent to a forward portion of the at least one fiber optic equipment tray, and the at least one module locking feature is configured to retain a fiber optic module of the plurality of fiber optic modules in the at least one fiber optic equipment tray when the fiber optic module is disposed adjacent to the forward portion of the at least one fiber optic equipment tray.

15. The fiber optic apparatus of claim 12, wherein the chassis comprises a rear section, and a rear portion of each module guide of the plurality of module guides defines at least one guide channel that is open on a rear end thereof and is configured to permit the plurality of fiber optic modules to be inserted into the plurality of module guides from the rear section of the chassis and be guided toward the front end of the chassis.

16. The fiber optic apparatus of claim 12, wherein each fiber optic module of the plurality of fiber optic modules comprises at least one laterally extending protrusion configured to cooperate with at least one module guide of the plurality of module guides.

17. The fiber optic apparatus of claim 1, further comprising a plurality of fiber routing guides associated with the at least one fiber optic equipment tray and that supports routing of fiber optic cables connected to at least one fiber optic module of the plurality of fiber optic modules.

18. The fiber optic apparatus of claim 1, wherein the chassis is 1-U sized.

19. The fiber optic apparatus of claim 1, wherein for at least one fiber optic module of the plurality of fiber optic modules, the at least one second fiber optic adapter comprises a higher connection density than each first fiber optic adapter of the plurality of first fiber optic adapters.

20. The fiber optic apparatus of claim 19, wherein for the at least one fiber optic module, the plurality of first fiber optic adapters is configured to accept LC fiber optic connectors, and the at least one second fiber optic adapter comprises an MTP fiber optic adapter.

21. The fiber optic apparatus of claim 1, wherein each fiber optic module of the plurality of fiber optic modules comprises first and second lateral walls extending in the longitudinal direction and bounding the interior.

22. A fiber optic apparatus, comprising:
a chassis configured to be disposed in an equipment rack, the chassis comprising opposite front and rear ends that are spaced apart from one another in a longitudinal direction, and comprising opposite first and second ends that are spaced apart from one another in a lateral direction that extends crosswise to the longitudinal direction;
a guide system configured to be disposed within the chassis;
a plurality of fiber optic equipment trays arranged in a stacked configuration and slidably engaged within the guide system; and a plurality of fiber optic modules configured to be received by, and to be independently movable in the longitudinal direction relative to, the plurality of fiber optic equipment trays;

wherein each fiber optic module of the plurality of fiber optic modules comprises a front end, a rear end, an interior, a plurality of first fiber optic adapters disposed through the front end, at least one second fiber optic adapter disposed through the rear end, at least one optical fiber disposed within the interior and establishing at least one optical connection between the at least one second fiber optic adapter and at least one first fiber optic adapter of the plurality of first fiber optic adapters, and a locking latch comprising a lateral protrusion configured to prevent the fiber optic module from moving rearward relative to the plurality of fiber optic equipment trays, the locking latch being actuatable by a user from a rear of the fiber optic module;

wherein for at least one fiber optic module of the plurality of fiber optic modules, the at least one second fiber optic adapter comprises a higher connection density than each first fiber optic adapter of the plurality of first fiber optic adapters;

wherein each fiber optic equipment tray of the plurality of fiber optic equipment trays is configured to receive multiple fiber optic modules of the plurality of fiber optic modules; and wherein the plurality of fiber optic equipment trays and the plurality of fiber optic modules are configured to permit each fiber optic module of the plurality of fiber optic modules to be removable from a front of the plurality of fiber optic equipment trays, and releasably removable from a rear of the plurality of fiber optic equipment trays.

23. The fiber optic apparatus of claim 22, further comprising a plurality of module guides associated with the plurality of fiber optic equipment trays, wherein the locking latch is configured to be actuated by the user pulling the locking latch inward toward a medial portion of the fiber optic module to permit disengagement of the lateral protrusion from a module guide of the plurality of module guides associated with a fiber optic equipment tray of the plurality of fiber optic equipment trays, thereby permitting release of the fiber optic module from the fiber optic equipment tray.

24. The fiber optic apparatus of claim 23, wherein for each fiber optic module of the plurality of fiber optic modules, a portion of the locking latch is configured to flex upon actuation of the locking latch by the user pulling the locking latch inward toward the medial portion of the fiber optic module.

25. The fiber optic apparatus of claim 24, wherein the chassis comprises a rear section, and a rear portion of each module guide of the plurality of module guides defines at least one guide channel that is open on a rear end thereof and is configured to permit the plurality of fiber optic modules to be inserted into the plurality of module guides from the rear section of the chassis and be guided toward the front end of the chassis.

26. The fiber optic apparatus of claim 25, wherein each fiber optic module of the plurality of fiber optic modules comprises first and second lateral walls extending in the longitudinal direction and bounding the interior.

27. The fiber optic apparatus of claim 26, wherein for each fiber optic module of the plurality of fiber optic modules, a number of adapters of the plurality of first fiber optic adapters exceeds a number of adapters of the at least one second fiber optic adapter.

28. The fiber optic apparatus of claim 27, wherein for at least one fiber optic module of the plurality of fiber optic modules, the plurality of first fiber optic adapters is configured to accept LC fiber optic connectors, and the at least one second fiber optic adapter comprises an MTP fiber optic adapter.

* * * * *